United States Patent
Takahashi et al.

[11] Patent Number: 5,819,261
[45] Date of Patent: Oct. 6, 1998

[54] METHOD AND APPARATUS FOR EXTRACTING A KEYWORD FROM SCHEDULING DATA USING THE KEYWORD FOR SEARCHING THE SCHEDULE DATA FILE

[75] Inventors: Fumiaki Takahashi; Hideo Takiguchi, both of Kawasaki, Japan

[73] Assignee: Canon Kabushiki Kaisha, Tokyo, Japan

[21] Appl. No.: 618,995

[22] Filed: Mar. 21, 1996

[30] Foreign Application Priority Data

Mar. 28, 1995 [JP] Japan .................................... 7-069387
May 16, 1995 [JP] Japan .................................... 7-116766

[51] Int. Cl.$^6$ .................................................. G06F 17/30
[52] U.S. Cl. .............................................. 707/3; 707/104
[58] Field of Search .................................. 395/615, 601, 395/603, 605

[56] References Cited

U.S. PATENT DOCUMENTS

| | | | |
|---|---|---|---|
| 4,896,306 | 1/1990 | Sanbougi et al. | 368/29 |
| 4,999,790 | 3/1991 | Murayama et al. | 395/603 |
| 5,050,071 | 9/1991 | Harris et al. | 395/601 |
| 5,201,048 | 4/1993 | Coulter et al. | 395/603 |
| 5,526,518 | 6/1996 | Kashio | 395/601 |
| 5,572,233 | 11/1996 | Kakegawa | 345/116 |
| 5,572,728 | 11/1996 | Tada et al. | 395/616 |

*Primary Examiner*—Paul V. Kulik
*Assistant Examiner*—John Loomis
*Attorney, Agent, or Firm*—Fitzpatrick, Cella, Harper & Scinto

[57] ABSTRACT

This invention provides an information processing method and apparatus, which can automatically set a word, which has already been electronically stored, as a search keyword, and can perform a search operation. For this purpose, in an information search apparatus for searching a data file for desired data, and reading out the desired data, input text data is stored in a data storage area, and when extraction of a search keyword is instructed, a search keyword extraction program automatically extracts a keyword used for search from the text data stored in the data storage area in response to the instruction. A multimedia data file stored in a non-volatile storage medium is searched based on the extracted keyword.

31 Claims, 45 Drawing Sheets

MEMORY MAP OF EXTRACTED WORD LIST STORAGE AREA

MEMORY MAP OF EXTRACTED KEYWORD INDEX LIST STORAGE AREA

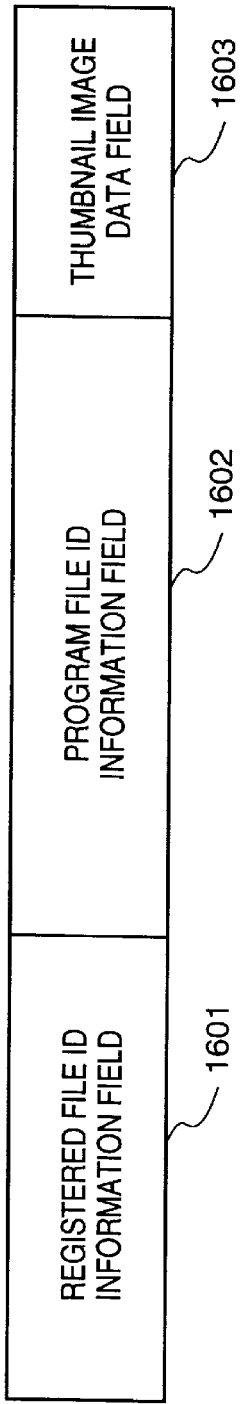
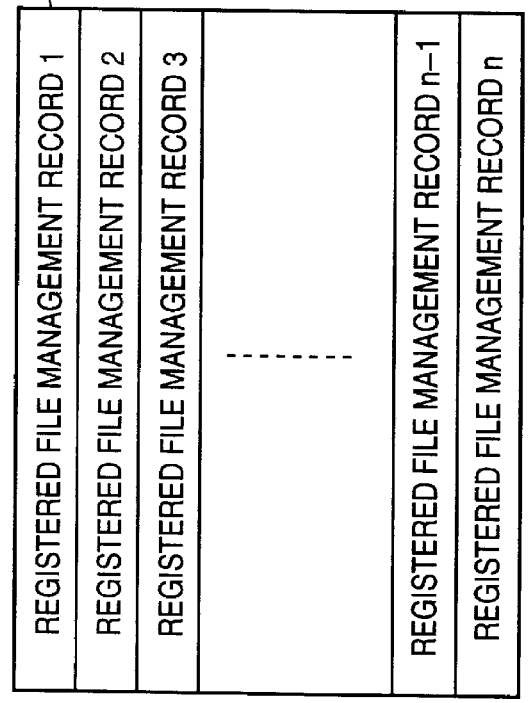

FIG. 42

| |
|---|
| /Directory1/Directory2/File1.bmp |
| /Directory1/Directory2/File2.bmp |
| /Directory1/Directory2/File3.bmp |
| /Directory1/Directory3/File4.tif |
| /Directory1/Directory3/File5.gif |
| /Directory1/Directory3/File6.bmp |
| /Directory1/Directory2/File7.jpg |
| /Directory1/Directory2/File8.jpg |
| /Directory1/Directory2/File9.txt |
| /Directory1/Directory2/File10.mvp |
| /Directory1/Directory6/File11.bmp |
| /Directory8/Directory10/File15.jpg |
| /Directory1/Directory2/File16.tif |
| /Directory1/Directory2/File17.bmp |

ARCHITECTURE OF EVENT RECORD

ARCHITECTURE OF SCHEDULE DATA FILE

METHOD AND APPARATUS FOR EXTRACTING A KEYWORD FROM SCHEDULING DATA USING THE KEYWORD FOR SEARCHING THE SCHEDULE DATA FILE

BACKGROUND OF THE INVENTION

The present invention relates to an information processing method and apparatus and, more particularly, to an information processing method and apparatus for storing and managing a plurality of kinds of information. Also, the present invention relates to an information search method and apparatus for searching data files for a required data file.

In a conventional search apparatus for searching a data file such as a database, which stores a large volume of data, for required data, when a user wants to obtain data associated with a certain word, he or she uses the word as a keyword, and inputs the keyword using, e.g., a keyboard, thereby searching the database.

Currently, a personal computer or the like which is normally used can be used as a search apparatus of a database or a text data management apparatus by running an application program on an operating system. A normal personal computer has a memory such as a RAM for storing created text data, and can store and save electronic text data in the memory.

When text data consisting of a plurality of words is stored in the memory, a user wants to search the memory for the text data using a word included in the text data as a keyword, in some cases. In this case, the user must input the word as a database search keyword in a keyword input text field of a database search application program. Alternatively, upon execution of a text edit application, the user must copy a word to be searched for included in the text data by cutting or extracting the word using an input means such as a mouse and pasting the copied word to the keyword input text field of the above-mentioned database search application program via a temporary memory, resulting in a heavy load on the user.

As an example of data stored in the memory for storing text data, schedule data is known. In recent years, many application programs (generally called a scheduler) for managing a personal schedule have been developed.

An example of such scheduler will be described below.

In the scheduler, a schedule is processed as a set of "events". In general, an event has the following information:

| | |
|---|---|
| •event name: | a character string indicating the event name |
| •location: | a character string indicating a location where the event is to occur |
| •time 1: | the start time (year, month, day, hour, minute, second) of the event |
| •time 2: | the end time (year, month, day, hour, minute, second) of the event |
| •detail: | a character string indicating the details of the event |

A user inputs these items to create an event, and registers the event in the schedule. The input event is stored in a data storage means, and is used for confirming the user's schedule later. In the event, "event name", "location", and "detail" fields include text data, which can include a plurality of words. For a user who ordinarily inputs his or her own schedule as text data in a schedule management apparatus, the most important information on a given day is closely related to schedule data (text data) on the day input to the schedule management apparatus.

In the prior art, when a user finds a word, that he or she must know its contents in detail, in text data upon observation of text-base schedule data displayed via a graphical user interface of the schedule management application software, the user must re-input a character string, which was previously input to the apparatus, as a keyword to the database to start a search operation, resulting in a cumbersome operation.

Also, an information equipment for searching a file storage unit for storing various types of document data such as text data, draw data, still image data, dynamic image data, audio data, and the like in the form of files for a target document file of a user, and an information equipment also called an electronic scheduler which receives personal schedule data input by a user, and allows the user to easily confirm his or her own schedule by displaying the input schedule data on a display device, are known.

As a method of managing files recorded on a storage medium, in a normal operating system, a user creates hierarchical directories in a tree structure, and can desirably store a file in a required one of these directories. In such a file management method, the user arranges files by storing a group of files having some equivalent meaning to him or her in one directory, and storing a group of directories having some other equivalent meaning to him or her in one directory to generate hierarchical directories. Upon searching for a file, the user can find a target file by following the hierarchical structure.

As another search method, a search method in a database system is known. In the database system, a user associates a keyword with a target file, and performs a search using the associated keyword. Each file has at least one corresponding keyword as well as its file name. The user designates one or a plurality of keywords, which are expected to be associated with a target file, in the form of an a logical operation, and the search apparatus displays a list of files that match the keyword or the logical operation result of the plurality of keywords, thereby presenting target files to the user.

The above-mentioned typical search methods are file search methods effective for searching for a desired file. However, these methods require tedious operations such as the arranging operation of the hierarchical structure and the setting operation of keywords to each file.

The currently popular OS stores the latest modified dates of files, and can display the file names of files in an arbitrary directory in the order of latest modified dates in accordance with a user's request. Thus, the user can find a target file on the basis of the date. However, a search operation based on the date cannot be performed across a plurality of directories.

Since the OS used so far stores only time attribute data such as the latest modified dates of files, even if the user wants to find "a file which was printed yesterday", he or she cannot easily find that file unless the file was updated at the time of printing.

As an application software program for a personal computer, which is used for managing a personal schedule (diary), a personal schedule management application software program generally called a scheduler (diary) is commercially available. In the scheduler, multimedia data such as image data, text data, and the like are associated with each of events included in the personal schedule, and a user can refer to multimedia data associated with a given event while observing the contents of the event. However, in such application software program, the user must explicitly associate multimedia data with each event, resulting a heavy load on the user.

SUMMARY OF THE INVENTION

The present invention has been made in consideration of the above-mentioned prior arts, and has as its first object to provide an information processing method and apparatus, which allow to automatically set a word, which has already been electronically stored, as a search keyword, and to start a search using the keyword.

It is the second object of the present invention to provide an information processing method and apparatus, which can search a database without extracting a word to be used in the search from text data including a plurality of words.

The present invention has been made in consideration of the above-mentioned problems and has as its third object to provide an information processing method and apparatus, which can search for a required file on the basis of processing generated for the file without requiring any special attention of a user.

In order to achieve the first and second objects, an information search apparatus of the present invention comprises the following arrangement. That is, an information search apparatus for searching a data file for desired data, and reading out the desired data, comprises: storage means for storing input text data; instruction means for instructing extraction of a search keyword; keyword extraction means for automatically extracting a keyword used for a search from the text data stored in the storage means in response to the instruction from the instruction means; and search means for searching the data file on the basis of the keyword extracted by the keyword extraction means.

With the above-arrangement, when the instruction means instructs extraction of a search keyword, a keyword used for search is automatically extracted from text data stored in the storage means for storing input text data in response to the instruction. The data file is searched based on the extracted keyword.

In order to achieve the third object, an information processing method of the present invention comprises the following steps. That is, an information processing method for storing and managing information as a file, comprises:

the processing detection step of detecting generation of processing for a file to be stored and managed or a file which has already been stored and managed;

the time detection step of detecting a time; and the step of registering, upon detection of processing, information for specifying the file, a type of processing, and time information in association with each other in a predetermined storage medium in accordance with a predetermined format.

According to a preferred aspect of the present invention, the method preferably comprises the time designation step of designating a time; the search step of searching for a file corresponding to the designated time on the basis of information stored in the management/storage step; and the display step of displaying a list of files obtained in the search step. With this control, even when it is difficult to specify a file itself, the operator can find out the file on the basis of the generation time of the processing.

Also, preferably, each file has reduced image information generated based on the file so as to specify the file, and the method further comprises the display pattern setting step of designating whether the list of the obtained files is displayed using file names or the reduced image information in the display step. With this control, when a reduced image is displayed, the attribute and type of a file can be easily recognized, and the file can be specified more easily.

The type of processing preferably includes a file creation operation, an edit operation, a print output operation, electronic mail transmission and reception operations, and an image input operation. Thus, a file can be searched for with reference to an event such as a printing event.

The storage/management step preferably includes the registration step of registering a file to be managed, and the registration step preferably functions after the file to be managed and an application program for processing the file as data are registered in association with each other via a user interface for registering the file to be managed and the application program in association with each other. Thus, each file can be reliably associated with an application program for processing the file.

The registration step preferably includes the step of registering a full path and a file name of the file, and a full path and a program file name of the application program. As a result, by paying attention to only the designated path and file name, the application program can be started, and the designated data file can be opened, thus simplifying control processing.

The method preferably further comprises:

the step of designating a desired file of the displayed list of files obtained in the search step; and the step of starting an application program which processes the designated file, and instructing the application program to open the designated file.

As a result, by designating only a required file in a list of files displayed as a result of the search operation, not only the contents of the file can be confirmed but also edit processing or the like of the file can be performed.

The method preferably further comprises:

the schedule registration step of registering a time band of an event and data of the event;

the display step of displaying a list of events;

the selection step of selecting at least one of the displayed events; and the step of displaying a list of files, processing operations of which was generated during a time band of the selected event.

As a result, upon execution of personal-base schedule management, a file corresponding to a schedule can be searched for without requiring any special attention.

When the schedule is displayed in the calendar format in the display step, visual schedule management can be realized.

An example of the third invention will be described below.

FIG. 45 shows the basic arrangement of an information equipment of the present invention. Referring to FIG. 45, an input unit 3001 includes a time band designation unit 3002 used by a user to designate his or her required time band to the information equipment, a time designation unit 3003 used by the user to designate his or her required time to the information equipment, and a link type selection unit 3007 (to be described later), and is used for inputting commands to the information equipment and for inputting various kinds of information upon edit processing of document information. A primary storage unit 3004 comprises, e.g., a RAM, and temporarily stores information associated with processing sequences or procedures for realizing the respective units of the information equipment, document information, and information generated during the processing of each processing sequence. Reference numeral 3010 denotes a secondary storage unit (for example, a large-capacity storage device such as a hard disk device, a magneto-optical disk device, or the like). The secondary storage unit 3010 stores information such as document files 3011, e.g., image data, text data, and the like, a link information file 3012 generated by a link generation unit 3018 of the information equipment, a link information file 3014 which describes schedule data input by the user, a thumbnail image management file 3013 which stores thumbnail image data of document files, and the like. The secondary storage unit 3010 comprises a nonvolatile storage medium.

A document edit unit 3005 performs processing for editing various kinds of document information such as text data, image data, drawing data, audio data, and the like in accordance with an input from the user via the input unit 3001. A display unit 3015 displays document information stored in the information equipment, and also displays a user interface screen used when the user inputs a command to the information equipment. Reference numeral 3016 denotes a timepiece unit, which measures the current time. Reference numeral 3017 denotes a time inquiry unit which inquires the current time of the timepiece unit 3016 in accordance with a request from other units of the information equipment. Reference numeral 3019 denotes a digital camera communication unit, which exchanges data with a digital camera connected to the information equipment. The digital camera communication unit 3019 receives image data picked up by the digital camera, and stores the received image data as a document file in the secondary storage unit 3010.

Reference numeral 3020 denotes an electronic mail reception unit for receiving an electronic mail from another information equipment connected to the information equipment via a network, and storing the received mail as a document file in the secondary storage unit 3010. Reference numeral 3021 denotes an electronic mail transmission unit for transmitting an electronic mail to another information equipment, and storing the transmitted electronic mail as a document file in the secondary storage unit 3010. Reference numeral 3022 denotes a print unit for printing the contents of a designated document file in accordance with a user's request. Reference numeral 3008 denotes a thumbnail image generation unit for generating thumbnail image data of a document file, and writing the image data in the thumbnail image management file 3013. Reference numeral 3018 denotes a link generation unit for generating link information which links information associated with the processing contents of various kinds of processing performed for a document file with file ID information of the document file and information associated with the execution time of the processing, and writing the link information in the link information file 3012.

In FIG. 45, the link generation unit 3018 is independent from other processing units, but may be included in other units (the document edit unit, digital camera communication unit, electronic mail reception unit, electronic mail transmission unit, print unit, and the like) as long as it can detect various kinds of processing performed by other units. Reference numeral 3006 denotes a link information search unit for searching for link information corresponding to the time or time band designated by the user via the time band designation unit 3002 or the time designation unit 3003. Reference numeral 3007 denotes a link type selection unit which is used by the user to select a link type to be searched by the link information search unit 3006. Reference numeral 3023 denotes a schedule management unit for managing schedule data input by the user using the input unit 3001 and storing the data as the schedule data file 3014 in the secondary storage unit 3010. The schedule management unit comprises an event search unit 3024 for searching the schedule data file 3014 for an event requested by the user on the basis of time information of the event, and an event content display unit 3025 for displaying the contents of the event found by the event search unit on the display unit 3015.

In the information equipment with the above arrangement, when the user performs, for a document file, processing such as creation of a file, reference to a file, modification of a file, a photographing operation using the digital camera, a print operation of the file contents, reception of an electronic mail, transmission of an electronic mail, intentional linkage with a time required by the user, and the like, the link generation unit 3018 of the information equipment stores link information which links the processing content information, processing time information, and file ID information of the file in the link information file 3012. When the user designates a specific time or time band using the time band designation unit 3002 or the time designation unit 3003 later, and inputs a search request command of a document file to the information equipment using the input unit 3001, the link information search unit 3006 searches the link information file 3012 for a file which was subjected to the processing contents selected by the link type selection unit 3007 at the designated time or in the designated time band, and the file ID, a portion of the file ID, or a thumbnail image of the file found upon the search is displayed on the display unit 3015. With this operation, the user can easily search for a target file on the basis of memories of the contents and processing time of processing performed by himself or herself without constantly performing any cumbersome operations for arranging files.

On the other hand, when the user designates a time or time band using the time band designation unit 3002 or the time designation unit 3003, and inputs an event content display request command of an event, corresponding to the designated time or the designated time band, in schedule data managed by the schedule management unit 3023, the event content display unit 3025 displays, on the display unit 3015, the event contents of the event corresponding to the designated time or the designated time band, which is obtained by searching for the schedule data in the schedule data file 3014 by the event search unit 3024, and the file ID, a portion of the file ID, or a thumbnail image of a file, which is obtained by searching the link information file 3012 by the link information search unit 3006 and was subjected to processing selected by the link type selection unit 3007 at the designated time or in the designated time band, in association with the event contents. Therefore, the user can easily search for a target document file by browsing his or her personal schedule, and the personal schedule information previously input by the user can be used in search.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 25A and 25B are views showing the data architecture of a registered file management file;

FIG. 42 is a view showing a list;

DETAILED DESCRIPTION OF THE PREFERRED EMBODIMENTS

The preferred embodiments of the present invention will be described below with reference to the accompanying drawings.

[First Embodiment]

Since an information equipment according to the present invention comprises a schedule management means, a multimedia data file search means, and a search keyword extraction means for automatically extracting a keyword to be used in search processing by the multimedia file search means from schedule data managed by the schedule management means, a user can search for a required multimedia data file without re-inputting a word present on a schedule, and can confirm the contents of the search result file. In this embodiment, the symbols use descriptions of C language.

Figure 1:
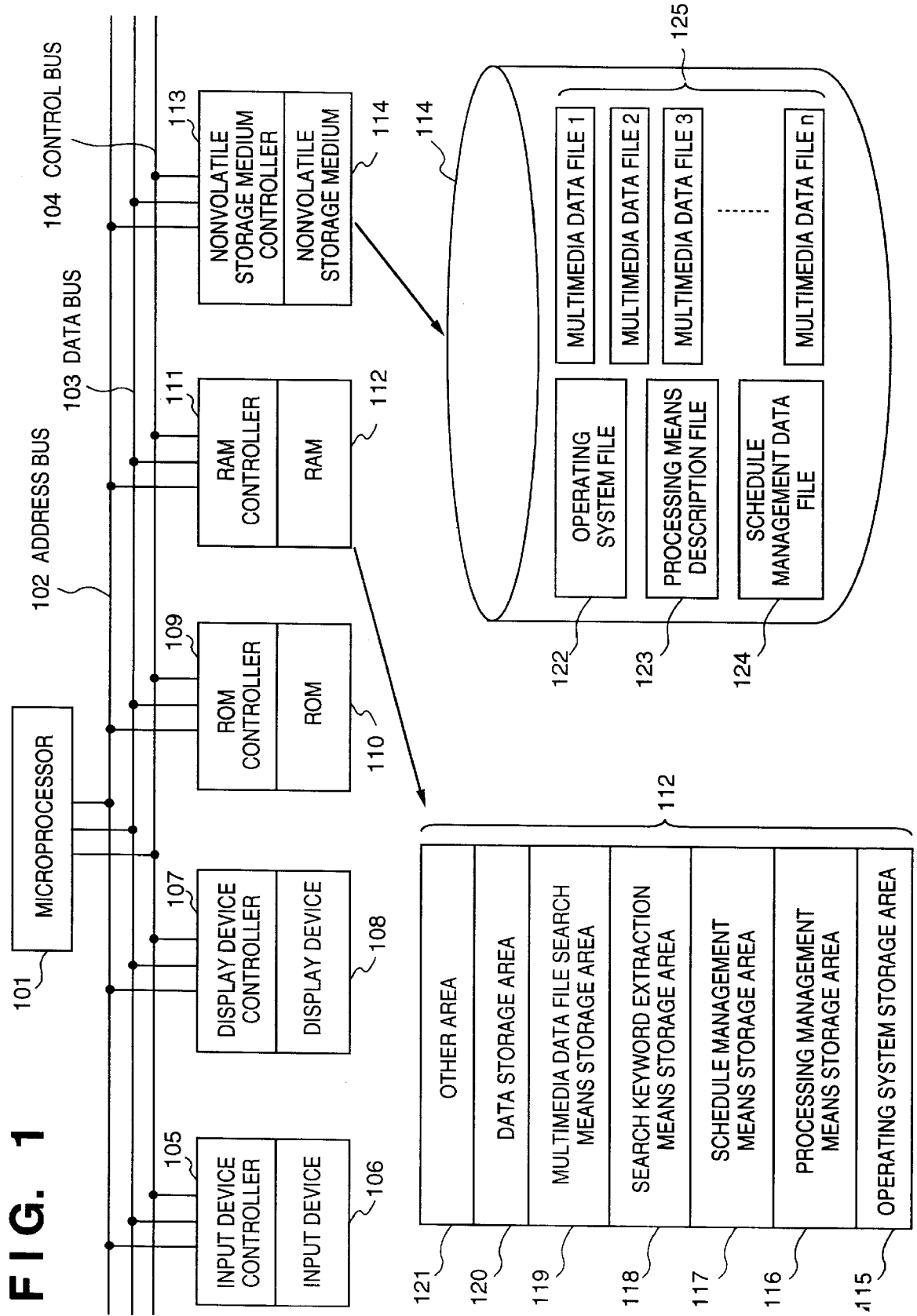
FIG. 1 is a block diagram showing the basic arrangement of an information equipment according to an embodiment of the present invention.

FIG. 1 is a block diagram showing the basic arrangement of an information equipment according to an embodiment of the present invention.

Referring to FIG. 1, reference numeral 101 denotes a microprocessor for performing arithmetic operations, logical decisions, and the like. Reference numeral 102 denotes an address bus for designating addresses of respective input/output memories; 103, a bidirectional data bus used for transferring various data; and 104, a control bus used for accepting read, write, and interrupt signals of the respective memories, and transmitting a data set timing, and the like. Reference numeral 106 denotes an input device such as a keyboard, a mouse, or the like; and 105, an input device controller for controlling the input device 106. The input device controller 105 encodes data input by the input device 106 such as a keyboard, a mouse, or the like, and sends an interrupt signal indicating that a key input has been made onto the control bus 104. Reference numeral 108 denotes a display device such as a liquid crystal display for displaying schedule data and other multimedia data. Reference numeral 107 denotes a display device controller for controlling the display operation of various data on the display device 108.

Reference numeral 110 denotes a read-only memory (ROM) which stores an initialization sequence used upon starting of the information equipment of this embodiment, and the like. Reference numeral 109 denotes a controller for controlling a read access to the ROM 110. Reference numeral 114 denotes a nonvolatile storage medium such as a hard disk device. The nonvolatile storage medium 114 has an operating system file 122 which describes an operating system for systematically managing the information equipment, a processing sequence description file 123 which describes processing sequences to be executed upon execution of schedule management, keyword extraction, and database search, a schedule management data file 124 for storing schedule data input by the user, and multimedia data files 125 such as still image data, dynamic image data, audio data, text data, and the like. Reference numeral 113 denotes a nonvolatile storage medium controller for controlling the nonvolatile storage medium 114.

Reference numeral 112 denotes a random-access memory (RAM), which has an operating system storage area 115, a processing management means storage area 116, a schedule management means storage area 117, a search keyword extraction means storage area 118, a multimedia data file search means storage area 119, a data storage area 120, and an area 121 for other data. Reference numeral 111 denotes a RAM controller for controlling read and write accesses to the RAM 112. Note that the respective means stored in the RAM 112 are stored in the form of control programs in practice.

Figure 2:
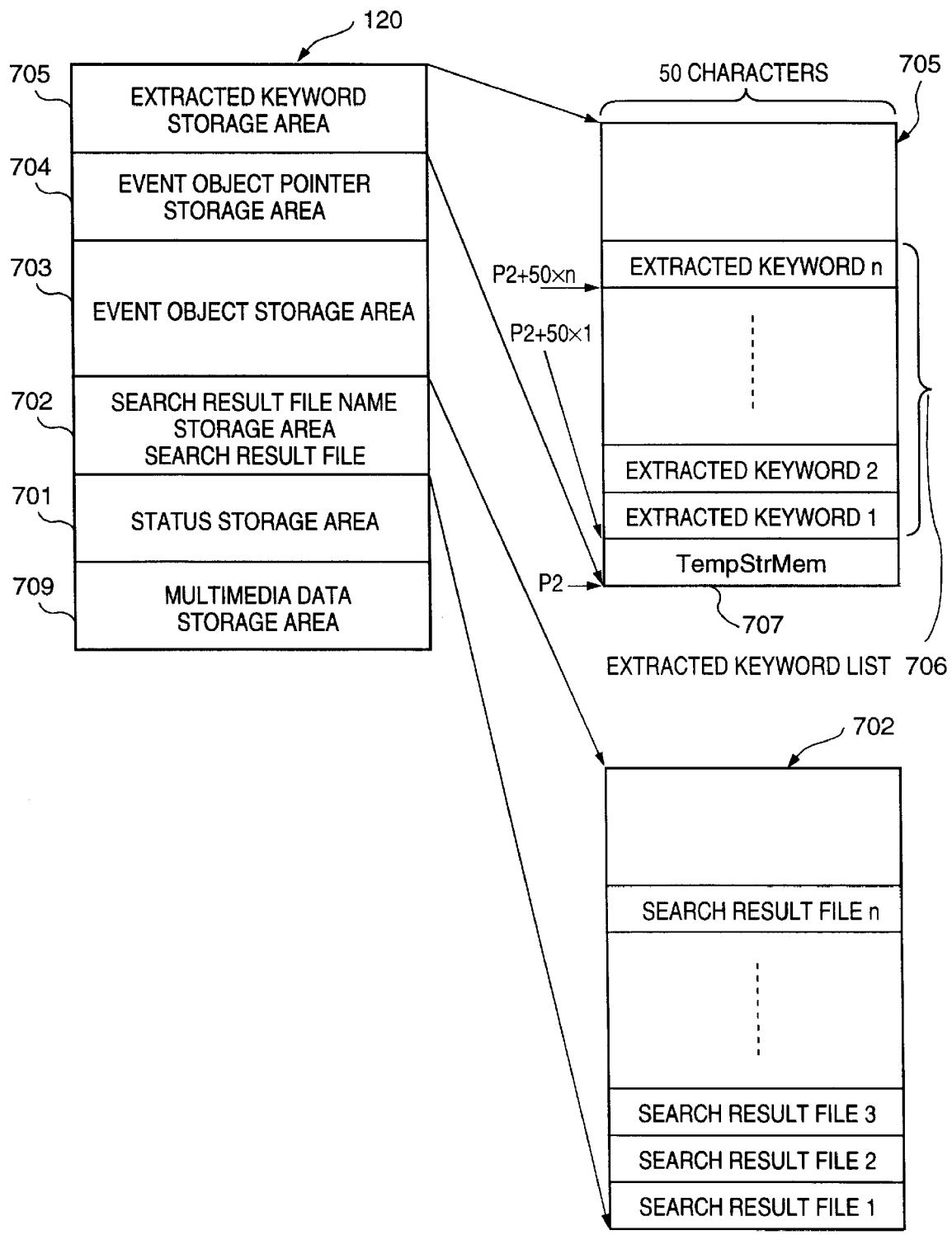
FIG. 2 shows the detailed memory map of the data storage area allocated on a RAM of the information equipment of the embodiment shown in FIG. 1.

FIG. 2 shows the detailed memory map of the data storage area 120 allocated on the RAM 112 of the information equipment of this embodiment.

Referring to FIG. 2, reference numeral 701 denotes a status storage area for storing the current status of the information equipment of this embodiment. Reference numeral 702 denotes a search result file name storage area for storing the file names of search result files or found files in the form of a list upon searching the database. The search result file name storage area 702 stores the file names of files obtained as search results in the form of a list (found files 1 to n), as shown in FIG. 2. Reference numeral 703 denotes an event object storage area for storing events input so far by the user as objects.

In this embodiment, an event as a minimum unit of a schedule is stored as an object in the data storage area 120, and the schedule management data file 124 is developed as an object on the event object storage area 703. Reference numeral 704 denotes an event object pointer storage area for storing a pointer to at least one event object, which is extracted by the information equipment based on some input of the user, in the form of a list. Reference numeral 705 denotes an extracted keyword storage area for storing at least one keyword extracted by the search keyword extraction means (stored in the area 118 in FIG. 1) of the information equipment of this embodiment in the form of a list. Reference numeral 709 denotes a multimedia data storage area for storing multimedia data such as still image data, dynamic image data, text data, audio data, and the like.

The extracted keyword storage area 705 also stores the following data.

Reference numeral 707 denotes a variable TempStrMem, which is temporarily used when a keyword used for a search is extracted from text data of an event object. In this embodiment, the variable TempStrMem has a memory space for 50 bytes (50 characters), and its start address is indicated by a pointer P2. In this embodiment, since one character is expressed by one byte, addressing to each character is performed in units of bytes. Also, addressing of pointers P1 and P2 is similarly performed in units of bytes. Reference numeral 706 denotes an extracted keyword list for storing at least one extracted keyword in the form of a list. Each extracted keyword has a capacity for a maximum of 50 characters as in the variable TempStrMem, and the start address of extracted keyword 1 in the list is indicated by (P2+50).

Figure 3:
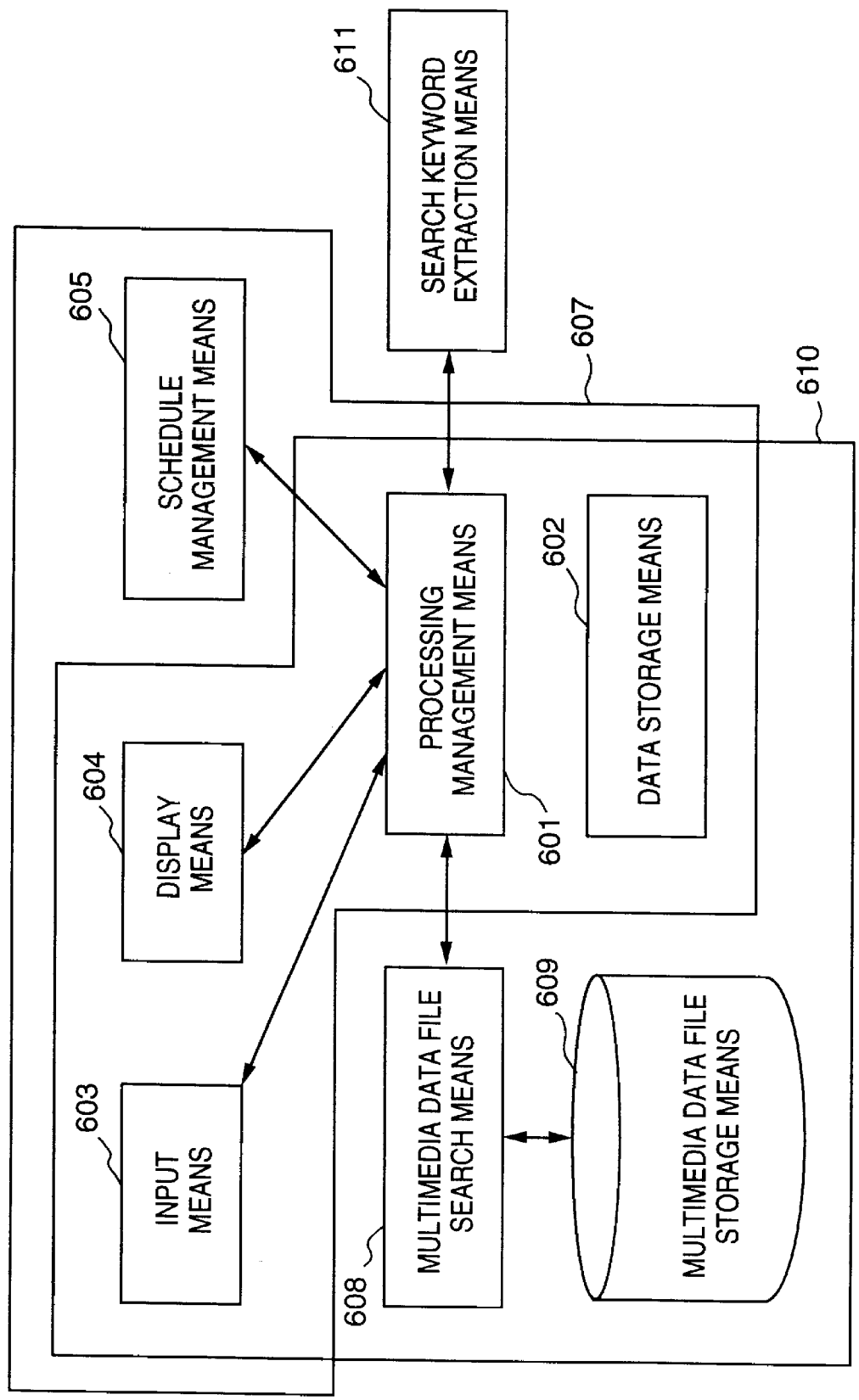
FIG. 3 is a functional block diagram showing the functional arrangement of an information equipment according to the first embodiment of the present invention.

FIG. 3 is a functional block diagram showing the functional arrangement of the information equipment according to the first embodiment of the present invention. In the first embodiment, the respective means operate under the control of a multitask operating system, and messaging (exchange of messages) with arguments between the means indicated by double-headed arrows is also performed via the operating system. That is, the respective means to be described below are programs in practice.

Referring to FIG. 3, a message from each processing means is concentrically managed by a processing management means 601 stored in the processing management means storage area 116. The processing management means 601 transmits an appropriate message to an appropriate processing means in accordance with a message from each means, thereby managing the processing order of the respective processing means. Reference numeral 602 denotes a data storage means, which corresponds to the data storage area 120. All the means shown in FIG. 3 can read/write data from/to the data storage means 602 via the operating system. An input means 603 comprising the input device controller 105 and the input device 106 accepts an input from the user, and transmits input information to the processing management means 601.

A display means 604 having the display device controller 107 and the display device 108 displays various kinds of information in their appropriate display formats in accordance with a request from the processing management means 601. A schedule management means 605 stored in the schedule management means storage area 117 is a means for managing schedule data input by the user. Schedule data input by the user using the input means 603 is transferred to the schedule management means 605 via the processing management means 601. The schedule management means 605 stores the schedule data in the event object storage area 703. When the user inputs a schedule display request, the means 605 searches the event object storage area for the requested schedule data, and the found schedule data is displayed on the display means 604.

A block 607 including the above-mentioned means 601, 602, 603, 604, and 605 realizes the function of a schedule management apparatus.

A multimedia data file search means 608 stored in the multimedia data file search means storage area 119 searches the multimedia files 1 to n (125) for a target file using a free keyword. When the user designates a keyword and inputs a search request using the input means 603, the processing management means 601 transmits the search request based on the keyword designated by the user to the multimedia data file search means 608. Upon reception of this request, the multimedia data file search means 608 picks up a file having the file attribute of the designated keyword from the multimedia data files 1 to n (125), and stores the found file name and path in the search result file name storage area 702.

The processing management means 601 controls the display means 604 in accordance with a user's instruction input via the input means 603 to display the contents of the found multimedia data file. A block 610 including the above-mentioned means 601, 602, 603, 604, 608, and 609 realizes a function as a database apparatus for performing search and display operations based on a free keyword.

Reference numeral 611 denotes a search keyword extraction means, which automatically extracts a keyword used for a search by extracting a word from text data with an arbitrary length, and transfers the automatically extracted search keyword to the multimedia data file search means 608 via the data storage means 602.

Figure 4:
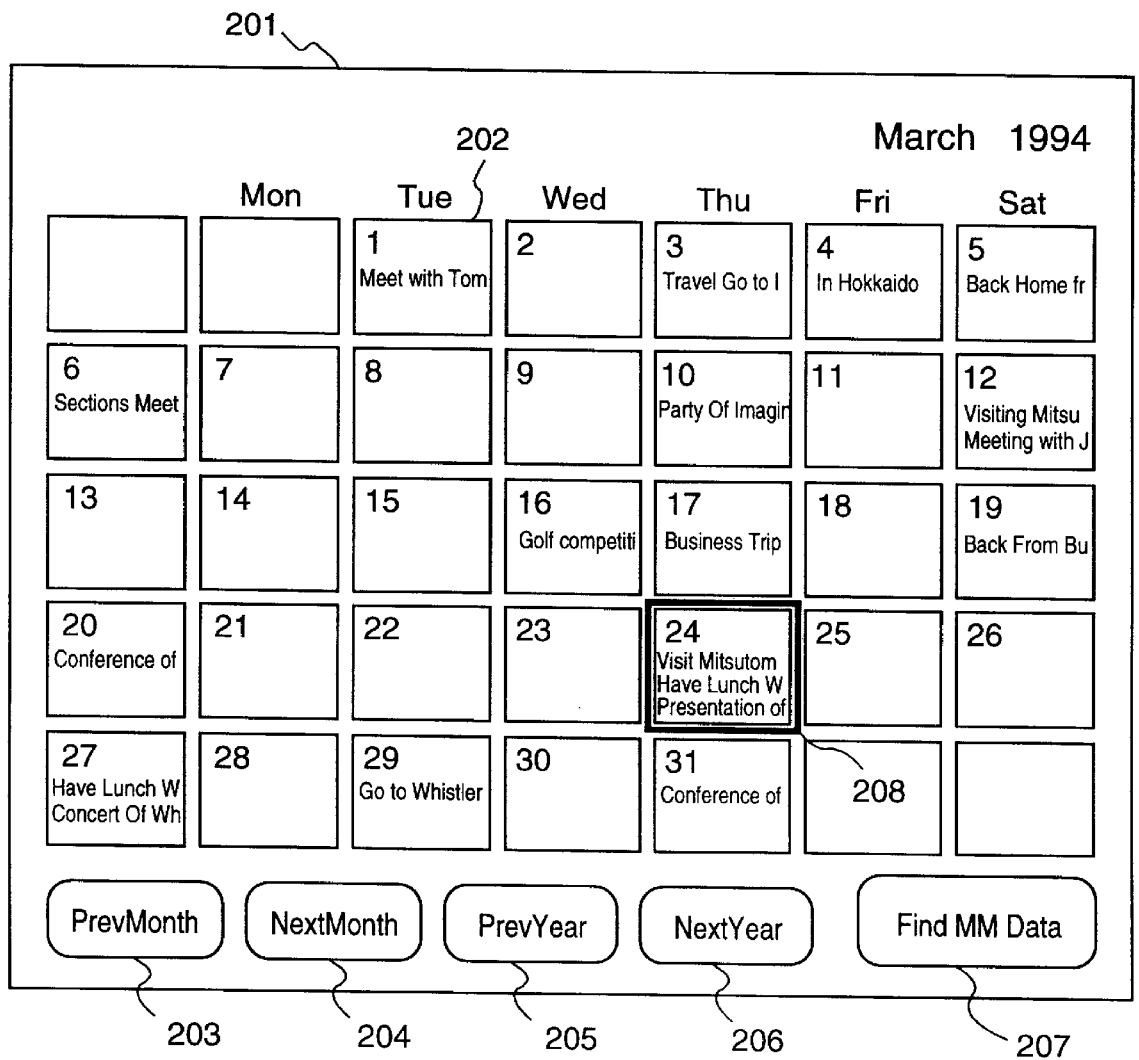
FIG. 4 is a view showing an example of a basic graphical user interface (GUI1) displayed on a display means of the information equipment of the first embodiment.

FIG. 4 shows an example of a basic graphical user interface (GUI1) displayed on the display means 604 of the information equipment of this embodiment.

As shown in FIG. 4, the GUI1 has the form of a calendar. When the information equipment of this embodiment is started, the GUI1 displays a calendar including the start date. In this embodiment, the information equipment is started on Mar. 24, 1994, and the calendar for March in 1994 is displayed.

In FIG. 4, reference numeral 201 denotes an outer frame of the calendar. A frame 202 indicates a day unit, and displays a date and an event name if an event is present on the date. A frame 208 indicates the start date of the equipment, i.e., that Mar. 24, 1994 is selected. When the GUI1 is initially displayed after the information equipment is started, March 24 is selected. The user can select an arbitrary date by moving the mouse cursor to the position of the arbitrary date and clicking the mouse button.

When the user clicks a PrevMonth button 203, the GUI1 is updated to the display state of the calendar of the previous month. When the user clicks a NextMonth button 204, the GUI1 is updated to the display state of the calendar of the next month. When the user clicks a PrevYear button 205, the GUI1 is updated to the display state of the calendar of the same month in the previous year; when he or she clicks a NextYear button 206, the calendar of the same month in the next year. A Find MM Data button 207 will be explained later.

Figure 5:
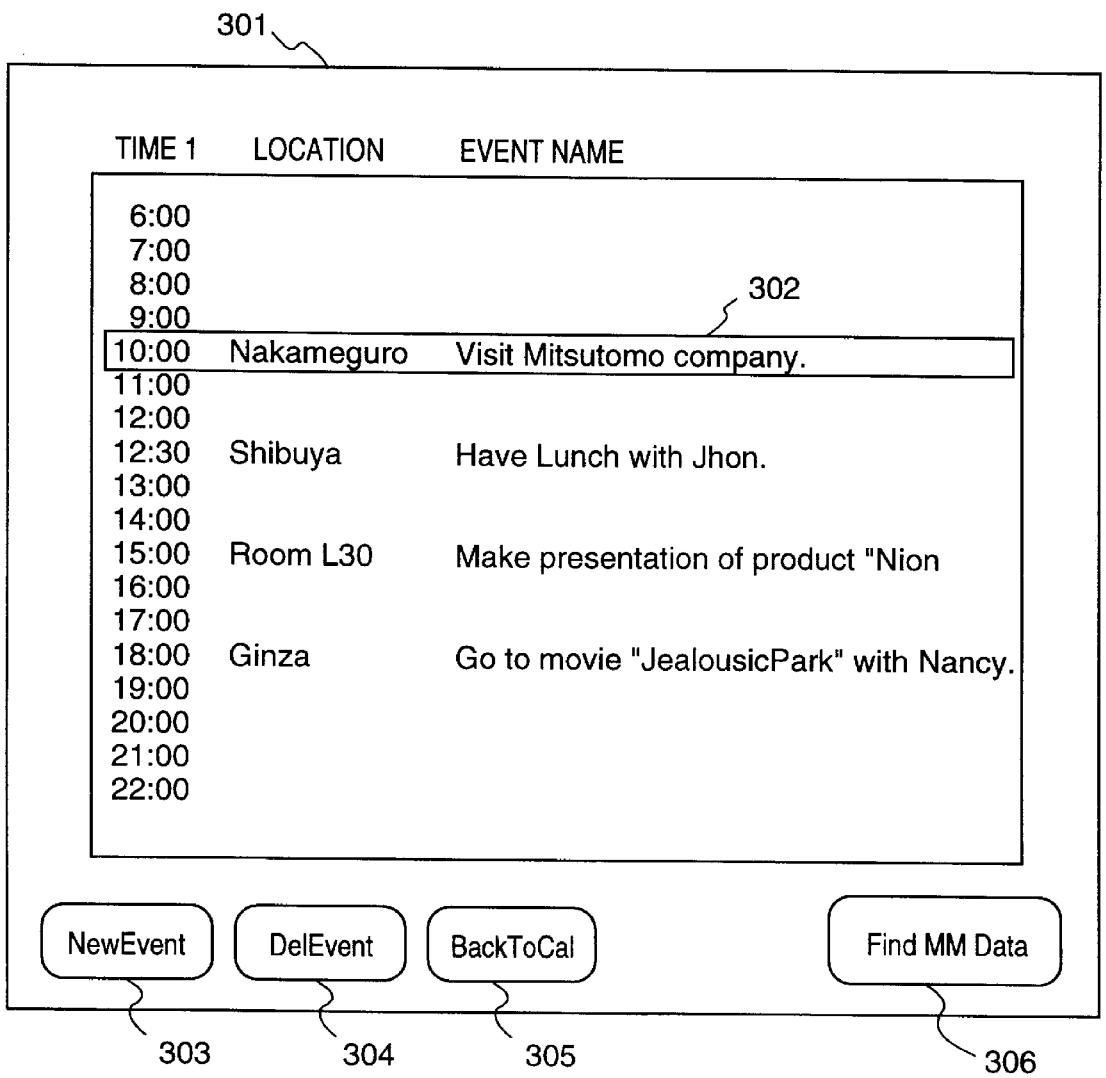
FIG. 5 is a view showing an example of a graphical user interface (GUI2) used in the information equipment according to the first embodiment of the present invention.

Furthermore, when the user double-clicks an arbitrary date, a GUI2 shown in FIG. 5 is displayed in place of the GUI1. The GUI2 displays the event names and locations of events in the time order of the date (in this embodiment, Mar. 24, 1994) double-clicked on the GUI1.

Figure 6:
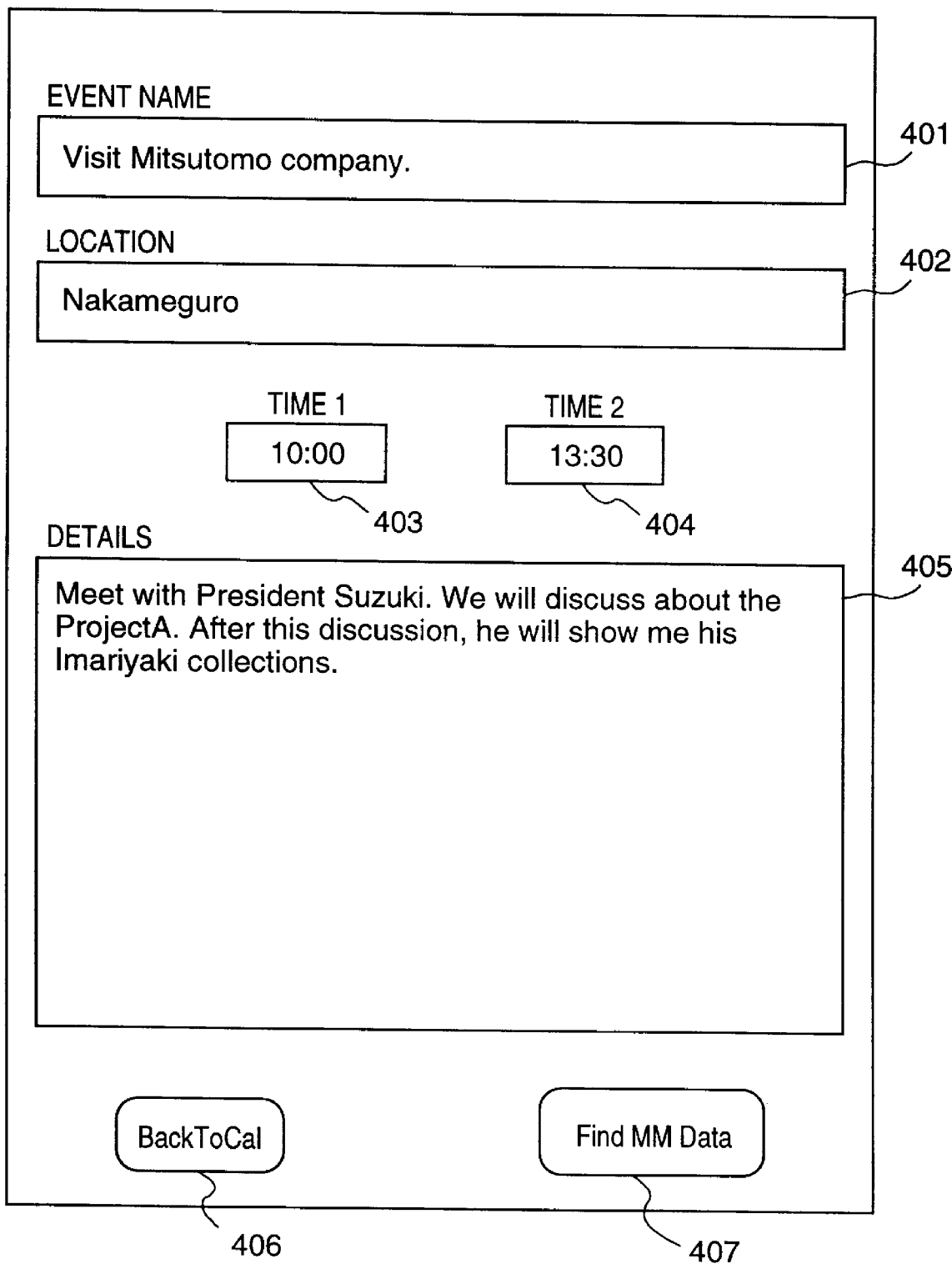
FIG. 6 is a view showing an example of a graphical user interface (GUI3) used in the information equipment according to the first embodiment of the present invention.

Referring to FIG. 5, reference numeral 301 denotes an outer frame of the GUI2; and 302, a selection frame indicating that an event is selected. In this embodiment, an event with time 1=10:00, location=Nakameguro, and event name= Visit Mitsutomo company is selected. Reference numeral 303 denotes a NewEvent Button, which is clicked by the user when he or she inputs a new event. By clicking the NewEvent button 303, a GUI3 as a graphical user interface, as shown in FIG. 6, is displayed in place of the user interface GUI2. The user can input a new event using this user interface.

On the other hand, when the user clicks a DelEvent button 304, event data selected by the selection frame 302 is deleted. When the user clicks a BackToCal button 305, the GUI1 is displayed in place of the GUI2. Note that a Find MM Data button 306 will be explained later.

FIG. 6 will be described below. The GUI3 shown in FIG. 6 shows all the field values of the event, and the user can edit the contents of the respective fields on the GUI3.

Referring to FIG. 6, reference numeral 401 denotes a text field used for displaying and inputting an event name. Reference numeral 402 denotes a text field used for displaying and inputting a location. Note that "location" indicates a location where an event indicated by the event name is to take place. Reference numeral 403 denotes a text field used for displaying and inputting time 1. Note that time 1 indicates the start time of the event indicated by the event name. Reference numeral 404 denotes a text field used for displaying and inputting time 2. Note that time 2 indicates the end time of the event indicated by the event name. Reference numeral 405 denotes a text field used for displaying and inputting the details of the event. Note that the details of the event are the detailed contents of the event indicated by the event name and are input by the user as text data with an arbitrary length. Reference numeral 406 denotes a BackToCal button. When the user clicks this button 406, the GUI1 is displayed in place of the GUI3.

On the GUI3, the user can edit the contents of the respective field using the input device 106 such as a keyboard, mouse, and the like. The edit results are stored in the event object storage area 703, and are stored in the schedule management data file 124 in response to a saving instruction input by the user or at the end of processing when the power switch of the information equipment is turned off.

Figure 7:
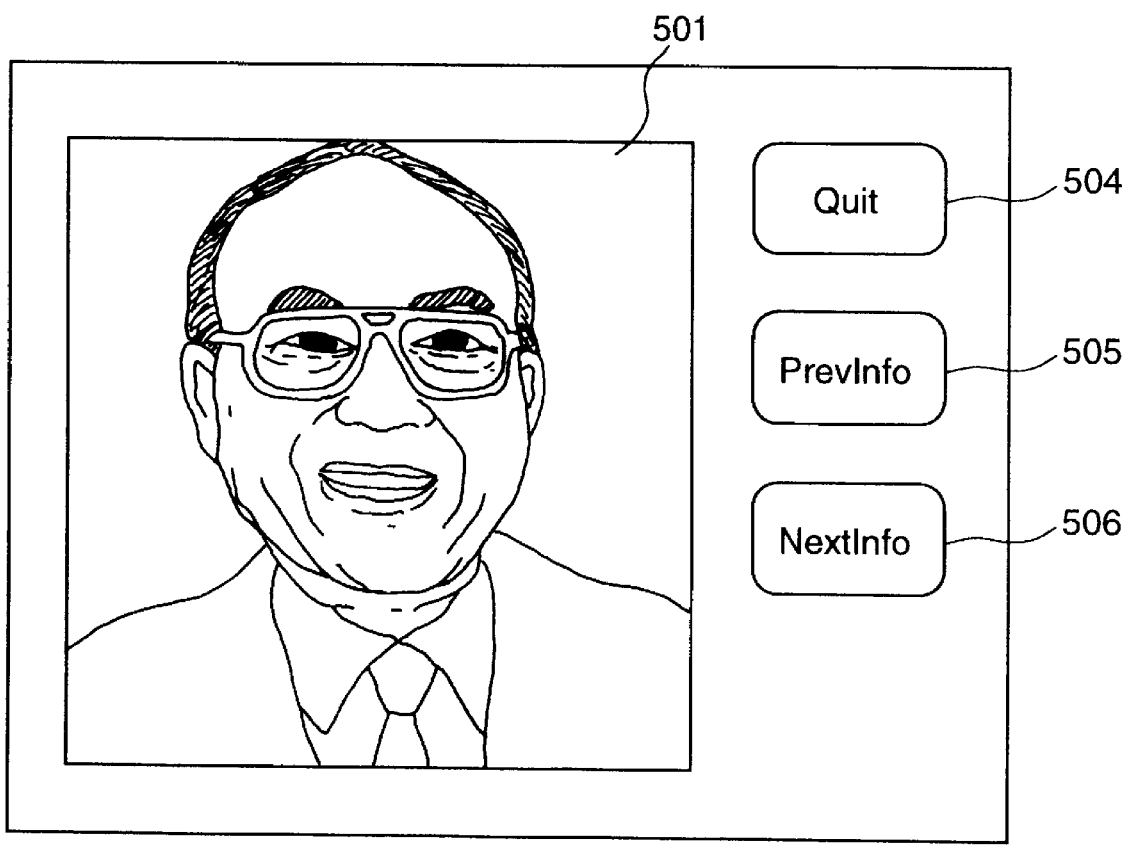
FIG. 7 is a view showing an example of a graphical user interface (GUI4) used in the information equipment according to the first and second embodiments of the present invention.

FIG. 7 shows a display example of a graphical user interface (GUI4) on which found multimedia data is displayed upon searching the schedule data for multimedia data by the information equipment of this embodiment.

Referring to FIG. 7, reference numeral 501 denotes a view window for displaying a found still image, dynamic image, text data, or the like. When the user clicks a Quit button 504, the GUI immediately before the GUI4 was displayed is displayed on the display device 108 in place of the GUI4, thus quitting the mode for displaying the search result. On the other hand, when the user clicks a PrevInfo button 505, a file listed immediately above the currently displayed file on the search result file name list in FIG. 2 is displayed. In this case, if the currently displayed file is at the top of the list, the currently displayed file is kept displayed. When the user clicks a NextInfo button 506, a file listed immediately below the currently displayed file on the list in FIG. 2 is displayed. In this case, if the currently displayed file is at the end of the list, the displayed file is kept displayed.

The detailed operation of the information equipment of this embodiment will be described in detail below with reference to FIGS. 1 to 10.

When the user turns on the power switch of this information equipment, the initialization program stored in the ROM 110 is executed, and initialization processing required for the information equipment is performed. Upon completion of the initialization processing, the operating system file 122 is loaded into the operating system storage area 115, and the control waits for an event input by the user. When the user requests the use of the function of this information equipment via the input device 106, the operating system loads the processing means description file 123 from the nonvolatile storage medium 114, and develops the file into the processing management means 601, the schedule management means 605, the search keyword extraction means 611, and the multimedia data file search means 608, and stores the respective means on the areas 116 to 119 on the RAM 120. At this time, the means stored in the respective areas are validated on the information equipment as means for performing transmission/reception and their predetermined processing operations.

For the sake of simplicity, the following explanation will be given with reference to the functional arrangement shown in FIG. 3. The respective means shown in FIG. 3 are realized by the basic arrangement shown in FIG. 1, and the correspondence between the respective means shown in FIG. 3 and the basic arrangement shown in FIG. 1 will be explained below as needed.

When the respective means shown in FIG. 3 are validated, the processing management means 601 stored in the processing management means storage area 116 transmits a message indicating a loading command of schedule data to the schedule management means 605 stored in the schedule management means storage area 117. Upon reception of this message, the schedule management means 605 loads the schedule management data file 124 from the nonvolatile storage medium 114. Then, the means 605 generates objects of events included in the schedule in accordance with schedule data, and stores the generated objects in the event object storage area 703. At the same time, the processing management means 601 displays information of all or some events on the GUI1 by the display means 604, and then waits for an input from the user. Thereafter, when the user makes an input using the input means 603, the processing management means 601 controls the respective means shown in FIG. 3 in accordance with the user's input, so that the information equipment of this embodiment operates, as has been described in the paragraphs of the GUI1 to GUI3.

When the user clicks the Find MM Data button (207 in FIG. 4, 306 in FIG. 5, and 407 in FIG. 6) on the graphical user interface, the information equipment automatically extracts a keyword from the schedule data, and searches a multimedia data file.

The processing sequence at that time will be described in detail below with reference to the flow charts in FIGS. 8 and 9.

Figure 8:
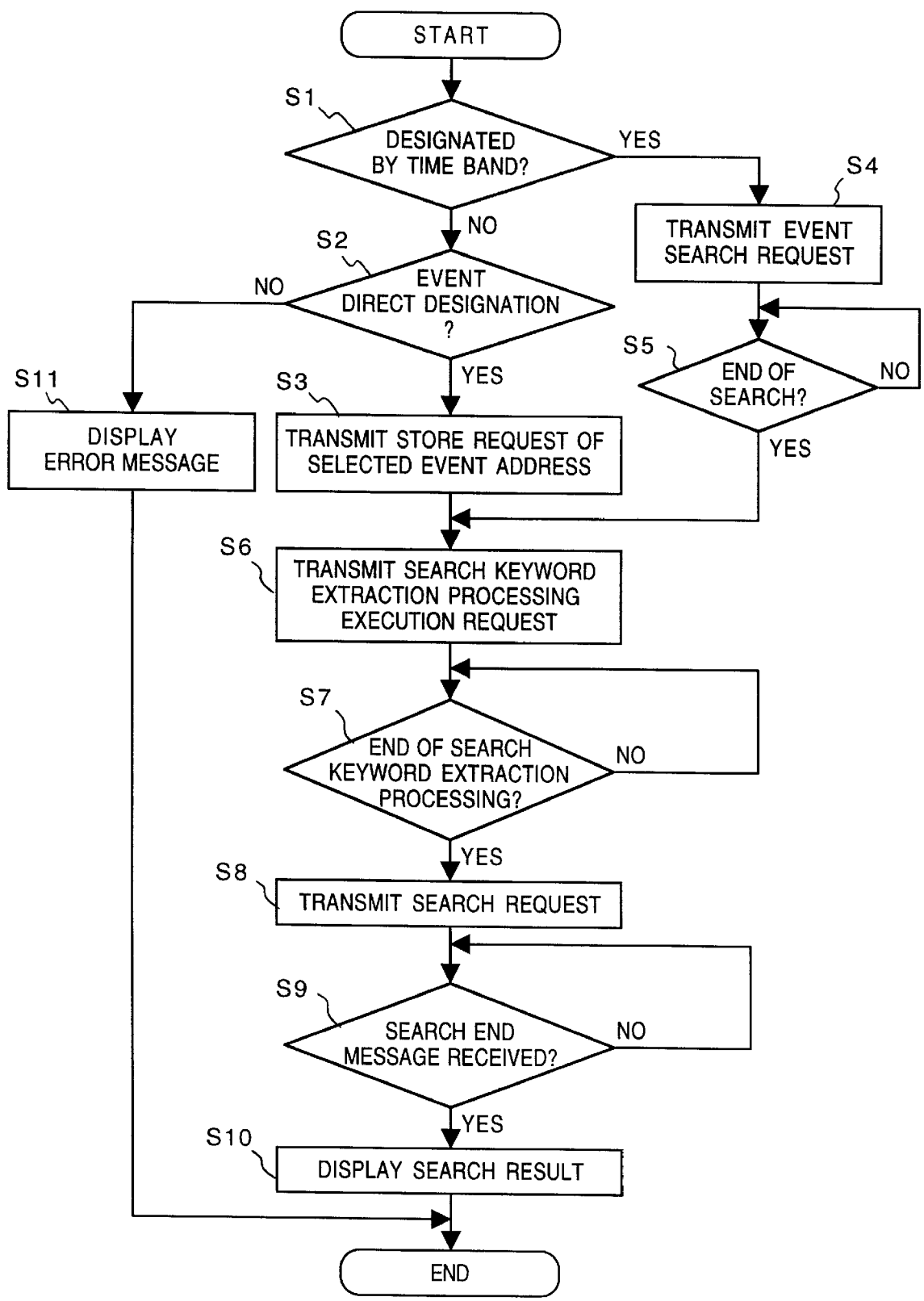
FIG. 8 is a flow chart for explaining the processing sequence executed by a processing management means when a user inputs a search request in the information equipment according to the first embodiment of the present invention.

When the user clicks the Find MM Data button using the input device 106, the processing management means 601 starts the processing from step S1 in accordance with the sequence shown in FIG. 8 upon reception of a message indicating the depression of the Find MM Data button.

In step S1, the processing management means 601 looks up the status storage area 701 in FIG. 2 to check if the current selection is designated by a time band. If YES in step S1, the flow advances to step S4. If NO in step S1, the flow advances to step S2. In this embodiment, a time band is expressed like "from certain time to another time". For example, the selected state designated by a time band corresponds to a state wherein a certain date is selected by the frame 206 on the GUI1 shown in FIG. 4. More specifically, in FIG. 4, since "Mar. 24, 1994" is selected, a time band from time: 0:00:00 on Mar. 24, 1994 to time: 23:59:59 on Mar. 24, 1994 is designated, and all events including arbitrary times within this time band are selected. Note that the words "event includes certain time" are defined to mean:

if time 1 of event $1 \leq A \leq$ time 2 of event 1,
then,
  event 1 includes time A.

Also, it is defined herein that "time band A includes event 1" if arbitrary time t within the time band A is included in event 1.

In step S2, the processing management means 601 inquires the schedule management means 605 as to whether or not the current selection is selected by directly designating an event. The schedule management means 605 looks up the status storage area 701 to check if the current selection is selected by event direct designation, and returns the result to the processing management means 601. Upon reception of the result, the processing management means 601 advances the processing to step S3 if the current selection is designated by event direct designation. Note that the event direct designation is the way of selection for directly selecting at least one event by designating its event name. In this embodiment, on the GUI2 in FIG. 5, the event selected by the selection frame 302 (in FIG. 5, the event with event name "Visit Mitsutomo company" is selected by event direct designation.

If the decision result in step S2 is "NO", the flow advances to step S1 and the processing management means 601 transmits a display request message of an error message to the display means 604 since an object to be searched cannot be specified. Then, the processing management means 601 ends the processing sequence upon reception of the message indicating the depression of the Find MM Data button.

On the other hand, when the current selection is designated by a time band and the flow advances to step S4, the processing management means 601 transmits a message indicating a search request of events included within the designated time band to the schedule management means 605. Upon reception of the message indicating the event search request, the schedule management means 605 searches the event object storage area 703 for events included in the designated time band. The schedule management means 605 stores all the pointers to found events in the event object pointer storage area 704, and then transmits a message indicating the end of search to the processing management means 601.

On the other hand, after the processing management means 601 transmits the search request message in step S4, it enters a loop for checking if the message indicating the end of search is received from the schedule management means 605, in step S5. If no message indicating the end of search is received, the means 601 executes processing in step S5 again; upon reception of the message indicating the end of search, the flow advances to step S6.

When an event is directly designated and the flow advances to step S3, the processing management means 601 transmits, to the schedule management means 605, a message for requesting it to store the pointer to the event which is in the selected state by the event direct designation in the event object pointer storage area 704. The flow then advances to step S6, and the processing management means 601 transmits a message indicating an execution request of search keyword extraction processing to the search keyword extraction means 611. Thereafter, the processing management means 601 checks in step S7 if a message indicating the end of search keyword extraction processing is received. If NO in step S7, the flow returns to step S7; otherwise, the flow advances from step S7 to step S8.

The search keyword extraction processing sequence by the search keyword extraction means 611 will be described in detail below with reference to the flow chart in FIG. 9 and the memory map shown in FIG. 2.

Upon reception of the message indicating the execution request of the search keyword extraction processing from the processing management means 601, the search keyword extraction means 611 substitutes "0" in a variable (Count) for counting the number of extracted characters (extracted keywords) in step S21 (in this embodiment, since all words extracted from a string of an event object are processed as extracted keywords, extracted word=extracted keyword). The flow then advances to step S22, and the search keyword extraction means 611 looks up the event object list in the event object pointer storage area 704 in FIG. 2 to check if non-processed events remain. If NO in step S22, the flow advances to step S30, thus ending the search keyword extraction processing.

On the other hand, if YES in step S22, the flow advances to step S23, and the extraction means 611 acquires a pointer to the next event object to be processed (an event to be processed). The flow advances to step S24, and the extraction means 611 acquires a pointer to the start character of an event name character string of the event to be processed and sets the acquired pointer in P1. More specifically, the pointer P1 is one for designating the address of a character expressed by 1 byte. Also, symbols P2 and P3 to be used later also indicate pointers to characters. The flow then advances to step S25, and the extraction means 611 executes word extraction processing shown in the flow chart in FIG. 10.

In the word extraction processing, the extraction means 611 substitutes the value of a pointer P2 in a variable P3 in step S31. Note that the pointer P2 indicates the start address of a continuous area TempStrMem for holding 50 characters. Note that the capacity of the area TempStrMem corresponds to 50 characters in this embodiment. However, the present invention is not limited to this memory capacity, and the memory capacity may correspond to 100 or 200 bytes, or the like. That is, the capacity of the area TempStrMem need only be large enough to store a maximum number of characters as the number of characters in a character string used as a keyword. In this embodiment, since this capacity corresponds to 50 bytes, a keyword that can be extracted is limited to a character string consisting of 50 characters or less.

The flow advances to step S32 to check if a character indicated by the current pointer P1 corresponds to one of capital letters "A to Z" and small letters "a to z". If YES in step S32 (if the character indicated by the pointer P1 is one of "A to Z" and "a to z"), the flow advances to step S33, and the extraction means 611 copies the character indicated by the pointer P1 to a memory address indicated by the pointer P3. The flow advances to step S34, and the pointer P3 is incremented by 1.

On the other hand, if NO in step S32, the flow advances to step S35 to check if P3==P2. If YES in step S35, the flow advances to step S38; otherwise, the flow advances to step S36. In step S36, after the extraction means 611 performs processing for incrementing the counter Count by +1 (Count=Count+1) (after the counter of a word to be extracted is incremented by 1), it copies a character string between the pointers P2 and P3 to an area having a start address indicated by pointer P2+(Count×50). Then, the means 611 adds a NULL character (a code indicating the end of a character string) to the end of the character string. The flow advances to step S37 to substitute the value of the pointer P2 in the pointer P3 (P3=P2) to restore the value of the pointer P3 to indicate the start address of the area TempStrMem, thus preparing for the next word extraction.

The flow advances to step S38 to check if the pointer P1 indicates the last character of the string. If NO in step S38, the flow advances to step S39, and the pointer P1 is incremented by one by setting the pointer P1=P1+1. Thereafter, the flow returns to step S32 to extract the next word.

On the other hand, if YES in step S38, the flow advances to step S40 to check if P3==P2. If YES in step S40, the processing ends; otherwise, the flow advances to step S41 to perform the same processing as in step S36 above. Thereafter, the value of the pointer P2 is substituted in the pointer P3 in step S42, thus ending the processing.

Note that the first embodiment has exemplified word extraction for English text data. However, the first embodiment is not limited to this, and any other word extraction methods suitable for other languages may be used.

Figure 10:
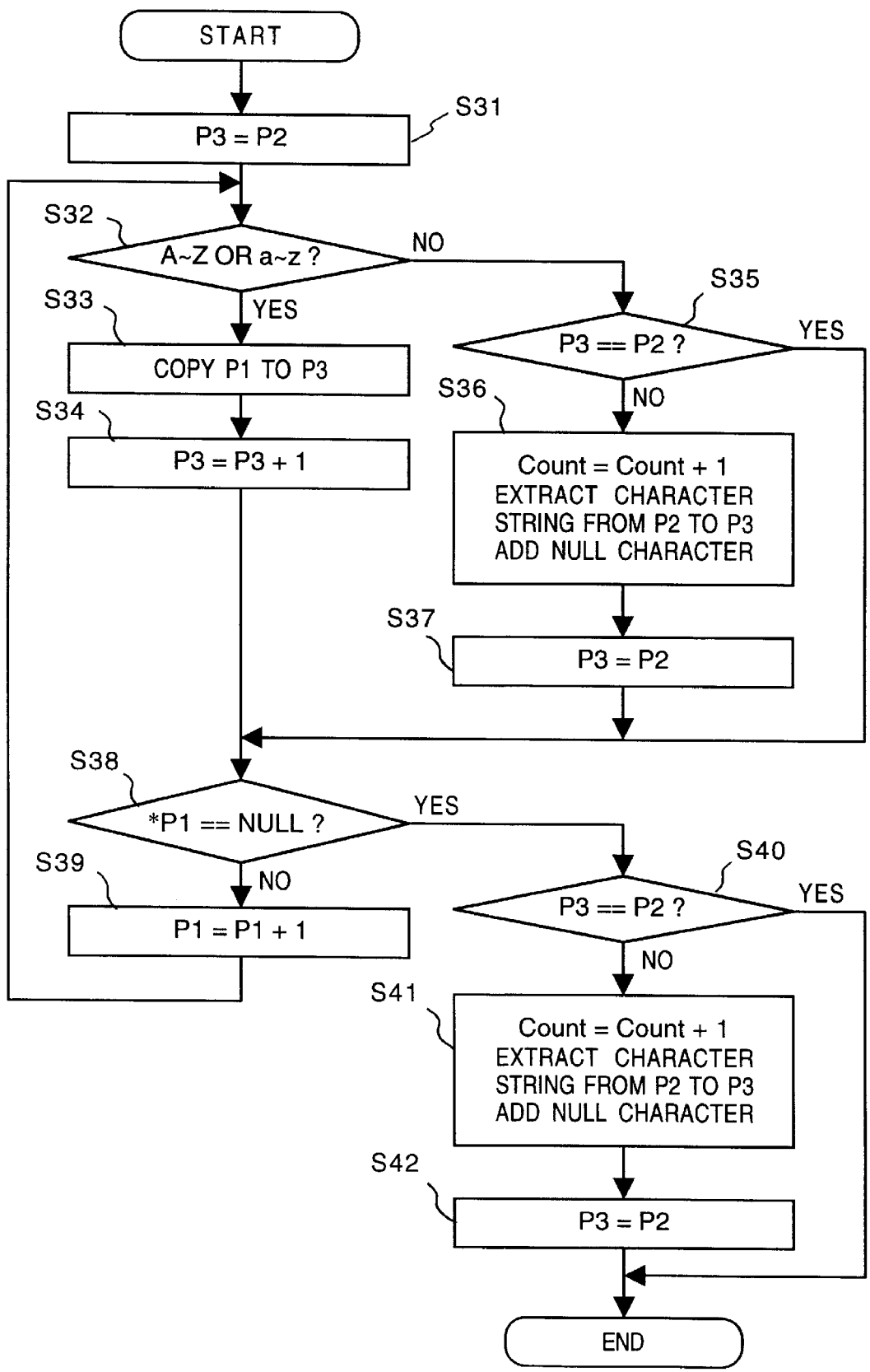
FIG. 10 is a flow chart for explaining the processing sequence of word extraction processing in the information equipment according to the first embodiment of the present invention.

As described above, after the word extraction processing is executed in step S25 in accordance with the processing sequence shown in the flow chart of FIG. 10, the extraction means 611 acquires the start character address of a character string in the "location" field of the event to be processed, and sets the acquired address in the pointer P1, in step S25. In step S27, word extraction processing similar to that in step S25 is executed.

The flow advances to step S28, and the extraction means 611 acquires the start character address of a character string in the "details" field of the event to be processed and sets the acquired address in the pointer P1. The flow then advances to step S29, and word extraction processing similar to that in step S25 is executed. Upon completion of these processing operations, the flow returns to step S22 to check, with reference to the event list, if non-processed event remain. If no non-processed event remains, the flow advances to step S30, and the extraction means 611 sends a message indicating the end of the search keyword extraction processing to the processing management means 601. Thereafter, the processing ends.

At this time, all the words included in character strings in "event name", "location", and "details" fields of all the events selected by the user by designating a time band or all the events designated by event direct designation are extracted, and are listed in the extracted keyword list 706 as extracted keywords.

Figure 9:
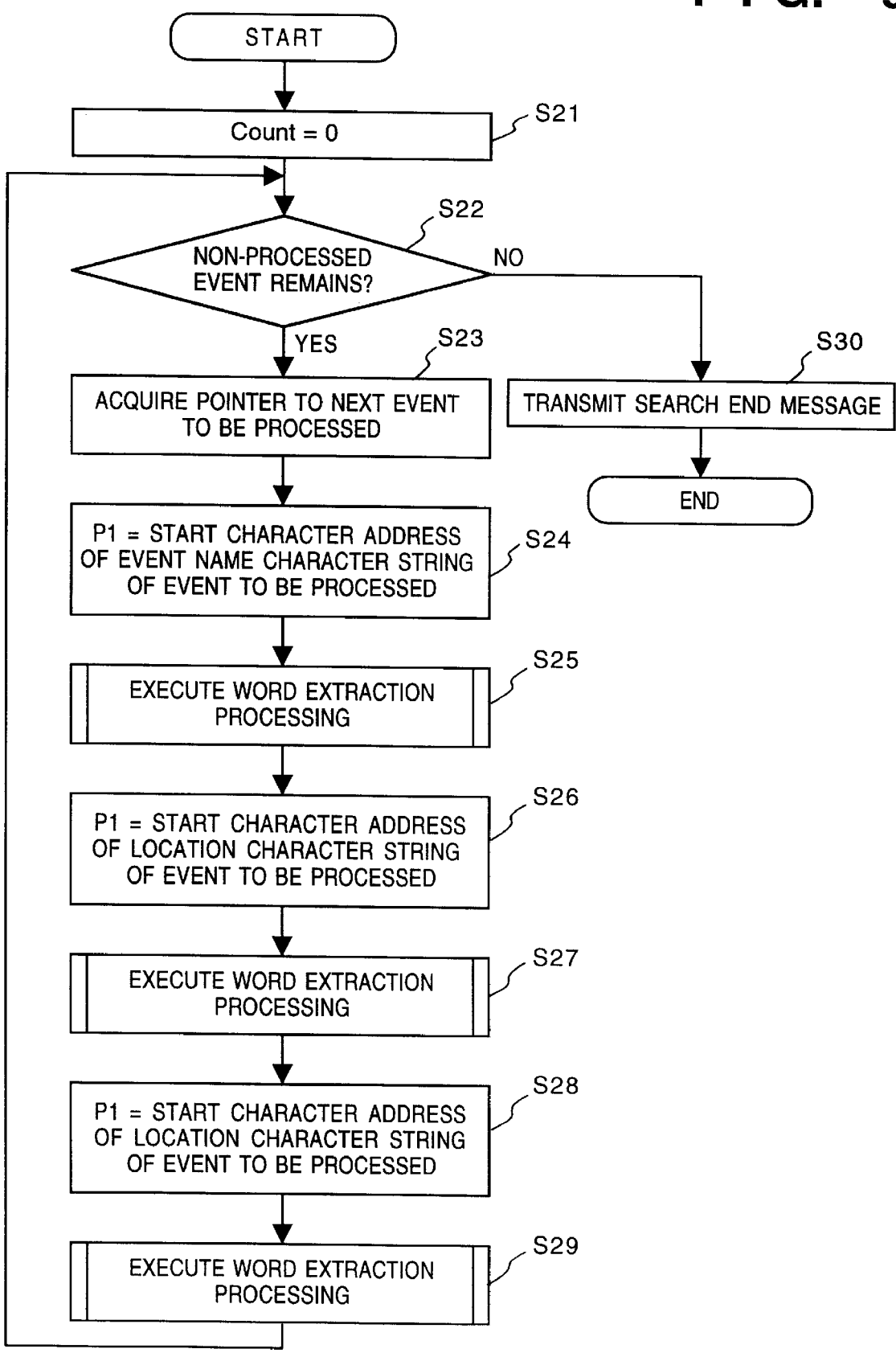
FIG. 9 is a flow chart for explaining the sequence of search keyword extraction processing in the information equipment according to the first embodiment of the present invention.

In this manner, upon completion of the processing sequence shown in the flow chart in FIG. 9, "YES" is determined in step S7 in FIG. 8, and the processing management means 601 advances its processing to step S8. In step S8, the processing management means 601 sends, to the multimedia data file search means 608, a message for requesting it to search for required multimedia data using the keywords listed in the extracted keyword list 706. Thereafter, in step S9, the means 601 checks if it receives a message indicating the end of media data file search processing from the multimedia data file search means 608. The processing in step S9 is repeated until the message is received. Upon reception of the message, the flow advances to step S10, and the means 601 displays the search result using the display means 604.

Upon reception of the search request from the processing management means 601, the multimedia data file search means 608 performs a keyword search operation from the multimedia data file storage means 609 using the keywords listed in the extracted keyword list 706, and stores the paths and file names of multimedia data files obtained as the search result in the search result file name storage area 702 (FIG. 2). Thereafter, the means 608 transmits a message indicating the end of the multimedia data file search processing to the processing management means 601, and ends the processing. A detailed description of the multimedia data file search processing by the multimedia data file search means is omitted in this embodiment, but may be performed in accordance with the processing sequence of a conventional database software program which performs a keyword search operation.

Upon reception of the message indicating the end of search from the multimedia data file search means 608, the flow advances to step S10, and the processing management means 601 displays multimedia data listed as the search results in the search result file name storage area 702 on the GUI4 in FIG. 7. As described above, after multimedia data is displayed in correspondence with user's inputs for the PrevInfo and NextInfo buttons 505 and 506, when the user depresses the Quit button 504, the search result file display processing in step S10 ends, thus ending the processing sequence shown in the flow chart in FIG. 8.

[Second Embodiment]

Figure 11:
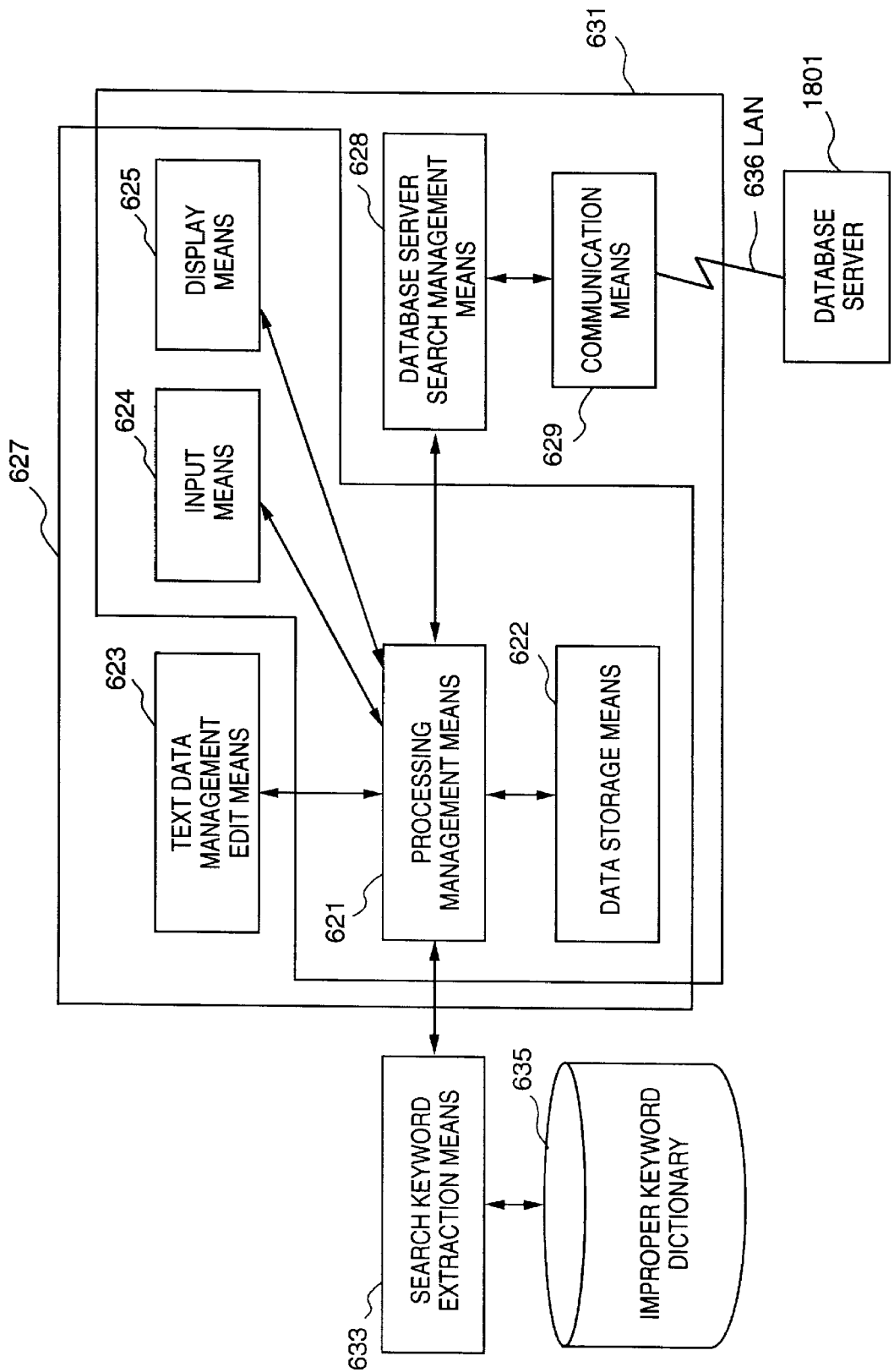
FIG. 11 is a functional block diagram showing the respective means as logic blocks arranged in an information equipment according to the second embodiment of the present invention.

FIG. 11 is a block diagram showing the functional arrangement of an information equipment according to the second embodiment of the present invention.

The information equipment according to the second embodiment of the present invention is connected to a database server 1801 via a LAN (local area network) 636, and serves as a client which can request the database server 1801 to perform a search via the LAN 636. Since the information equipment of this embodiment comprises a search keyword extraction means 633 and an improper keyword dictionary 635 in addition to a text data management edit means 623 and a database server search management means 628, a user can use the database server 1801 to search for a required multimedia data file without inputting any words included in text data which is being edited, and can observe the contents of a file displayed as a search result.

Since a search operation is performed based on only proper keywords by looking up the improper keyword dictionary 635, the traffic on the LAN 636 can be reduced, and the load on the database server 1801 can be reduced. In the second embodiment, the symbols use the expressions of C language as in the first embodiment.

The user normally utilizes the information equipment of the second embodiment as a wordprocessor, and requests this information equipment to perform a search by designating a character string with an arbitrary length managed by the wordprocessor, as needed. In response to this request, the information equipment automatically extracts search keywords from the character string, uses the database server on the LAN 636 to search for desired multimedia data, and displays the search result on a display means 625.

Figure 12:
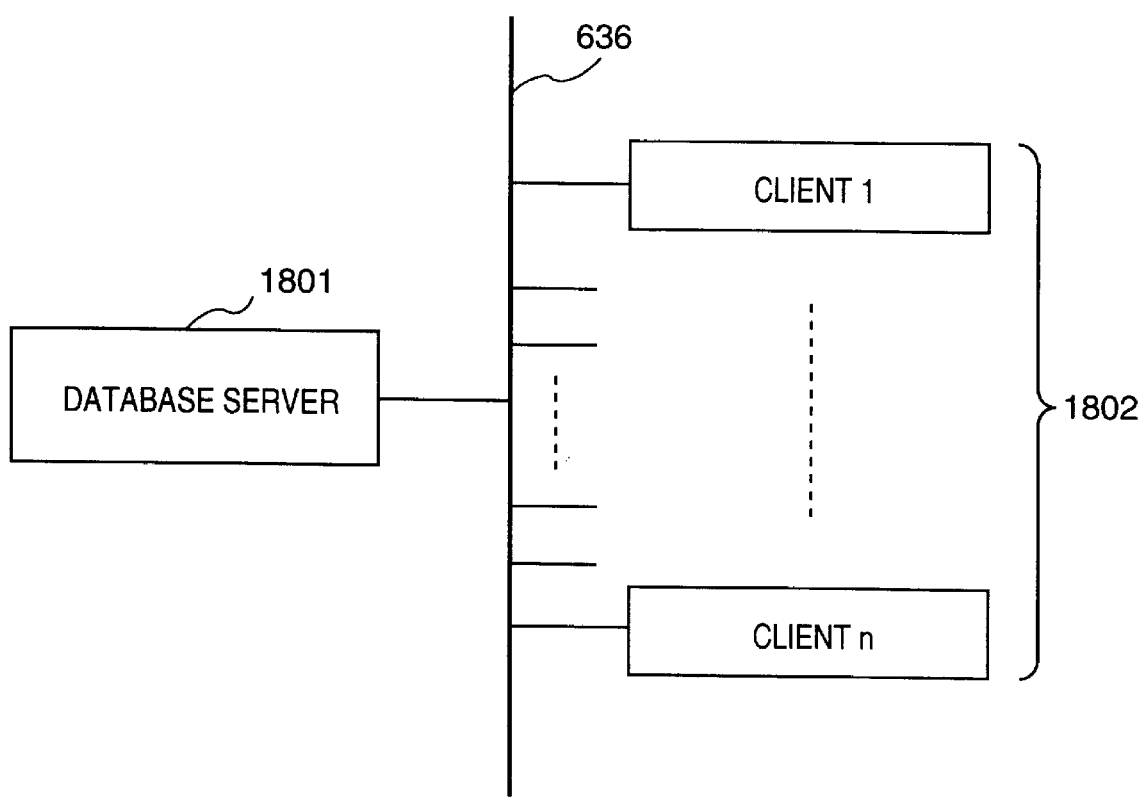
FIG. 12 is a diagram showing the arrangement of a LAN in the second embodiment of the present invention.

FIG. 12 shows a state wherein the database server 1801 and a plurality of clients 1802 are connected via the LAN 636.

Assume that the information equipment of the second embodiment is connected to the LAN 636 as one of the plurality of clients 1802. The database server 1801 stores a large volume of multimedia data. Upon reception of a multimedia data search request from the client 1802 together with keywords, the database server 1801 searches for multimedia data corresponding to the keywords, and transmits the searched data to the client. In the second embodiment, the server and clients constitute the LAN 636, as shown in FIG. 12. However, the arrangement of the LAN 636 is not particularly limited as long as the information equipment of this embodiment can exchange information with the database server 1801 via a communication path.

Figure 13:
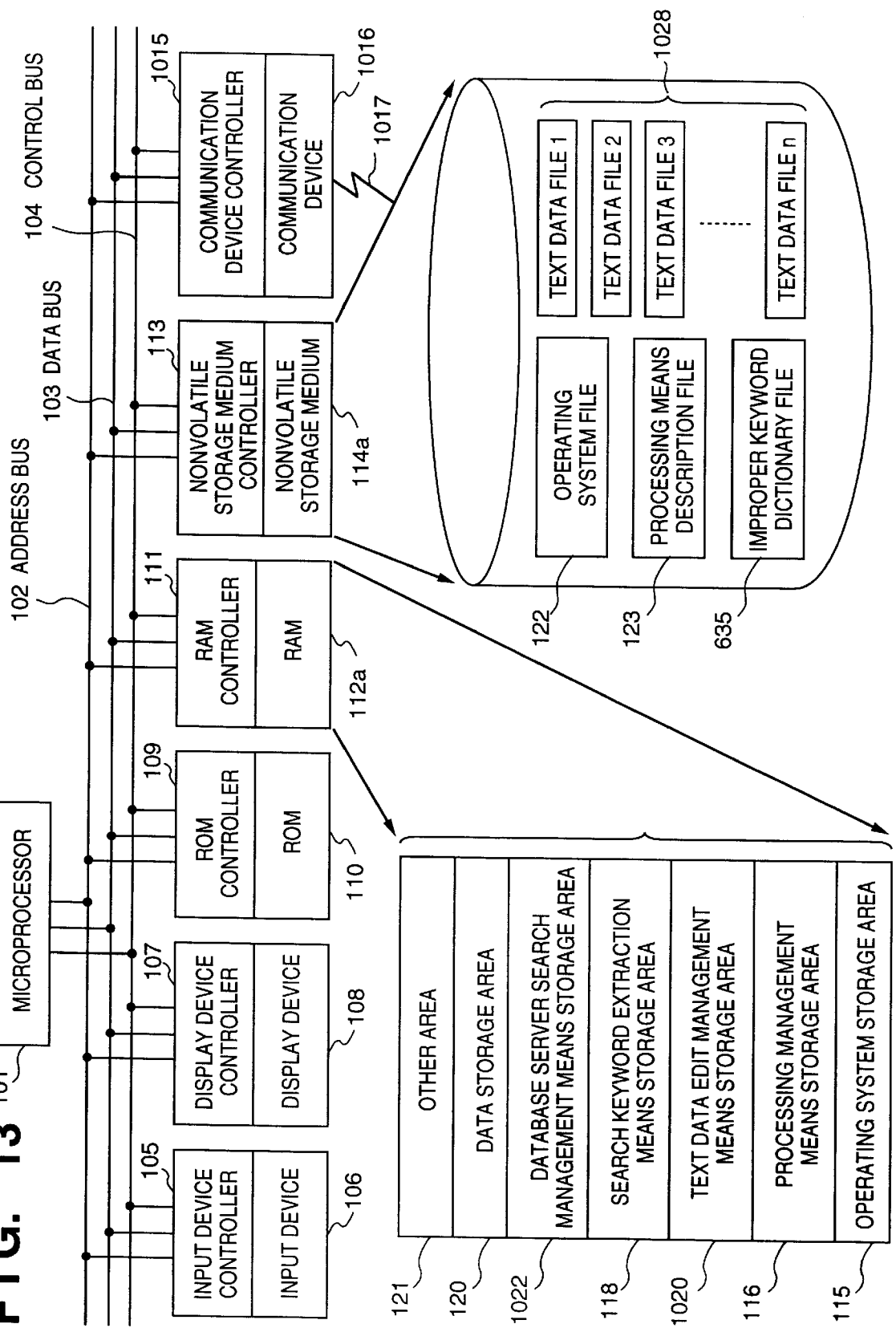
FIG. 13 is a block diagram showing the basic arrangement of the information equipment according to the second embodiment of the present invention.

FIG. 13 is a block diagram showing the functional arrangement of the information equipment according to the second embodiment. The same reference numerals in FIG. 13 denote the same parts as in FIG. 1, and a detailed description thereof will be omitted.

Referring to FIG. 13, reference numeral 114a denotes a nonvolatile storage medium, which stores an operation system file 122 that describes an operating system for systematically managing this information equipment, a processing sequence description file 123 that describes processing sequences to be executed when the information equipment performs text edit management, keyword extraction, and database server search, the improper keyword dictionary file 635 used upon execution of search keyword extraction processing, and text data files 1 to n (1028) as edit results of texts of the user. A RAM 112a comprises an operating system storage area 115, a processing management means storage area 116, a text data edit management means storage area 1020, a search keyword extraction means storage area 118, a database server search management means storage area 1022, a data storage area 120, and an area 121 for other data. Reference numeral 1016 denotes a communication device which exchanges data and command with the database server 1801 via the LAN 636. Reference numeral 1015 denotes a communication device controller for controlling the communication device 1016.

Figure 14A:
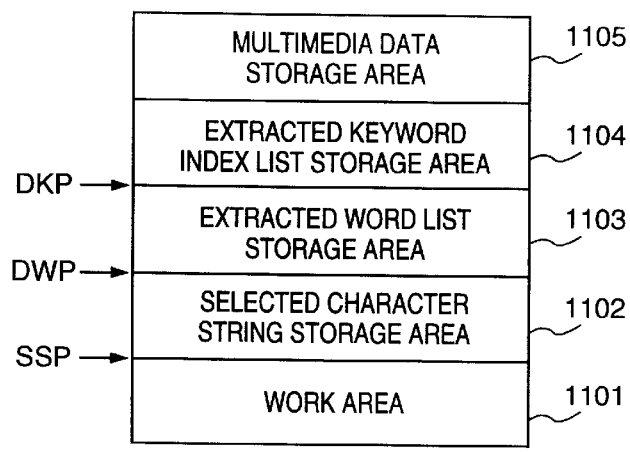
FIGS. 14A to 14C show the memory maps for explaining in detail data storage areas in the second embodiment.

FIG. 14A shows the detailed memory map on the data storage area 120 in the information equipment according to the second embodiment of the present invention.

Referring to FIG. 14A, reference numeral 1101 denotes a work area used by the respective means of the information equipment. Reference numeral 1102 denotes a selected character string storage area, which stores a character string selected by the user using an input device 106, and has a capacity large enough to store text data with a sufficient length as that of text data which is to be edited by the user at one time. In the second embodiment, the selected character string storage area 1102 has a 1-Mbyte memory space, and has a start address SSP. At the end of the selected character string in this area 1102, a NULL character as a special symbol indicating the end of the character string is added. Reference numeral 1103 denotes an extracted word list storage area.

Figure 14B:
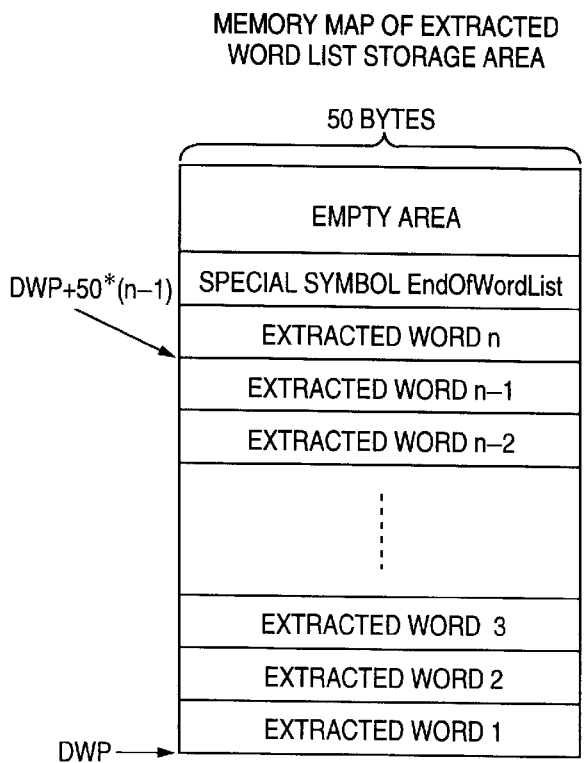

FIG. 14B shows the detailed memory map of the extracted work list storage area 1103.

The extracted work list storage area 1103 stores a list of words extracted from the selected character string, as shown in FIG. 14B, and has a memory space for 50 characters for each extracted word. The area 1103 has a start address DWP, and a special symbol "EndOfWordList" is stored at the end of the extracted word list. In the second embodiment, since one character is expressed by one byte, addressing to a character by a pointer P1 which is used later as a pointer variable to a character is performed in units of bytes.

Figure 14C:
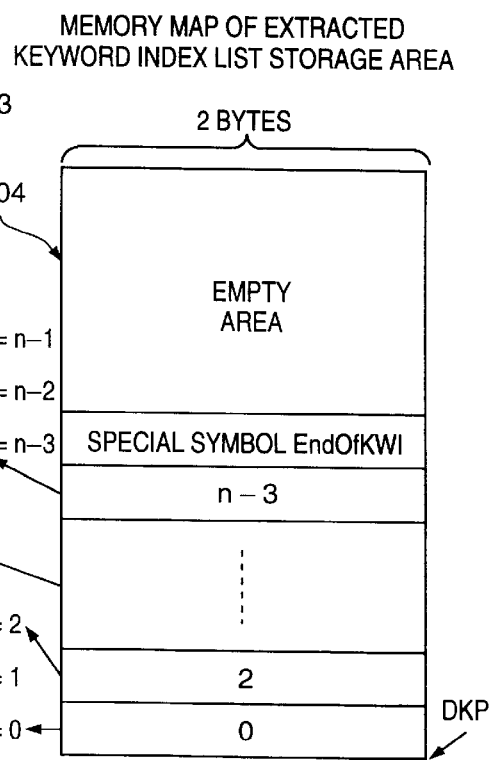

FIG. 14C shows the memory map of an extracted keyword index list storage area 1104, which stores indices (integer values each expressed by 2 bytes) of words, which are determined to be used as keywords in the extracted word list, in the form of a list. The area 1104 has a start address DKP, and a special symbol "EndOfKWI" indicating the end of the list is stored at the end of the list. Reference numeral 1105 denotes a multimedia data storage area, which stores multimedia data received via a communication means as a result of a search based on the extracted keywords.

FIG. 11 is a functional block diagram showing the respective means arranged in the information equipment of the second embodiment as logic blocks. In the second embodiment as well, the respective means operate under the control of a multitask operating system, and messaging (exchange of messages) with arguments between the means is also performed via the operating system.

Referring to FIG. 11, messages from the respective processing means are concentrically managed by a processing management means 621 stored in the processing management means storage area 116 shown in FIG. 13, and the processing management means 621 transmits an appropriate message to appropriate processing means in accordance with a message from each means, thereby managing the processing order of the respective processing means. Reference numeral 622 denotes a data storage means corresponding to the data storage area 120. All the means shown in FIG. 11 can read/write data to/from the data storage means via the operating system. An input means 624 comprising an input device controller 105 and the input device 106 receives an input from the user and transmits input information to the processing management means 621. A display means 625 which has a display device controller 107 and a display device 108 displays various kinds of information in appropriate display formats in accordance with a request from the processing management means 621. A text data management edit means 623 stored in the text data edit management means storage area 1020 manages the edit operation of text data by the user, and can store or read out text data to or from a text data storage means 626 as a nonvolatile storage medium.

A block 627 including the above-mentioned means 621 to 625 realizes a function of a conventional wordprocessor.

Reference numeral 1801 denotes a database server, which is connected to the information equipment of this embodiment via the LAN 636 (with and without wires). Reference numeral 629 denotes a communication means, which comprises the communication device 1016 and the communication device controller 1015. Reference numeral 628 denotes a database server search management means, which controls the communication means 629 on the basis of the agreements with the database server 1801 and transmits a search request to the database server 1801 using keywords designated by the processing management means 621. Also, the means 628 receives the obtained search result file from the database server 1801, and supplies the result to the processing management means 621.

A block including the above-mentioned means 621, 622, 624, 625, 628, 629, and 636 is a means that is possessed by a conventional database client machine, and realizes a function of the conventional database client machine.

An improper keyword dictionary 635 shown in FIG. 13 is one for words which are improper as keywords used in a search. In this embodiment, words having parts of speech such as an adjective, verb, adverb, preposition, conjunction, auxiliary verb, interjection, pronoun, prefix, suffix, connective, compound element, definite article, indefinite article, abstract noun, and the like are determined as those which are improper as keywords, and words belonging to these parts of speech are described as a dictionary. In the second embodiment, words belonging to the above-mentioned parts of speech are determined as improper words to be used as keywords. However, if there is an improper word used as a keyword in another part of speech, e.g., in a common noun, it may be registered in the dictionary 635. Reference numeral 633 denotes a search keyword extraction means. Upon reception of text data (character string), the means 633 extracts words from the character string and generates an extracted word list. The means 633 then looks up the improper keyword dictionary 635 to search the extracted word list for a word (or words) which is (or are) not registered in the improper keyword dictionary, and registers the searched word (or words) in the extracted keyword index list (FIG. 14C) as a keyword (or keywords) extracted from the character string.

Figure 15:
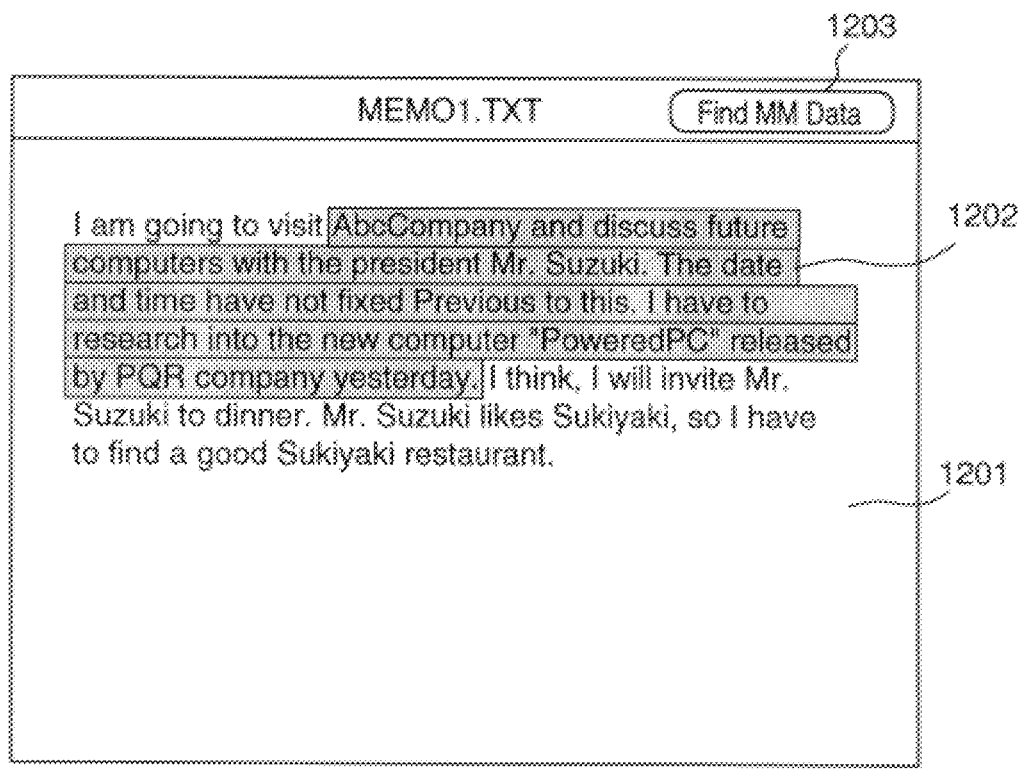
FIG. 15 is a view showing an example of a text data edit user interface in the information equipment according to the second embodiment of the present invention.

FIG. 15 shows an example of a user interface displayed on the display device 108 when the user edits text data using the information equipment of the second embodiment.

Referring to FIG. 15, reference numeral 1201 denotes a text field used by the user to input a text. A gray portion 1202 in the text field indicates that a character string is in a selected state. The user can set a character string in the selected state by dragging the mouse cursor in the text field. Reference numeral 1203 denotes a Find MM Data button. By clicking this button 1203, the user can instruct the information equipment to start a search operation.

The operation of the second embodiment will be described in more detail below with reference to FIGS. 11 to 19.

When the user turns on the power switch of the information equipment, an initialization program stored in a ROM 110 is executed. Upon completion of initialization processing required for this information equipment, the operating system file 122 is loaded onto the operating system storage area 115, and the control waits for an event input by the user. Assuming that the user requests to use a function of the information equipment using the input device 106, the operating system loads the processing sequence description file 123, develops it into the processing management means 621, the text data edit management means 623, the search keyword extraction means 633, and the database server search management means 628 (FIG. 11), and stores these means in the processing management means storage area 116, the text data edit management means storage area 1020, the search keyword extraction means storage area 1021, the database server management means storage area 1022, respectively. At this time, the respective means stored in these areas are validated on the information equipment of the second embodiment as means for performing transmission/reception of messages and their predetermined processing operations.

For the sake of simplicity, the following explanation will be given mainly using the functional arrangement shown in FIG. 11. The respective means shown in FIG. 11 are realized by the arrangement shown in FIG. 13. The correspondence between the respective means shown in FIG. 11 and the arrangement shown in FIG. 13 will be described later as needed.

When the initialization sequence has ended and the respective means shown in FIG. 11 are validated, this information equipment waits for an input from the user. When the user requests to edit a text data file selected from the text data files 1 to n (1028) using the input means 624, the text data of the selected file is displayed on the user interface as shown in FIG. 15 by the display means 625. When the user selects a character string with an arbitrary length from the displayed text data by the dragging operation of the mouse, and clicks the Find MM Data button 1203, the information equipment of this embodiment automatically extracts a keyword (or keywords) from the selected character string, and uses the database server 1801 to search for required multimedia data using this keyword (or these keywords).

The operation of the information equipment of the second embodiment executed when the user issues a search request by clicking the Find MM Data button 1203 using the mouse will be described in detail below with reference to FIGS. 11 to 19.

When the user clicks the Find MM Data button 1203 using the mouse of the input means 624, the input means 624 supplies a message indicating this information to the processing management means 621. Upon reception of this message, the processing management means 621 performs processing in accordance with the flow chart shown in FIG. 16.

In step S51, the processing management means 621 transmits a message indicating an execution request of search keyword extraction processing to the search keyword extraction means 633. The flow advances to step S52 to check if a message indicating the end of the search keyword extraction processing is received. If YES in step S52, the flow advances to step S53.

The processing sequence for extracting a search keyword by the search keyword extraction means 633 will be described below with reference to the flow chart in FIG. 17 and the memory maps shown in FIGS. 14A to 14C.

Figure 19:
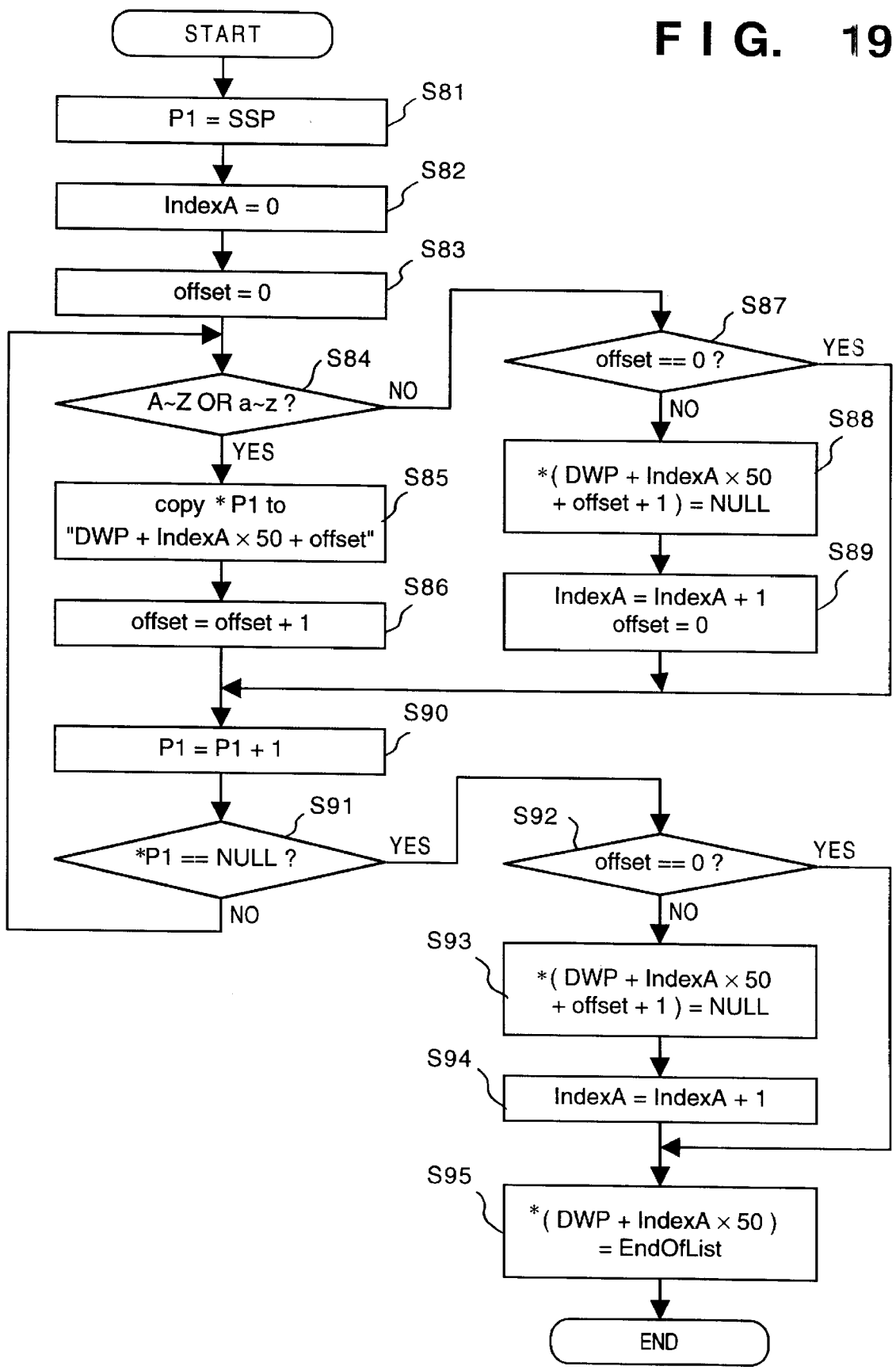
FIG. 19 is a flow chart for explaining the processing sequence of word extraction processing in the second embodiment of the present invention.

Upon reception of the message indicating the execution request of the search keyword extraction processing from the processing management means 621, the search keyword extraction means 633 executes word extraction processing, as shown in the flow chart in FIG. 19, in step S61.

In the word extraction processing, in step S81, the extraction means 633 substitutes SSP as the start address of the selected character string storage area 1102 in a pointer variable P1 to a character as an initial value. The flow advances to step S82, and the extraction means 633 substitutes "0" as an initial value in an integer type variable IndexA expressed by 16 bits. The flow then advances to step S83, and the means 633 substitutes "0" in a variable offset. Note that the variable offset is an integer type variable, and can be subjected to an addition/subtraction with a character type pointer. For example, (DWP+offset) serves as a pointer indicating a memory byte position ahead of DWP by the number of bytes indicated by the variable offset. In decision step S84, the means 633 checks if the character at the address indicated by the pointer P1 is one of characters "a to z" and "A to Z". If NO in step S84, the flow advances to step S87.

On the other hand, if YES in step S84, the flow advances to step S85, and the extraction means 633 copies the contents of the address indicated by the pointer P1 to an address "DWP+IndexA×50+offset". The flow then advances to step S86, and the contents of the variable offset are incremented by 1 (offset=offset+1).

On the other hand, if it is determined in step S84 that the character at the address indicated by the pointer P1 is none of characters "a to z" and "A to Z", the flow advances to step S87 to check if the value of the variable offset is "0". If YES in step S87, the flow advances to step S90; otherwise, the flow advances step S88, and the means 633 substitutes a Null character (a special symbol indicating the end of a character string) at an address "DWP+IndexA×50+offset+1". The flow then advances to step S89 to increment IndexA by 1 (IndexA=IndexA+1) and also substitute "0" in the variable offset. Thereafter, the flow advances to step S90.

The means 633 increments the pointer P1 by 1 (P1=P1+1) in step S90, and checks in step S91 if the contents at the address indicated by the contents of the pointer P1 correspond to a Null character. If NO in step S91, the flow returns to step S84 to execute the above-mentioned processing. On the other hand, if YES in step S91, i.e., if the contents at the address indicated by the contents of the pointer P1 correspond to a Null character (at the end of the character string), the flow advances to step S92 to check if the value of the variable offset is "0". If YES in step S92, the flow advances to step S95; otherwise, the flow advances to step S93, and the means 633 substitutes a Null character at an address "DWP+IndexA×50+offset+1". The flow then advances to step S94 to increment the variable IndexA by 1. The flow advances to step S95 to substitute a special symbol (EndOfWordList) indicating the end of the list at an address "DWP+IndexA×50", thus ending the word extraction processing shown in FIG. 19.

Figure 17:
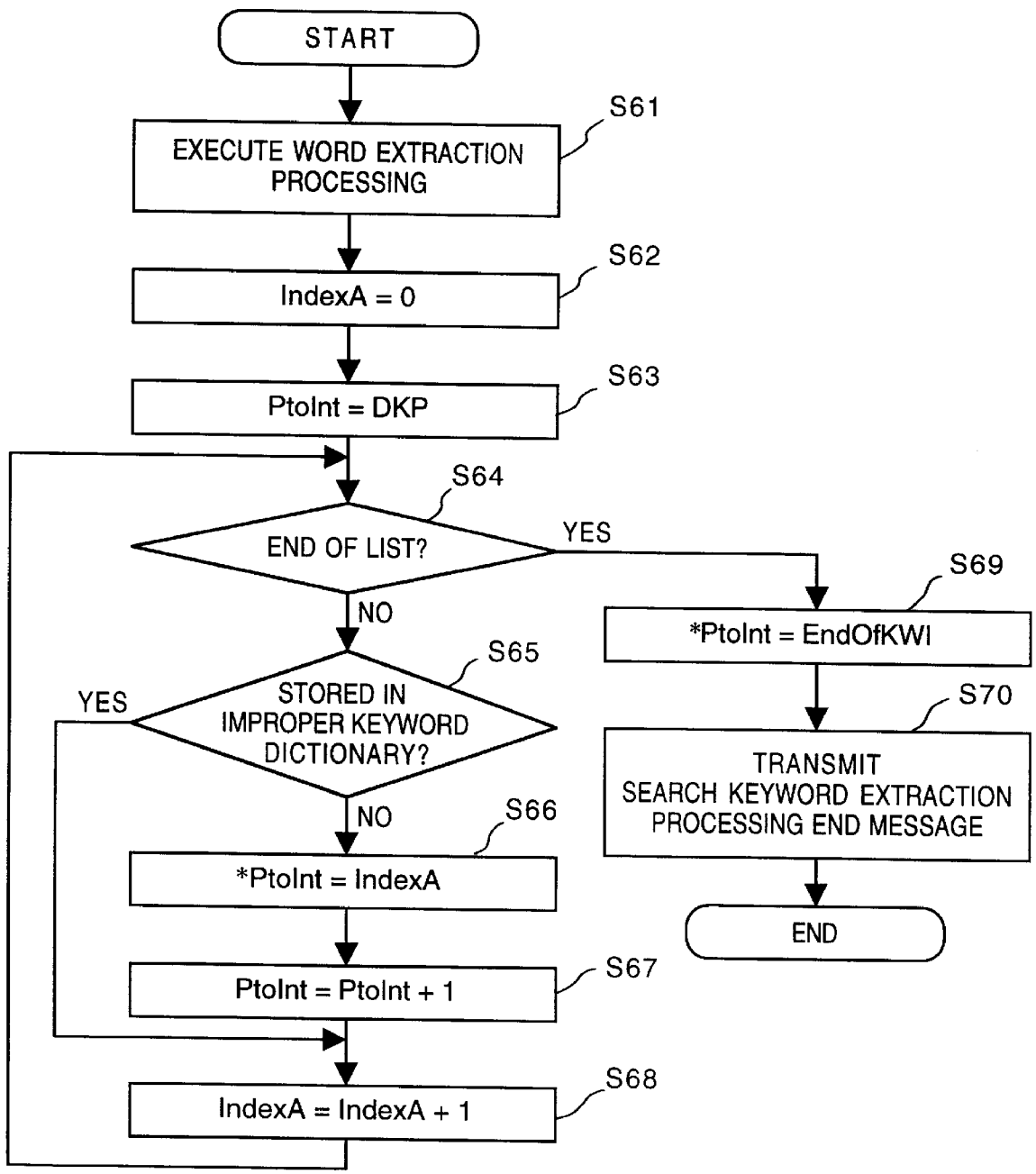
FIG. 17 is a flow chart for explaining the sequence of search keyword extraction processing in the second embodiment of the present invention.

Upon completion of the word extraction processing shown in the flow chart in FIG. 19 in step S61 in FIG. 17, the flow advances to step S62 to substitute "0" as an initial value in the 16-bit integer type variable IndexA. The flow then advances to step S63 to substitute DKP as an initial value in an integer type pointer variable PtoInt expressed by 16 bits. The flow advances to step S64 to check if the contents at the memory address indicated by "DWP+IndexA×50" correspond to the special symbol "EndofWordList" indicating the end of the word extraction list. If YES in step S64, the flow advances to step S69; otherwise, the flow advances to step S65.

In step S65, the extraction means 633 looks up the improper keyword dictionary 635 to check if a word which is the same as a character string from "DWP+IndexA×50" to the Null character (i.e., an extracted word indicated by the variable IndexA in the extracted word list) is registered in the improper keyword dictionary 635. If YES in step S65, the flow advances to step S68; otherwise, the flow advances to step S66 to substitute the value of the variable IndexA at the memory address PtoInt. Thus, the extracted word indicated by the variable IndexA is registered as the extracted keyword. The flow advances to step S67 to increment the point PtoInt by 1, and the flow advances to step S68. In step S68, the variable IndexA is incremented by 1, and the flow returns to step S64.

On the other hand, if the end of the list is determined in step S64, the flow advances to step S69 to substitute a special symbol "EndOfKWI" indicating the end of the extracted keyword index list at an address indicated by the pointer PtoInt. The flow advances to step S70, and the extraction means 633 supplies a message indicating the end of the search keyword extraction processing to the processing management means 621, thus ending the search keyword extraction processing by the search keyword extraction means 633 shown in the flow chart in FIG. 17.

Figure 16:
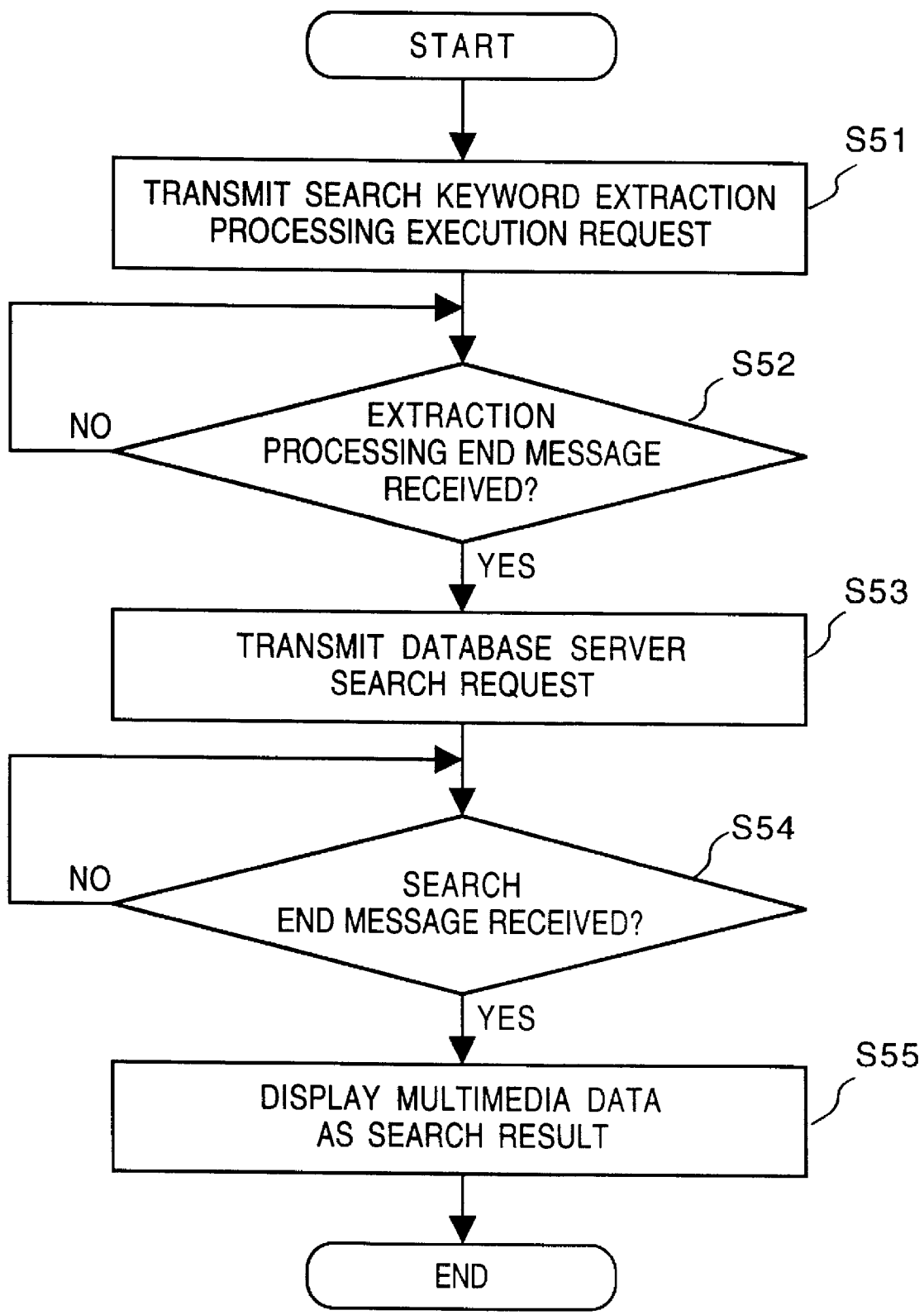
FIG. 16 is a flow chart for explaining the processing sequence executed by a processing management means when a user inputs a search request in the information equipment according to the second embodiment of the present invention.

Upon completion of the search keyword extraction processing by the search keyword extraction means 633, YES is determined in step S52 in the flow chart in FIG. 16, and the flow advances to step S53. In step S53, the processing management means 621 transmits a message indicating an execution request of a database search using the extracted keyword (or keywords) to the database server search management means 628. In step S54, the means 621 checks if a message indicating the end of database search is received from the database server search management means 628. If YES in step S54, the flow advances to step S55 and the means 621 displays multimedia data as the search result on the display means 625.

The database server search processing sequence by the database server search management means 628 will be described in detail below with reference to the flow chart in FIG. 18 and the memory maps shown in FIGS. 14A to 14C.

Figure 18:
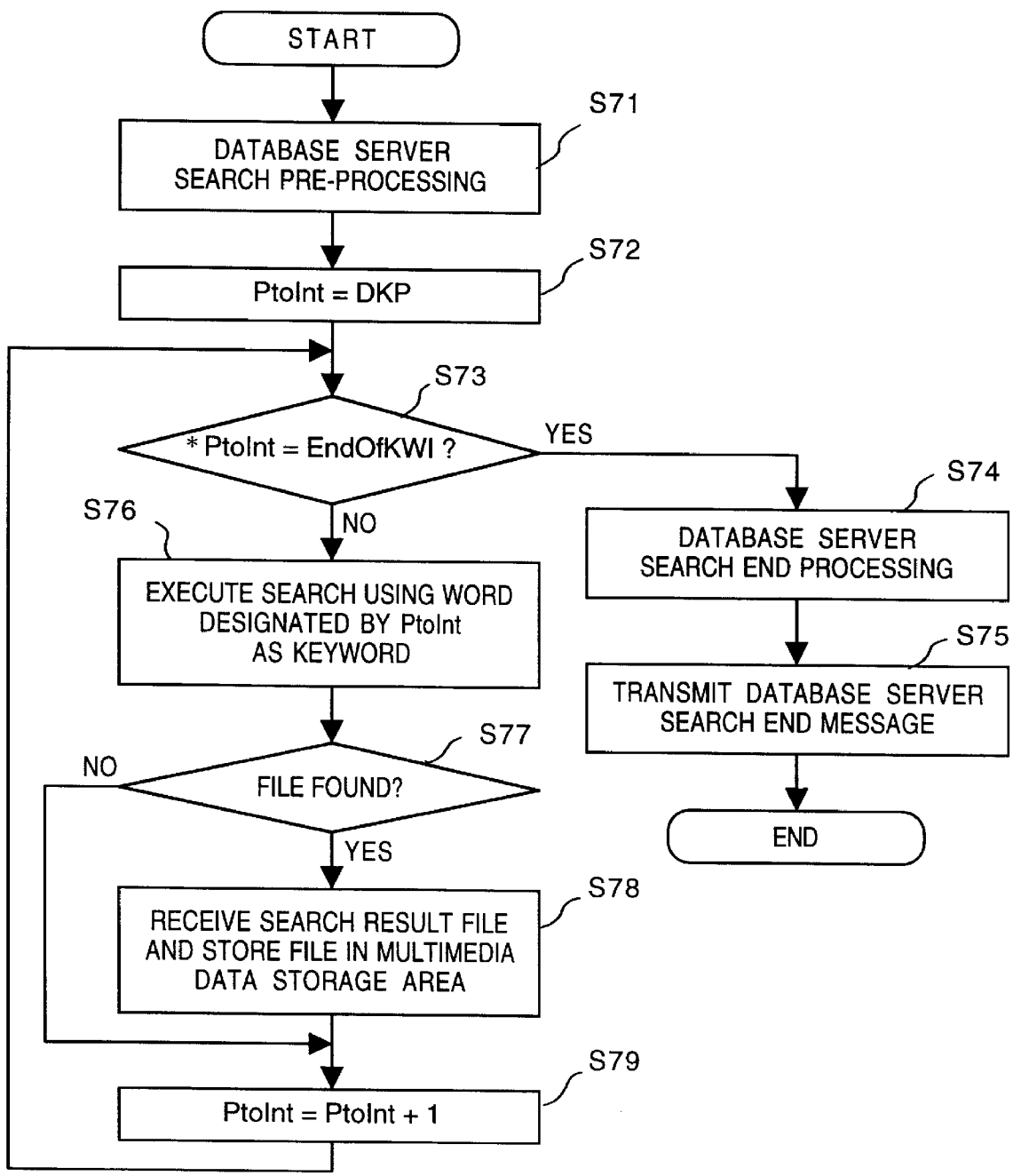
FIG. 18 is a flow chart for explaining the processing sequence of a database service search management means in the second embodiment of the present invention.

Upon reception of the message indicating the execution request of a database search using the extracted keyword (or keywords) from the processing management means 621, the database server search management means 628 starts processing from step S71 in FIG. 18. In step S71, the management means 628 performs search pre-processing for performing a multimedia data search from the database server 1801, on the basis of the agreements with the database server 1801. After this pre-processing, the server is ready to search upon designation of a keyword (or keywords) and reception of a search request. The flow advances to step S72, the means 628 substitutes DKP as an initial value in the 16-bit integer type pointer variable PtoInt, thereby setting the variable PtoInt at the start address of the extracted keyword index list shown in FIG. 14C.

The flow then advances to step S73 to check if the value (*PtoInt) of the variable PtoInt corresponds to the special symbol "EndOfKWI" indicating the end of the extracted keyword index list. Note that *A indicates the contents at a memory address A. If YES in step S73, i.e., if *PtoInt= EndOfKWI, the flow advances from step S73 to step S74; otherwise, the flow advances to step S76. In step S76, the management means 628 controls the communication means 629 to request the database server 1801 to perform a search using a word expressed by a character string from an address "DWP+(*PtoInt)×50" to the Null character (i.e., an extracted word PtoInt+1 in FIG. 14B). If it is determined in step S77 that at least one file is found in the search, the flow advances to step S78, and the means 628 controls the communication means 629 to receive the file as a search result from the database server 1801. The means 628 stores the received file in the multimedia data storage area 1105 of the data storage means 622 shown in FIG. 11. The flow then advances to step S79 to increment the variable PtoInt by 1 (PtoInt=PtoInt+1). Thereafter, the flow returns to step S73.

On the other hand, if YES is determined in step S73, since there is no search keyword to be searched, the flow advances to step S74, and the management means 628 controls the communication means 629 to perform search end processing based on the agreements with the database server 1801. The flow then advances to step S75, and the database server search management means 628 transmits a message indicating the end of database server search to the processing management means 621, thus ending the processing.

In this manner, the database server search processing by the database server search management means 628 shown in the flow chart in FIG. 18 has ended, and the message indicating the end of processing is transmitted from the database server search management means 628 to the processing management means 621. In response to this message, the flow advances from step S54 to step S55 in FIG. 16, and the management means 621 displays multimedia data, which is stored in the multimedia data storage area 1105 in accordance with the search request from the user, using the display means 625, and ends the processing shown in FIG. 16 upon reception of an end request of the search result display operation from the user.

The information equipment of the second embodiment is connected to a private database server via the LAN 636. However, the present invention is not limited to this, and the information equipment may be connected to a database server served by an external station via a communication path such as a public telephone network.

The present invention may be applied to either a system constituted by a plurality of devices or an apparatus consisting of a single device. Also, the present invention may be applied to a case wherein the invention is attained by supplying a program that carries out the present invention to the system or apparatus.

As described above, according to this embodiment, since a data file can be searched for by automatically extracting a keyword used in the search from text data (especially, text data of a personal schedule) including a plurality of words, data search processing can be attained without requiring any cumbersome operation for manually inputting a keyword from an input device to a search apparatus.

Since information important for a certain user is closely related to his or her schedule, data which is important for the user at that time can be presented by performing a search by automatically extracting a search keyword especially from text data of the personal schedule.

Since the information equipment of the second embodiment excludes an improper keyword with reference to the improper keyword dictionary before search using the database server, unnecessary search accesses can be omitted. Thus, the network traffic can be reduced, and the load on the database server can be reduced, thus attaining an efficient data search.

[Third Embodiment]

The third embodiment will be described in detail below on the basis of the arrangement of the present invention or an example of an arrangement.

Figure 20:
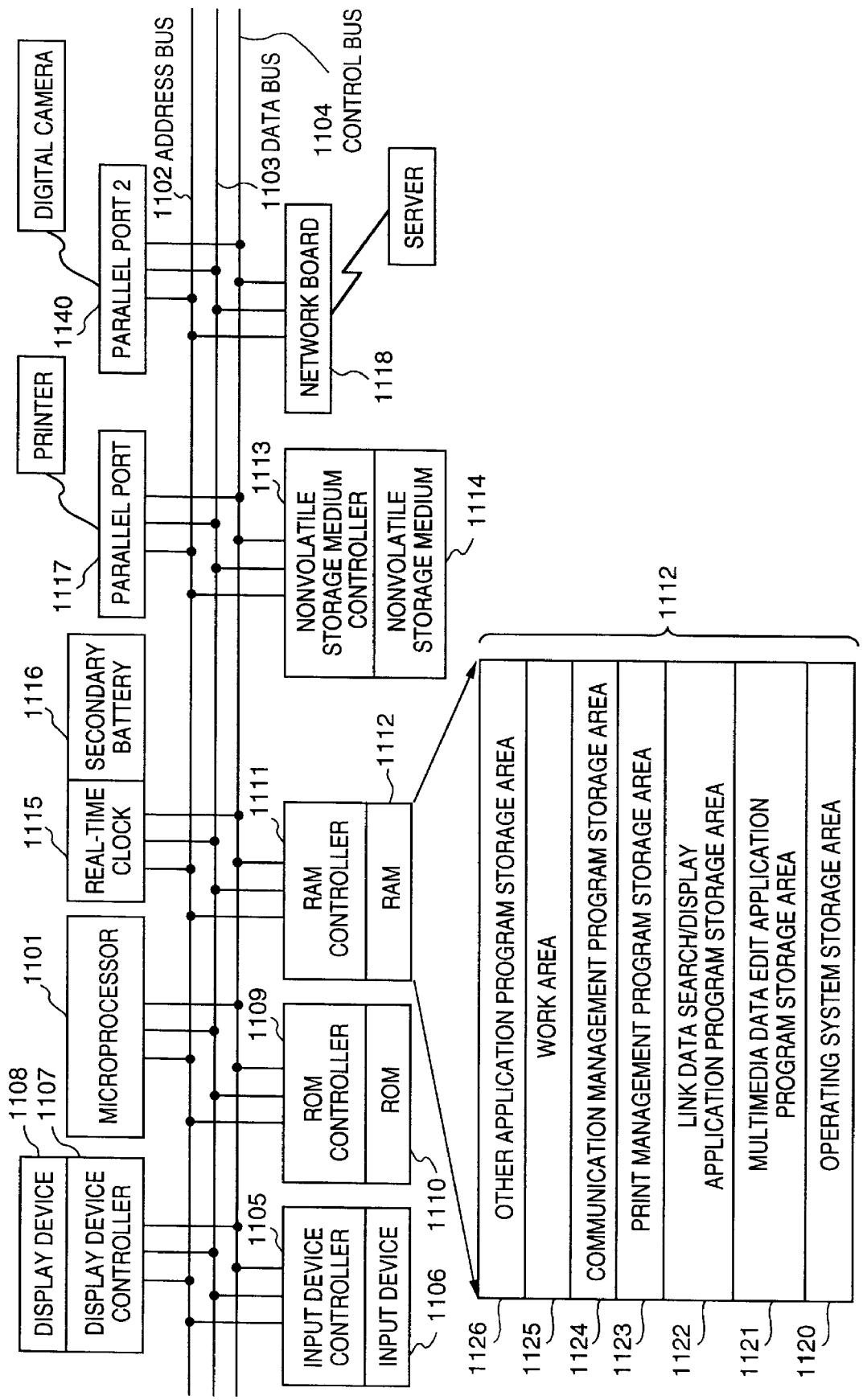
FIG. 20 is a block diagram showing the basic arrangement of an information equipment according to the third embodiment of the present invention.
Figure 45:
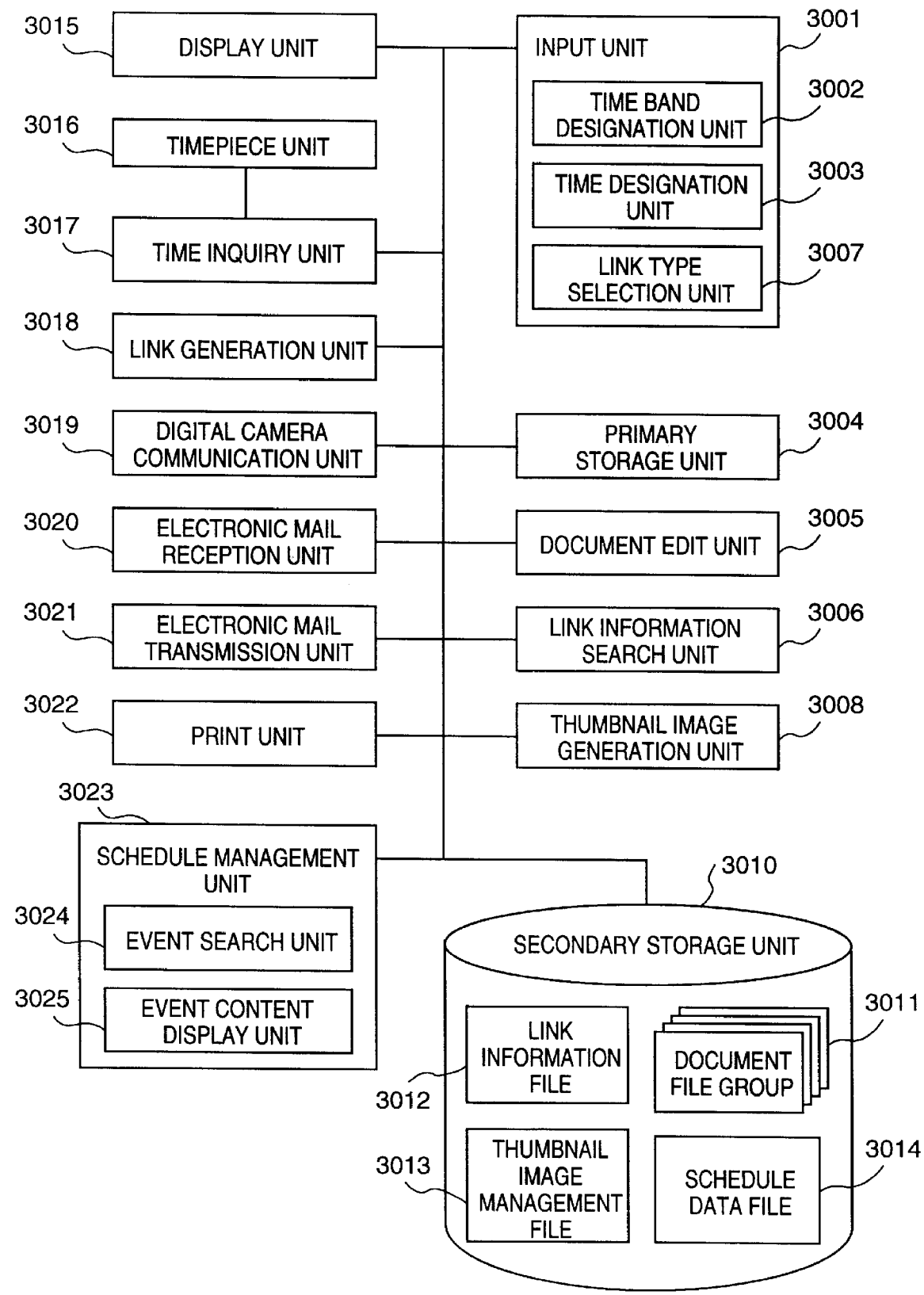
FIG. 45 is a block diagram showing the basic arrangement of an information equipment according to the present invention.

In the third embodiment of the present invention, the present invention is applied to a currently popular personal computer. FIG. 20 shows the basic arrangement of the third embodiment. The arrangement shown in FIG. 20 is a typical one of a currently popular personal computer. In the third embodiment, the respective processing units in the basis arrangement shown in FIG. 45 are realized in such a manner that programs corresponding to the processing contents of the respective processing units are loaded onto a RAM and are executed by a microprocessor 1101 using hardware resources of the personal computer shown in FIG. 20.

The basic arrangement of the information equipment of this embodiment will be described below with reference to FIG. 20. Referring to FIG. 20, reference numeral 1101 denotes a microprocessor for performing arithmetic operations, logical decisions, and the like. Reference numeral 1102 denotes an address bus for designating addresses of the respective input/output memories; 1103, a bidirectional data bus used for transferring various data; and 1104, a control bus used for accepting read, write, and interrupt signals of the respective memories, and transmitting a data set timing, and the like. Reference numeral 1106 denotes an input device such as a keyboard, a mouse, or the like; and 1105, an input device controller for controlling the input device 1106. The input device controller 1105 encodes data input by the input device 1106 such as a keyboard, a mouse, or the like, and sends an interrupt signal onto the control bus 1104. Reference numeral 1108 denotes a display device such as a liquid crystal display for displaying the graphical user interfaces for the operating system and application software programs running on the information equipment, schedule data, and other multimedia data. Reference numeral 1107 denotes a display device controller for controlling the display device 1108. Reference numeral 1110 denotes a read-only memory (i.e., a ROM) which stores an initialization sequence used upon starting of the information equipment of this embodiment, and the like. Reference numeral 1109 denotes a controller for controlling the ROM 1110.

Figure 21:
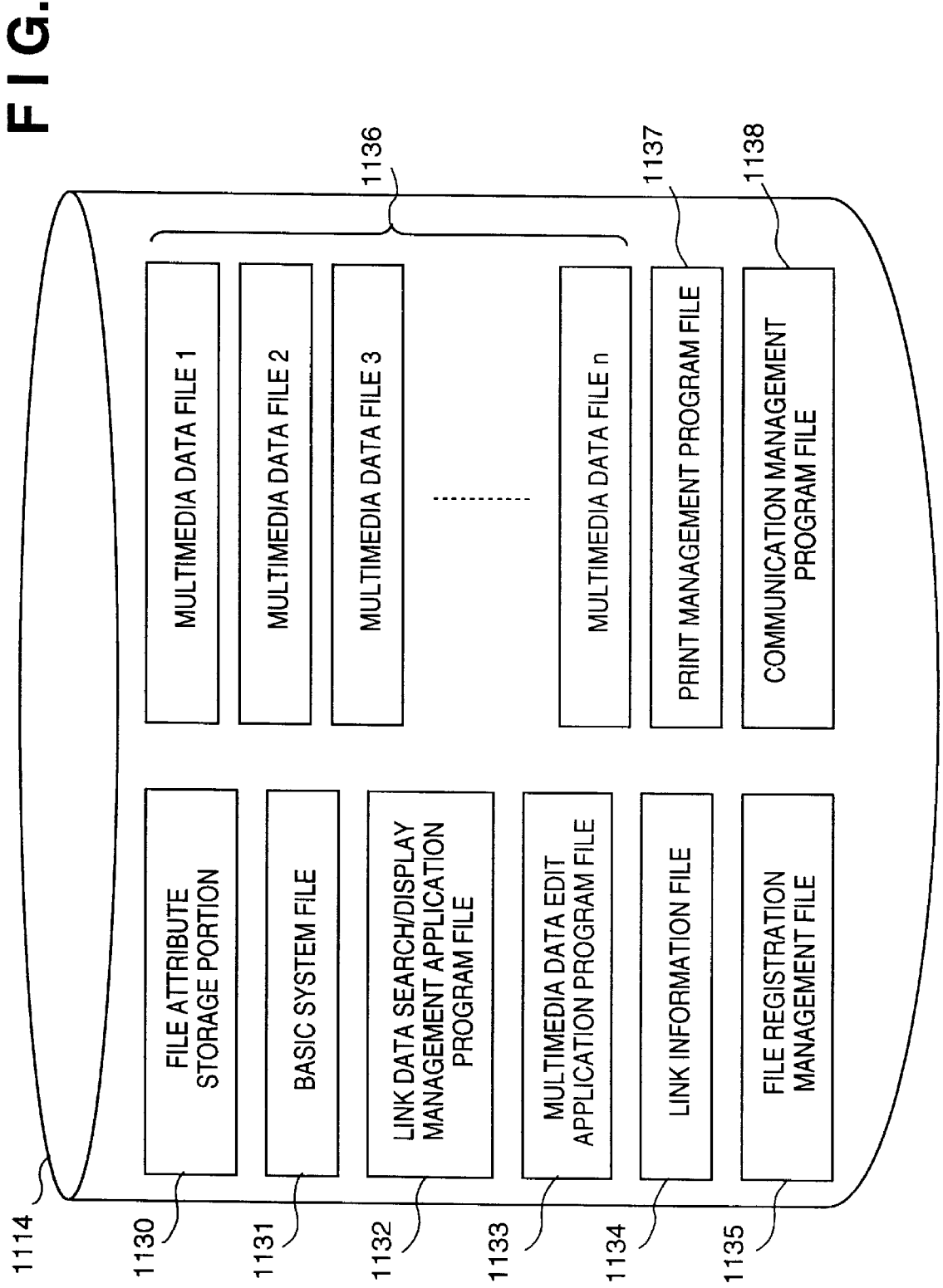
FIG. 21 is a view showing a list of files in a nonvolatile storage medium in the third embodiment.

Reference numeral 1114 denotes a nonvolatile storage medium. As shown in FIG. 21, the nonvolatile storage medium 1114 has a file attribute storage portion 1130 for storing file attributes and directory information of files stored in the storage medium, a basic system file 1131 which describes the basic operations of the information equipment of this embodiment, a link data search/display application program file 1132 which describes a processing sequence executed when the information equipment of this embodiment searches for link information and displays the search result, a document information edit application program file 1133 which describes an edit processing sequence for document information such as still image data, dynamic image data, audio data, text data, draw data, and the like, a link information file 1134 which stores link information of the respective files in a document file group 1136 that stores document information as files, a document file registration management file 1135 which describes the file IDs of document files, registered in a link data search/display application program, in the document file group 1136, and the file IDs of application program files used for opening the corresponding document files, a print management program file 1137 which describes a processing sequence executed when an application program running on the information equipment of this embodiment prints document information, a communication management program file 1138 which describes a processing sequence executed upon execution of transmission/reception of various data such as data transmission/reception with a digital camera connected to parallel port 2 (1140), transmission/reception of electronic mails with other equipments via a network board 1118, and the like, and the document file group 1136 which stores document information such as still image data, dynamic image data, audio data, text data, draw data, and the like as files.

Reference numeral 1113 denotes a nonvolatile storage medium controller for controlling the nonvolatile storage medium 1114. Reference numeral 1112 denotes a random-access memory (i.e., a RAM), which comprises an operating system storage area 1120, a document information edit application program storage area 1121, a link data search/display application program storage area 1122, a print management program storage area 1123, a communication management program storage area 1124, a work area 1125 used by the operating system (OS) and application programs running on the information equipment of this embodiment, and a storage area 1126 for storing other application programs which are not described in this embodiment. Reference numeral 1111 denotes a RAM controller for controlling the RAM 1112. Reference numeral 1115 denotes a real-time clock which receives electric power from a battery 1116 and measures time even when the power switch of the information equipment of this embodiment is OFF. Reference numeral 1117 denotes a parallel port through which the information equipment exchanges data with an external apparatus connected via a cable. In this embodiment, a printer is assumed to be connected to the parallel port 1117. Reference numeral 1140 denotes parallel port 2 through which the information equipment exchanges data with an external apparatus connected via a cable. In this embodiment, a digital camera is assumed to be connected to parallel port 2 (1140). Reference numeral 1118 denotes a network board inserted in an extension slot of the information equipment. In this embodiment, since the information equipment serves as a client connected to a server, the network board has a function that allows the information equipment to exchange information with the server connected thereto via a network line, and is inserted between the information equipment and the network line connected to the server, as shown in FIG. 20.

With the above arrangement, when a user turns on the power switch of the information equipment, an initialization program stored in the ROM 1110 shown in FIG. 20 is executed. Upon completion of initialization processing required for the equipment, the basic system file 1131 is loaded onto the operating system storage area 1120, and the operating system is ready to run on the equipment.

The operating system of the information equipment of the third embodiment has a multitask function as in that of a currently popular personal computer, and allows a plurality of application programs to run simultaneously. Also, the operating system has a currently popular window system, and displays windows in units of running application programs. The user can switch the application program to which he or she wants to input a command by selecting a corresponding window. The operating system supports a communication function between the application programs. That is, application program A can transmit a command that can be interpreted by another application program in such a manner that application program A starts application program B, and requests application program B, which is already running, to open a designated file. The operating system manages files using a directory structure. The user can create an arbitrary directory structure on the nonvolatile storage medium 1114 via the operating system, and can store and arrange arbitrary files in arbitrary directories.

When the operating system is ready to run, the communication management program file 1138 and the print management program file 1137 are loaded onto the communication management program storage area 1124 and the print management program storage area 1123, and are ready to run in the background mode. Thereafter, the operating system waits for an event input by the user while a command is focused on the operating system. When the user inputs a command for requesting the operating system to use a document information edit application program to the operating system using the input device 1106, the information equipment loads the document information edit application program file 1133 from the nonvolatile storage medium 1114, stores it in the document information edit application program storage area 1121, and then waits for an event input by the user. At this time, a command input by the user is focused on the document information edit application program, and is received by the document information edit application program until the user changes the focusing state of a command to another application program or the operating system using the input means.

On the other hand, when the user inputs a command for requesting the operating system to use a link data search/display application program to the operating system using the input device 1106 while a command is focused on the operating system, the information equipment loads the link data search/display application program file 1132 from the nonvolatile storage medium 1114, stores it in the link data search/display application program storage area 1122, and thereafter, waits for an event input by the user. At this time, a command input by the user is focused on the link data search/display application program, and is received by the link data search/display application program until the user changes the focusing state of a command to another application program or the operating system.

An image called a "thumbnail image" frequently used in the present invention will be explained below. In the present invention, a thumbnail image of a file allows a user to visually recognize the contents of the file, and the numbers of vertical and horizontal pixels of each thumbnail image are suitable for displaying a plurality of thumbnail images on the display device. In this embodiment, the following images are used as thumbnail images in correspondence with the contents of files:

1. "when the file contents correspond to a still image, an image obtained by enlarging or reducing the still image while maintaining the aspect ratio so as to have 60 pixels in its longitudinal direction"

2. "when the file contents correspond to a dynamic image, an image obtained by enlarging or reducing an image in the start frame of the dynamic image while maintaining the aspect ratio so as to have 60 pixels in its longitudinal direction"

3. "when the file contents correspond to text data or audio data, an image obtained by expressing the file name character string of the file in a bitmap of 60 pixels×60 pixels"

4. "when the file contents correspond to draw data in the metafile format, an image obtained by converting the draw data expressed in the metafile format into the bitmap format, and enlarging or reducing the converted data to a bitmap of 60 pixels×60 pixels"

In this embodiment, thumbnail images are formed in correspondence with files to be managed, as described above. However, the present invention is not limited to this. For example, the number of pixels is not particularly limited as long as a plurality of images can be displayed on the display device 1108 and the user can easily find a target file. Also, in the dynamic image, an image in a frame other than the start frame may be used. Furthermore, in the audio/text file, in place of using the file name, an image that merely notifies the user that the file contains audio or text data may be displayed, as a matter of course.

FIGS. 25A and 25B show the architecture of the registered file management file (or document file registration management file) 1135. The architecture of the registered file management file 1135 will be described in detail below with reference to FIGS. 25A and 25B.

Figure 23:
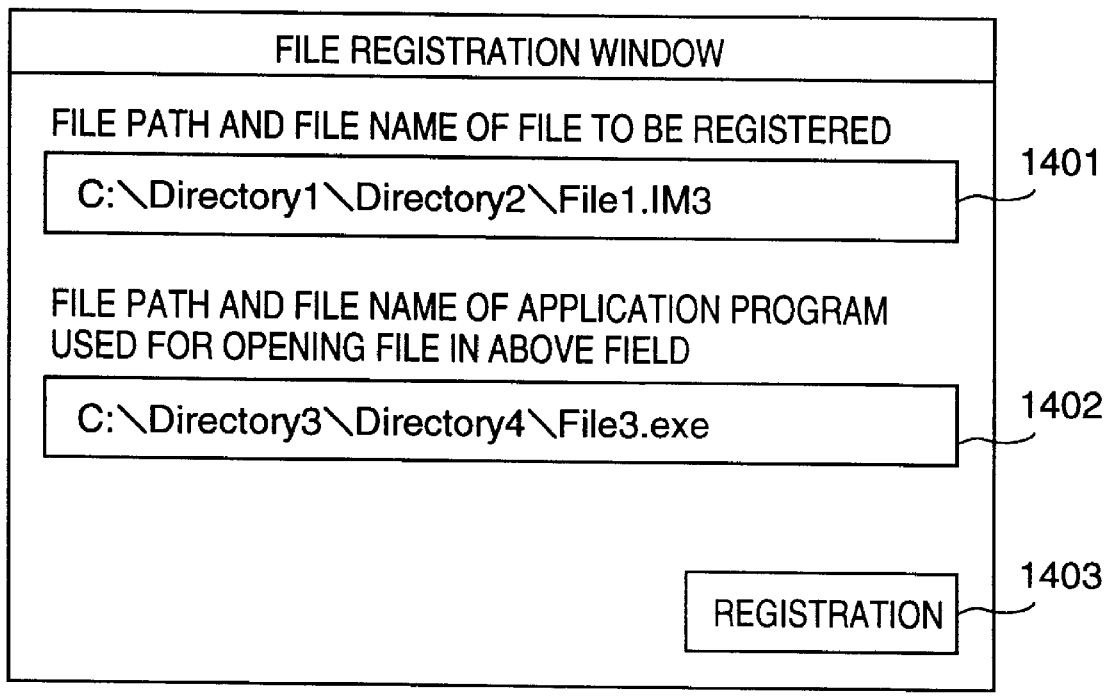
FIG. 23 is a view showing the user interface of a file registration window.

In the information equipment of this embodiment, when certain processing is performed, there are a document file for which a link information record is generated and a document file for which no link information record is generated, and a link information record corresponding to the processing contents is generated for only document files, which are registered in the registered file management file 1135 by the user's operation on a file registration window (FIG. 23; to be described later). The data architecture of the registered file management file will be explained below with reference to FIGS. 25A and 25B.

As shown in FIG. 25B, the registered file management file 1135 generates one registered file management record for each registered file, and manages files as a list of management records. As shown in FIG. 25A, one file management record consists of a registered file ID field 1601 for storing the file ID information of a registered document file, a program file ID information field 1602 for storing the file ID information of an application program file which is used for opening the document file indicated by the file ID information field 1601, and a thumbnail image data field 1603 for storing thumbnail image data of the file indicated by the file ID information field 1601.

FIG. 23 shows a user interface used when a new document file is added to the file management file. The file registration window shown in FIG. 23 will be described below.

The file registration window is used for registering a file having a designated file ID of those managed by the operating system stored in the area 1120 to the link data search/display application program. The operating system in this embodiment manages the nonvolatile storage medium 1114 using the directory structure, and the drive name of the medium 1114 is defined by "C:" (means "drive C"). Therefore, file ID information is designated by an absolute path starting from "C:", and a backslash "\" is used for dividing upper and lower layers, thereby designating a file ID which is uniquely specified in the nonvolatile storage medium 1114.

Reference numeral 1401 denotes a text field used by the user to input the file path and file name of a file to be registered using the input device 1106. In this embodiment, when the user designates a registered file via the link data search/display application program, and inputs an open command of the designated file to the link data search/display application program, the link data search/display application program starts an application program designated upon registration, and transmits the file open command to the application program designated upon registration via an inter-application communication. Reference numeral 1402 denotes a text field used for designating the file path and file name of an application program file used when a file to be registered is opened. Reference numeral 1403 denotes a registration button, which is clicked by the user when he or she has no intention of changing the contents of the text fields 1401 and 1402, whereby the file name is registered in the link data search/display application program, and the file registration window is closed.

The operation of the information equipment performed when the user clicks the registration button 1403 in FIG. 23 using, e.g., a mouse of the input device 1106 will be described below with reference to the flow chart shown in FIG. 26.

Figure 26:
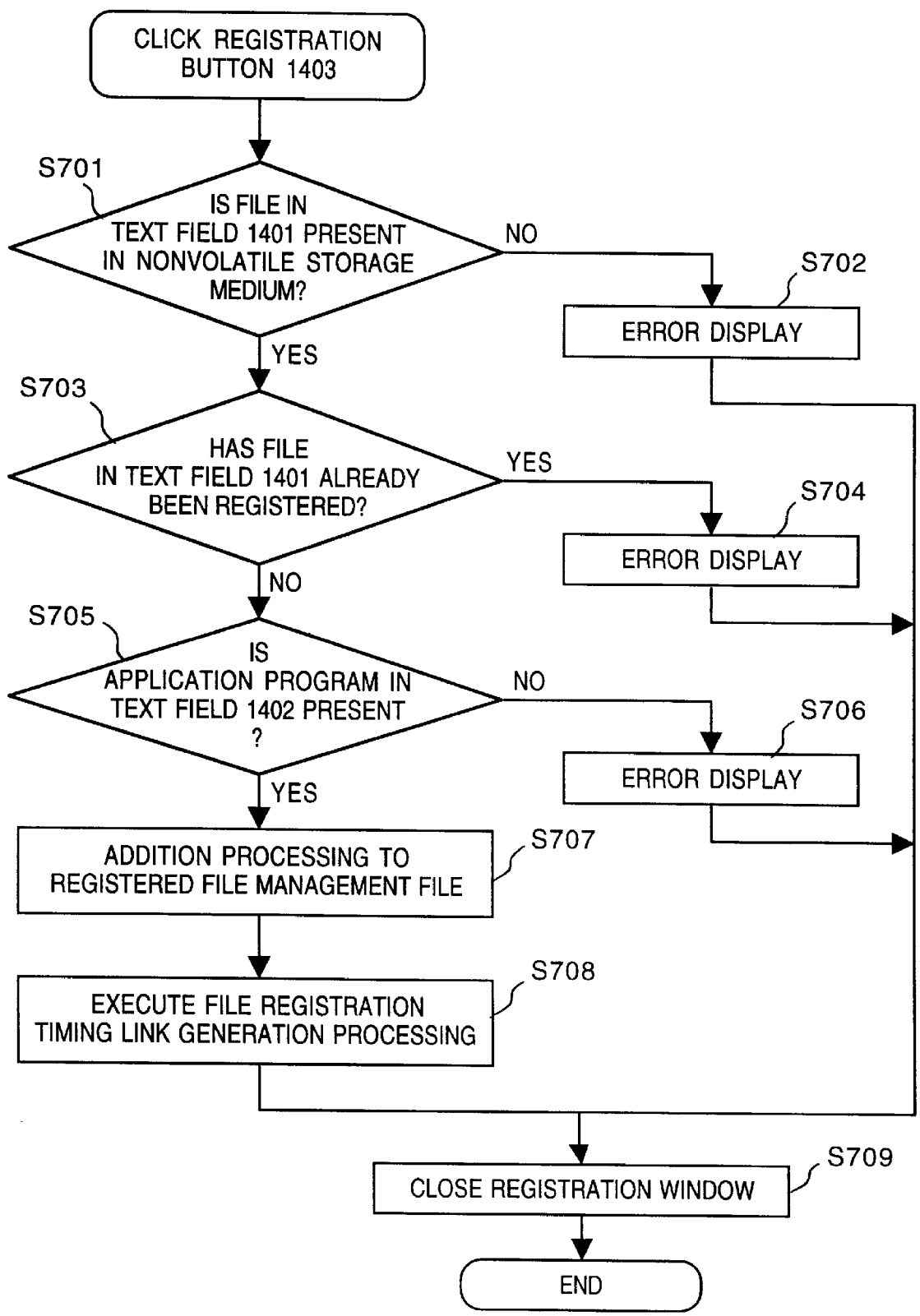
FIG. 26 is a flow chart showing the processing sequence executed when a file registration command is input.

When the user clicks the registration button 1403 after he or she inputs the file path and file name of a file to be registered in the text field 1401 and inputs the file path and file name of an application program used when the file is opened in the text field 1402, the link data search/display application program of the information equipment of this embodiment executes the processing in the sequence shown in the flow chart in FIG. 26.

In step S701, the control inquires the operating system as to whether or not the file designated by the file path and file name in the text field 1401 is present in the nonvolatile storage medium 1114. If such file is not present, "NO" is determined in step S701, and an error display is performed in step S702. Thereafter, the flow then advances to step S709. On the other hand, if such file is present, "YES" is determined in step S701, and the flow advances to step S703.

In step S703, the control looks up the registered file management file 1135 to check if the file designated by the file path and file name in the text field 1401 has already been registered. If the designated file has already been registered, "YES" is determined in step S703, and an error display (e.g., a display of a message indicating that the file has already been registered) is performed in step S704. Thereafter, the flow advances to step S709.

On the other hand, if the designated file has not been registered yet, "NO" is determined in step S703, and the flow advances to step S705. In step S705, the control inquires the operating system as to whether or not the file designated by the file path and file name in the text field 1402 is present in the nonvolatile storage medium 1114. If the designated file is not present, "NO" is determined in step S705, and an error display is performed in step S706. Thereafter, the flow advances to step S709. On the other hand, if the designated file is present, "YES" is determined in step S705, and the flow advances to step S707. In step S707, the processing is performed in accordance with the addition processing sequence to the registered file management file 1135 shown in the flow chart in FIG. 27.

Figure 27:
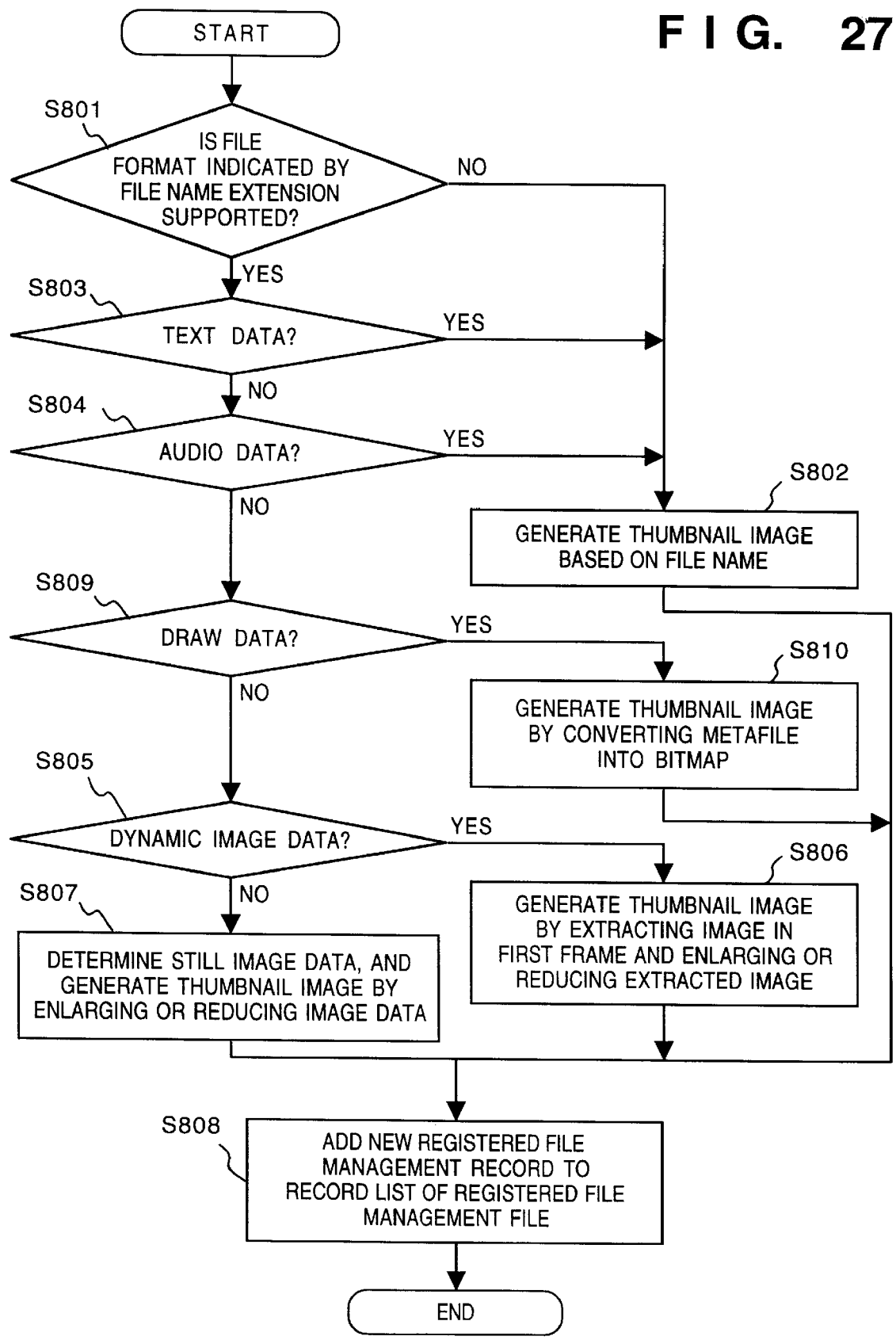
FIG. 27 is a flow chart showing the addition processing sequence to the registered file management file.

Referring to FIG. 27, it is checked in step S801 if the link data search/display application program supports a file format defined by the extension of the file name in the text field 1401. In the third embodiment, assume that the link data search/display application program supports file formats with the following extensions: TX1 and TX2 as the file formats of text data; DW1 and DW2 as the file formats of draw data; SND as the file format of audio data; MV1 and MV2 as the file formats of dynamic image data; MV3 as the file format of dynamic image data picked up by a dynamic image digital camera; IM1 and IM2 as the file formats of still image data; and IM3 as the file format of still image data picked up by a still image digital camera.

Each of the still and dynamic image digital cameras assumed in this embodiment stores a picked-up image in a nonvolatile storage medium as digital data, and has a timepiece means. Each digital camera can convert a picked-up image into a file in a file format (file formats with file extensions IM3 and MV3 in this embodiment) of an architecture having an information area for storing the image pickup time. Each digital camera can be connected to the information equipment via a cable, and can exchange data with each other. If the extension of the file in the text field 1401 is none of the above-mentioned extensions (TX1, TX2, DW1, DW2, SND, MV1, MV2, MV3, IM1, IM2, and IM3), "NO" is determined in step S801, and the flow advances to step S802. On the other hand, if the extension of the file in the text field 1401 is one of these extensions, "YES" is determined in step S801, and the flow advances to step S803.

In step S802, bitmap data of 60 pixels×60 pixels is generated based on the character string of the file name in the text field 1401, thereby generating a thumbnail image serving as a representative image of the file in the link data search/display application program (in this embodiment, an image of 60 pixels×60 pixels is generated as a thumbnail image, but the number of pixels is not limited to this).

When the flow advances to step S803, it is checked based on the extension of the file name in the text field 1401 if the file is text data. If the file is text data, "YES" is determined in step S803, and the flow advances to step S802. On the other hand, if the file is not text data, "NO" is determined in step S803, and the flow advances to step S804.

It is checked in step S804 based on the extension of the file name in the text field 1401 if the file is audio data. If the file is audio data, "YES" is determined in step S804, and the flow advances to step S802. On the other hand, if the file is not audio data, "NO" is determined in step S804, and the flow advances to step S809.

It is checked in step S809 based on the extension of the file name in the text field 1401 if the file is draw data. If the file is draw data, "YES" is determined in step S809, and the flow advances to step S810. However, if the file is not draw data, "NO" is determined in step S809, and the flow advances to step S805. Since draw data of this embodiment is a file in the metafile format, the metafile data is converted into a bitmap image, and thereafter, a thumbnail image is generated, in step S810. Thereafter, the flow advances to step S808.

When the flow advances to step S805, it is checked based on the extension of the file name in the text field 1401 if the file is dynamic image data. If the file is dynamic image data, "YES" is determined in step S805, and the flow advances to step S806. On the other hand, if the file is not dynamic image data, "NO" is determined in step S805, and the flow advances to step S807.

In step S806, the first frame of the dynamic image data is read, and a thumbnail image is generated by enlarging or reducing the read image to an image of 60 pixels×60 pixels. Since data supported by the information equipment of this embodiment is one of text data, audio data, dynamic image data, draw data, and still image data, it is determined in step S807 based on the decision results in steps S803, S804, and S805 that the current file is still image data, and a thumbnail image of 60 pixels×60 pixels is generated by enlarging or reducing the still image data.

In step S808, a registered file management record having field values: "the registered file ID information field 1601= the file path and file name in the text field 1401", "the program file ID information field 1602=the file path and file name in the text field 1402", and "the thumbnail image data field 1603=thumbnail image data generated in one of steps S802, S806, S807, and S810", is generated, and is added to the registered file record list of the registered file management file 1135, thus ending the addition processing sequence to the file management file.

Upon completion of the above-mentioned processing, the flow advances to step S708 in FIG. 26. In step S709, file modification timing link generation processing is executed, as shown in FIG. 28.

Figure 28:
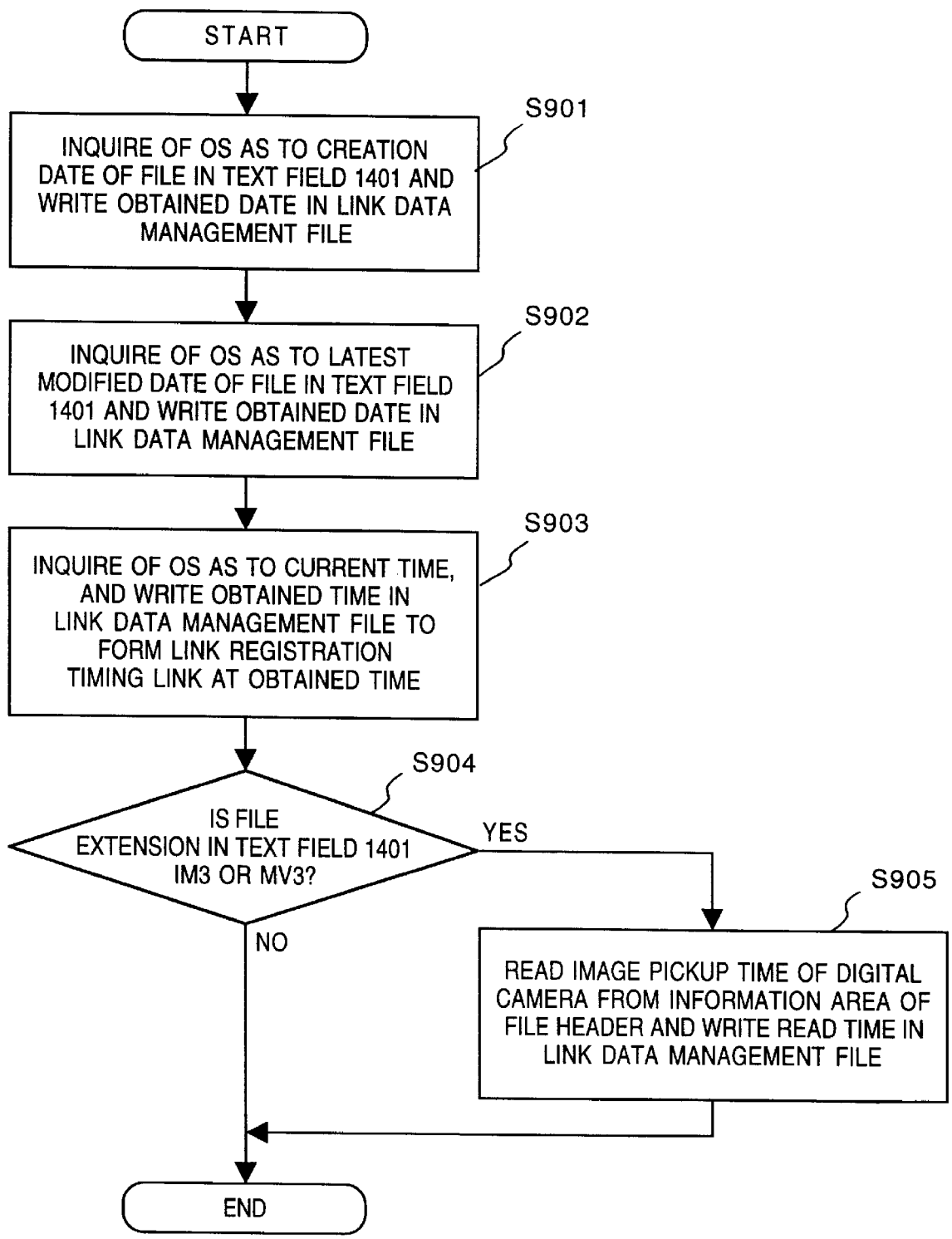
FIG. 28 is a flow chart showing the link generation processing sequence upon registration of a file.

Referring to FIG. 28, in step S901, the control inquires of the operating system as to the file creation date of the file designated by the text field 1401 (the operating system of this embodiment stores the file creation dates and the latest modified dates of all files to be managed in the file attribute storage portion 1130 as in a currently popular operating system, and notifies the application program of time data in accordance with an inquiry from the application program). This time (assumed to be time 1), and the file path and file name (C:\Directory1\Directory2\File1.IM3 in FIG. 23) are linked by a "file creation timing link" as one of link types of the link data search/display application program of the information equipment of this embodiment.

Figure 29A:
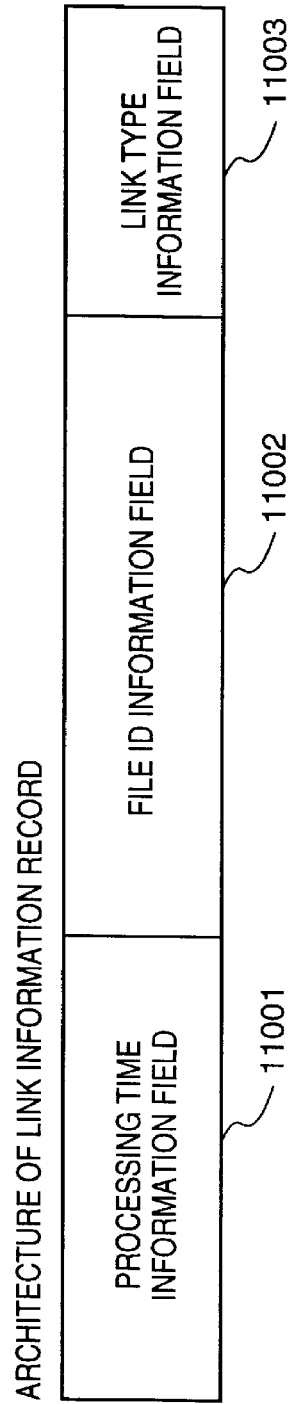
FIGS. 29A and 29B are views showing the data architecture of link information.
Figure 29B:
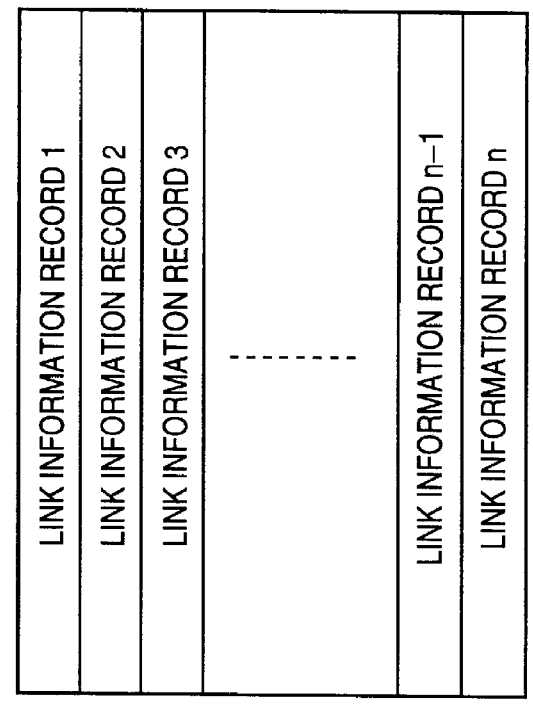

More specifically, as shown in FIG. 29, link information record information "processing time information field 11001=time 1, file ID information field 11002= C:\Directory1\Directory2\File1.IM3, and link type information field 11003=file creation timing link" in the link information file 1134 is generated, and is added to the list of link information records in the link information file 1134.

In step S902, the application program inquires of the operation system as to the latest modified date of the file designated by the text field 1401. This time (assumed to be time 2), and the file path and fine name (C:\Directory1\Directory2\File1.IM3 in FIG. 23) of the file designated by the text field 1401 are linked by a "file modification timing link" as one of link types in the link data search/display application program of the information equipment of this embodiment.

More specifically, link information record information "processing time information field 11001=time 2, file ID information field 11002= C:\Directory1\Directory2\File1.IM3, and link type information field 11003=file modification timing link" is generated, and is added to the list of link information records in the link information file 1134.

In step S903, the application program inquires of the operating system as to the current time measured by the real-time clock (1115 in FIG. 20) (the operating system of this embodiment has an interface with a timepiece means (real-time clock) as in a currently popular operating system, can detect the current time, and notifies the application program of the current time data in accordance with a request from the application program). This time (assumed to be time 3), and the file path and file name (C:\Directory1\Directory2\File1.IM3) of the file designated by the text field 1401 are linked by a "file modification timing link" as one of link types in the link data search/ display application program of the information equipment of this embodiment.

More specifically, link information record information "processing time information field 11001=time 3, file ID information field 11002= C:\Directory1\Directory2\File1.IM3, and link type information field 11003=file modification timing link" is generated, and is added to the list of link information records in the link information file 1134.

In step S904, it is checked if the file extension ("IM3" in FIG. 23) of the file designated by the text field 1401 is the extension IM3 or MV3 appended to a file obtained by picking up an image by the still or dynamic image digital camera in this embodiment. If the file extension is neither IM3 nor MV3, "NO" is determined in step S904, and the processing shown in FIG. 28 ends. On the other hand, if the file extension is IM3 or MV3, "YES" is determined in step S904, and the flow advances to step S905.

In step S905, the image pickup time data is read from the information area of the file with the extension IM3 or MV3, and the read time (assumed to be time 4), and the file path and file name of the file designated by the text field 1401 are linked by an "image pickup link" as one of link types in the link data search/display application program of the information equipment of this embodiment.

More specifically, link information record information "processing time information field 11001=time 4, file ID information field 11002= C:\Directory1\Directory2\File1.IM3, and link type information field 11003=image pickup link" is generated, and is added to the list of link information records in the link information file 1134.

Upon completion of step S905, the processing sequence shown in FIG. 28 ends.

Referring back to FIG. 26, upon completion of the link generation processing sequence upon registration of a file shown in FIG. 28, the flow advances to step S709.

In step S709, the file registration window shown in FIG. 23 is closed. After the file registration window is closed in step S709, the processing sequence of the link data search/display application program executed upon clicking of the registration button shown in the flow chart in FIG. 26 ends.

Figure 22:
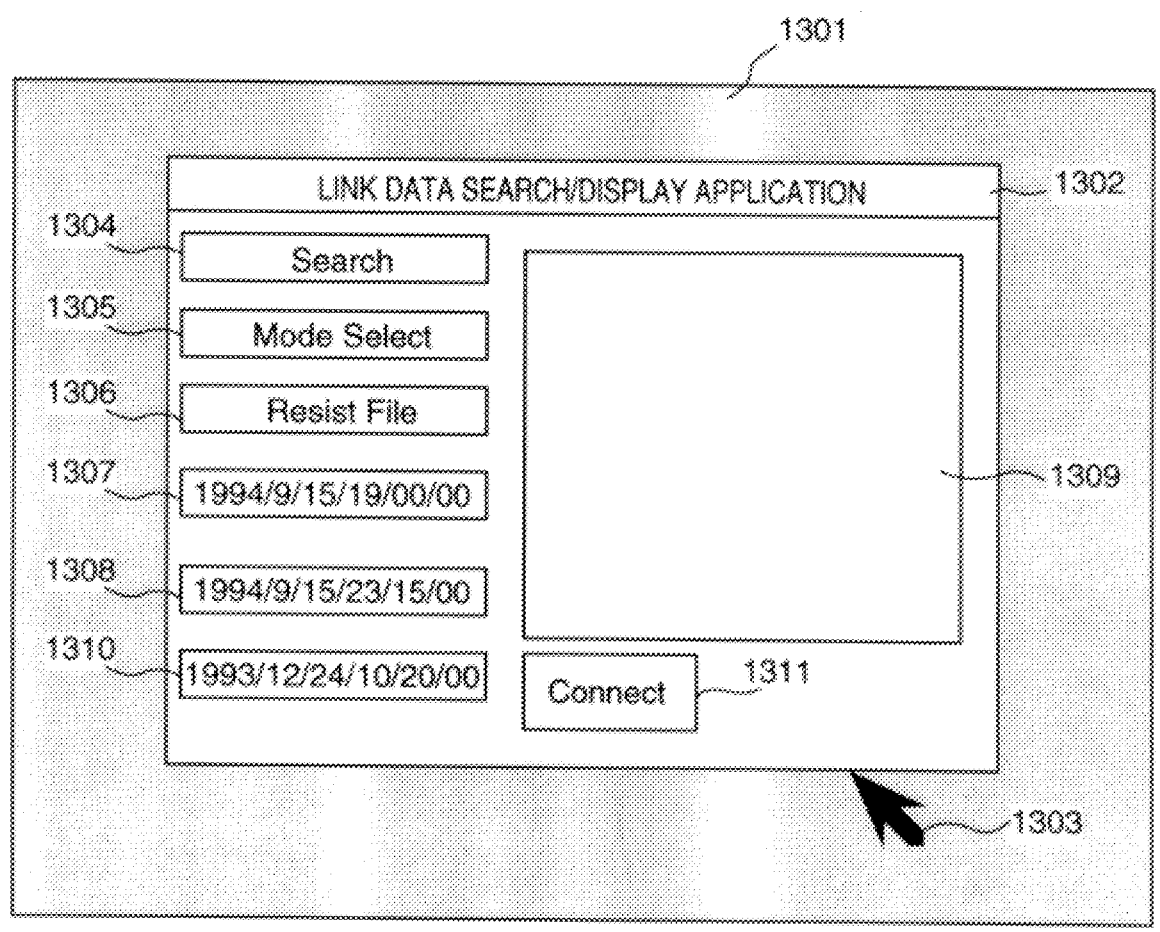
FIG. 22 is a view showing the basic user interface of a link data search/display application program.

The user interface of link data search/display application program of the information equipment of this embodiment is as shown in FIG. 22. When the link data search/display application program is started, a link data search/display application window 1302 is displayed on a screen 1301 on the display device 1108.

Figure 24:
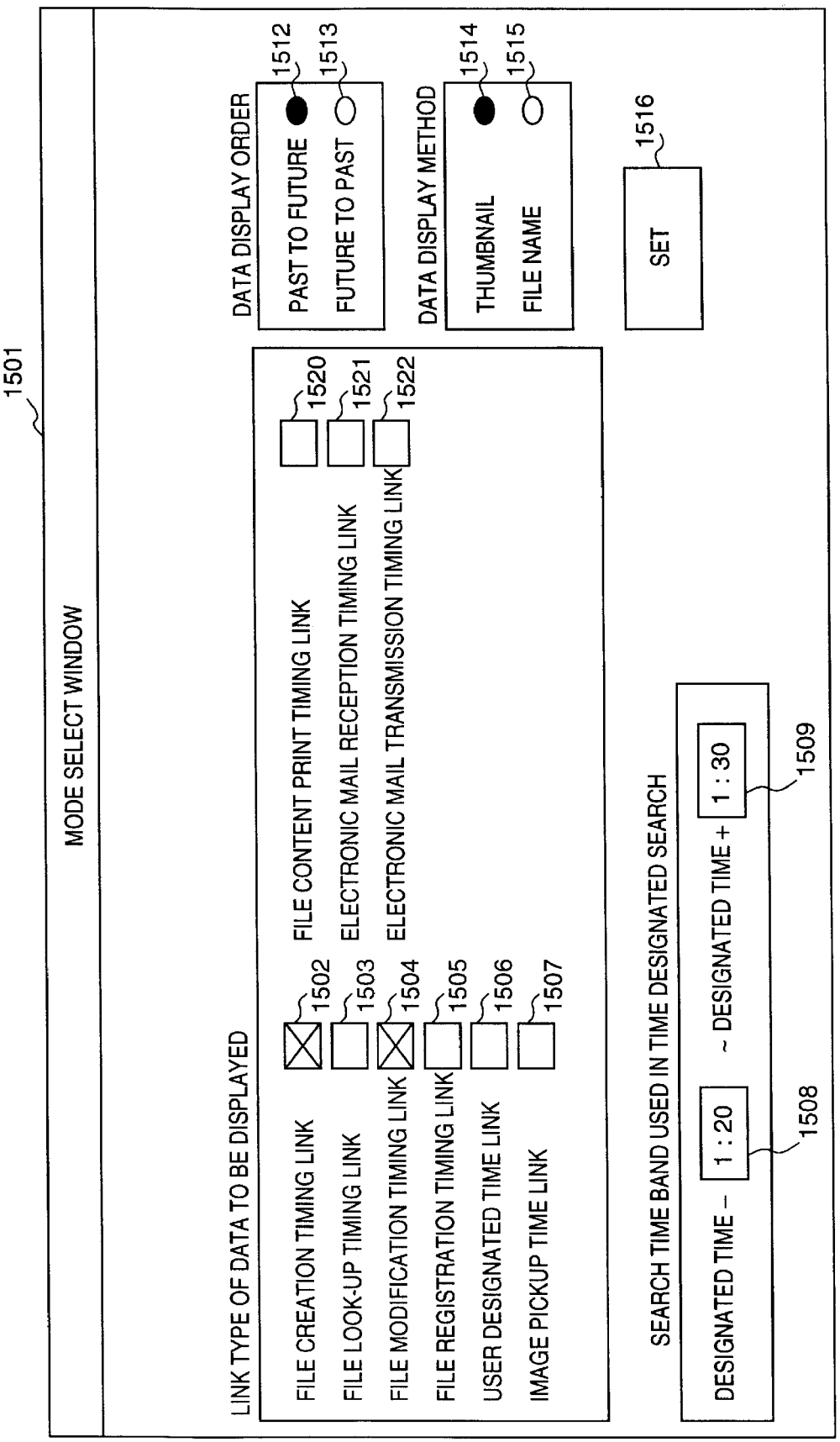
FIG. 24 is a view showing the user interface of a mode select window.

The information equipment of this embodiment comprises a mouse as an input device of a pointing device. Reference numeral 1303 denotes a cursor which moves in correspondence with the mouse movement, and can designate a two-dimensional position on the screen 1301. Reference numeral 1304 denotes a Search button. When the button 1304 is clicked by the mouse, the information equipment starts a search on the basis of time information in fields 1307 and 1308. Reference numeral 1305 denotes a Mode-Select button. When the button 1305 is clicked by the mouse, a mode select window shown in FIG. 24 is opened to allow mode selection. Reference numeral 1306 denotes a ResistFile button. When the button 1306 is clicked by the mouse, the file registration window shown in FIG. 23 is opened and a file on the nonvolatile storage medium 1114 managed by the operating system can be registered in the link data search/display application program by the processing sequence shown in FIG. 26.

Reference numeral 1307 denotes text field 1 used for inputting a time. The user can input a date in text field 1 (1307) using an input means such as a keyboard. FIG. 22 shows a state wherein a time "19:00:00 on Sep. 15, 1994 " is input. Reference numeral 1308 denotes text field 2 used for inputting a time. The user can input a date in text field 2 (1308) using an input means such as a keyboard. FIG. 22 shows a state wherein a time "23:15:00 on Sep. 15, 1994" is input. When the user inputs "time in text field 1<time in text field 2", as shown in FIG. 22, the link data search/display application program recognizes this data as the time band between the time in text field 1 to the time in text field 2. On the other hand, when "time in text field 1>=time in text field 2" or when no time is input in text field 2, the link data search/display application program recognizes that the time in text field 1 is designated.

Reference numeral 1309 denotes a search result display area for displaying the search results of document files which are found upon a search by clicking the Search button. When the mouse cursor 1303 is located on the file name or the thumbnail image of a file displayed on the search result display area, and the mouse button is clicked, the file corresponding to the file name of the thumbnail image is set in the selected state. Reference numeral 1310 denotes a user designated time field used by designating a time by the user upon formation of a user designated time link to the file in the selected state. Reference numeral 1311 denotes a Connect button. When this button 1311 is clicked by the mouse, the user designated time link between the selected file and the time in the user designated time field 1310 is formed. This operation will be described in detail later.

The mode select window shown in FIG. 24 will be described below. Referring to FIG. 24, reference numeral 1501 denotes a mode select window as a user interface, which is used by the user to set a mode. Reference numerals 1502 to 1507 and 1520 to 1522 denote check boxes for setting the link types of a file to be searched for and displayed upon a file search based on information in the link information file 1134. Each check box can be toggled by the mouse between a checked state (a selected state; a state with a mark X on a GUI) and a unchecked state.

The link types with the checked check boxes are searched when the Search button 1304 in FIG. 22 is clicked. Reference numeral 1502 denotes a check box for a file creation timing link. Reference numeral 1503 denotes a check box for a file look-up timing link. Reference numeral 1504 denotes a check box for a file modification timing link. Reference numeral 1505 denotes a check box for a file modification timing link. Reference numeral 1506 denotes a check box for a user designated time link. Reference numeral 1507 denotes a check box for an image pickup time link. Reference numeral 1520 denotes a check box for a file modification timing link. Reference numeral 1521 denotes a check box for an electronic mail reception timing link. Reference numeral 1522 denotes a check box for an electronic mail transmission timing link.

In FIG. 24, the check boxes 1502 and 1504 are checked, and when the Search button 1304 is clicked in this state, the file creation timing link and the file modification timing link serve as link types to be searched for.

Buttons 1512 and 1513 are alternative buttons, and either one of these buttons is set in the selected state. By selecting one of the buttons 1512 and 1513, the display order of found files, i.e., the order from the past to the future or the order from the future to the past can be selected. Also, buttons 1514 and 1515 are alternative buttons. By selecting one of the buttons 1514 and 1515, whether found files are displayed as thumbnail images or a list of file names can be selected.

Reference numerals 1508 and 1509 denote text fields used for setting the time band to be searched when the user performs time designation on the user interface shown in FIG. 22. Reference numeral 1508 denotes a text field used for designating a time duration to be searched before the time designated by the user. Reference numeral 1509 denotes a text field used for setting a time duration to be searched after the time designated by the user. When the time set in the field 1508 in FIG. 24 is used, for example, if the user sets a time "10:00 on Sep. 20, 1994" in the time designation format using the user interface shown in FIG. 22, the time band from "8:40 on Sep. 20, 1994" to "11:30 on Sep. 20, 1994" is subjected to a search.

Reference numeral 1516 denotes a setting button. When the user has no intention to change parameters set on the mode select window and clicks this button, the setting operation is performed, and the mode select window is closed on the display device 1108. Thereafter, a search operation is performed in accordance with the window shown in FIG. 22.

The operation of the information equipment of this embodiment executed when the user clicks the Search button in FIG. 22 to input a search command to the information equipment will be described below with reference to the flow charts.

Figure 30:
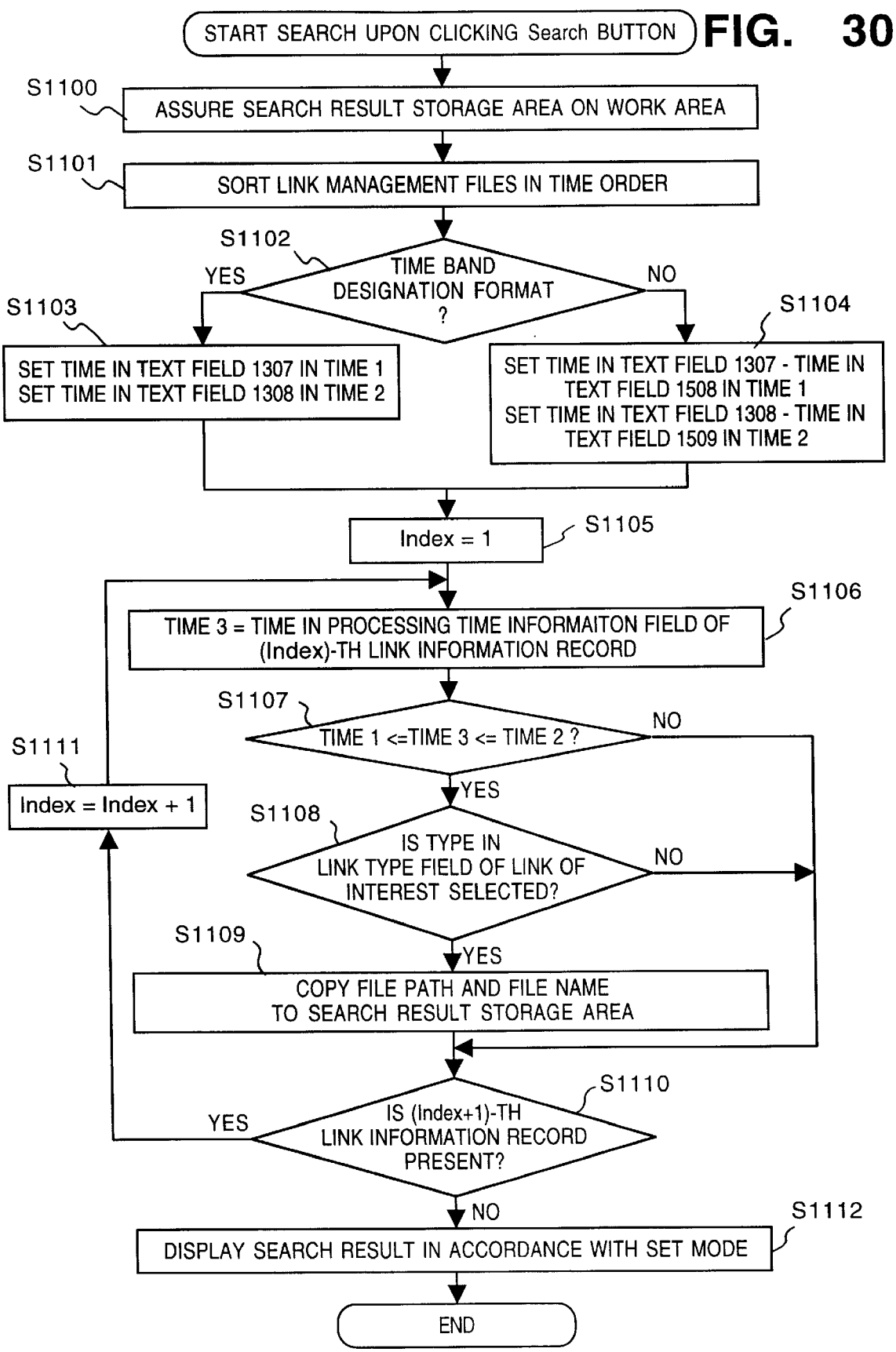
FIG. 30 is a flow chart showing the link data search processing sequence.

When the user clicks the Search button 1304 in FIG. 22 with the mouse, the link data search/display application program of the information equipment performs a search operation in accordance with the link data search processing sequence shown in FIG. 30.

In step S1100, the program assures a search result storage area for storing search results on the work area 1125. In step S1101, the program sorts the records in the link information file 1134 as shown in FIG. 29 in the order of times designated by the processing time information fields. In step S1102, it is checked based on the above-mentioned discrimination criterion with reference to the text fields 1307 and 1308 if the current designation is in the time designation format or the time band designation format. If the current designation is in the time band designation format, "YES" is determined in step S1102, and the flow advances to step S1103. On the other hand, if the current designation is in the time designation format, "NO" is determined in step S1102, and the flow advances to step S1104.

In step S1103, an area for a variable "time 1" is assured on the work area 1125, and the time in the text field 1307 is substituted in the variable "time 1". Then, an area for a variable "time 2" is assured on the work area 1125, and the time in the text field 1308 is substituted in the variable "time 2". Thereafter, the flow advances to step S1105.

When the flow advances to step S1104, an area for a variable "time 1" is assured on the work area 1125, and a time obtained by subtracting the time in the text field 1508 from the time in the text field 1307 is substituted in the variable "time 1". Then, an area for a variable "time 2" is assured on the work area 1125, and a time obtained by adding the time in the text field 1509 to the time in the text field 1307 is substituted in the variable "time 2".

The time band between time 1 and time 2 obtained by the processing in step S1103 or S1104 serves as a time band to be searched in the link data search processing.

In step S1105, an area for a variable "Index" is assured on the work area 1125, and "1" is substituted as an initial value in the variable "Index". In step S1106, an area for a variable "time 3" is assured on the work area 1125, and the time stored in the processing time information field of an (Index)-th link information record from the first record in the list in the link information file 1134 is substituted in the variable "time 3". In step S1107, it is checked if an inequality "time 1≦time 3≦time 2" holds. If the inequality holds, "YES" is determined in step S1107, and the flow advances to step S1108. On the other hand, if the inequality does not hold, "NO" is determined in step S1107, and the flow advances to step S1110.

In step S1108, it is checked if the link type in the link type information field of the (Index)-th link information record is selected by checking the corresponding one of the check boxes 1502 to 1507 and 1520 to 1522 on the mode select window in FIG. 24. If the link type is selected, "YES" is determined in step S1108, and the flow advances to step S1109. On the other hand, if the link type is not selected, "NO" is determined in step S1108, and the flow advances to step S1110.

In step S1109, information (file path and file name) in the file ID information field of the (Index)-th link information record is copied to the search result storage area assured on the work area 1125. In step S1110, it is checked if an (Index+1)-th link information record is listed. If the (Index+1)-th link information record is present, "YES" is determined in step S1110, and the flow advances to step S1110. On the other hand, if the (Index+1)-th link information record is not present, "NO" is determined in step S1110, and the flow advances to step S1112.

In step S1111, the value of the variable "Index" is incremented by 1, and the flow returns to step S1106.

In this manner, when "NO" is determined in step S1110, since all the links stored in the link information file 1134 have been looked up, and the search operation has ended, the search result (or results) is (or are) stored in the search result storage area.

FIG. 42 shows the state of the search result storage area. As shown in FIG. 42, the file paths and file names obtained as the search results are stored in the search order as in list 1.

In step S1112, search result files are displayed. The search results are displayed on the area 1309 in FIG. 22. When the file name radio button 1515 in FIG. 24 is selected as the data display method on the mode select window, a list of the file paths and file names obtained as the search results is displayed on the area 1309 in the data display order set by the data display order button on the mode select window with reference to list 1.

On the other hand, when the thumbnail radio button 1514 is selected as the data display method on the mode select window, thumbnail image data of the file paths and file names obtained from list 1 are loaded from the thumbnail image data area of the file management file shown in FIG. 25, and a list of thumbnail images of the file paths and file names obtained as the search results is displayed on the area 1309 in the data display order set by the data display order button on the mode select window.

As described above, after the list of the search results is displayed in accordance with the parameters set on the mode select window in step S1112, the search processing sequence of the information equipment shown in the flow chart in FIG. 30 ends.

A sequence when the link data search/display application program of the information equipment of this embodiment forms a file look-up timing link and a file modification timing link will be described below. Note that the phrase "form A link" used in this specification means generating a link information record having A link as the field value of the link type field and adding the generated record to the link information file.

Figure 31:
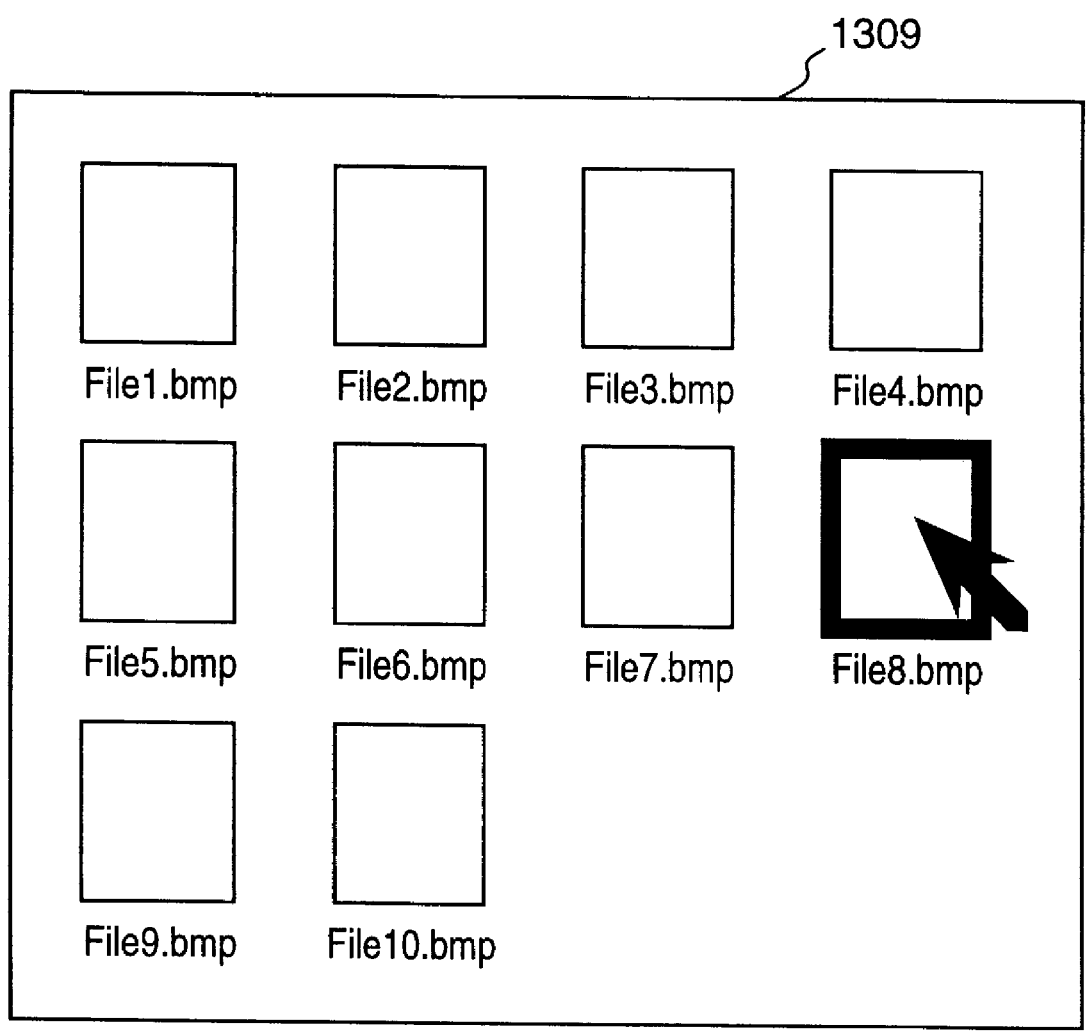
FIG. 31 is a view showing an example of a list of files displayed on a search result display area.

FIG. 31 shows a state wherein the search results are displayed as thumbnail images on the search result display area 1309. Assume that the information equipment of this embodiment does not process the state wherein the search results are displayed as thumbnail images shown in FIG. 31 as a file look-up state. From this state, when the user moves the mouse cursor to a position on a thumbnail image of a certain file (File8.IM3 in FIG. 31) and designates it (e.g., by double-clicking the mouse button), as shown in FIG. 31, the link data search/display application program starts an application program to be used for opening the designated file, and instructing the program to open the file via an inter-application communication (in general, when a file is given as an argument upon starting of an application program, since the application program opens the file given as the argument, this method is also used in this embodiment). This timing is assumed to be the time to be set in the processing time information field in a file look-up timing link. The link data search/display application program detects modification of a file by always monitoring the last modification time of the opened file, and upon detection of file modification, the program adds a file modification timing link to the link information file.

The sequence when the information equipment of this embodiment forms a link look-up link and a file modification timing link will be below wit in detail below with reference to the flow chart in FIG. 32.

When the user designates an arbitrary one of files registered in the registered file management file 1135 to the information equipment of this embodiment using the input means, and inputs an open command of the designated file to the information equipment, the information equipment starts processing from step S1301. In this embodiment, for the sake of simplicity, the file path and file name of the file designated by the user will be referred to as "file 1" hereinafter.

In step S1301, the control acquires the file path and file name of an application program file which is to open file 1 by looking up the registered file management file 1135. For the sake of simplicity, the file path and file name of this application program will be referred to as "application program 1" hereinafter.

In step S1302, the control starts application program 1 using an inter-application communication means as the function of the operating system of the information equipment, and instructs it to open file 1.

In step S1303, it is checked if application program 1 is normally started and file 1 is opened. If file 1 is normally opened on application program 1, "YES" is determined in step S1303, and the flow advances to step S1304. However, if file 1 is not normally opened on application program 1, "NO" is determined in step S1312, and an error display is made on the display device 1108 in step S1306, thus ending the processing.

In step S1304, the control inquires of the operating system of the information equipment as to the current time. For the sake of simplicity, the time acquired in this case will be referred to as time 1 hereinafter.

In step S1305, a file look-up timing link is formed. More specifically, a link information record "processing time information field 11001=time 1, file ID information field 11002=file 1, and link type information field 11003=file look-up timing link" is added to the link information file 1134. After the file look-up timing link is formed in step S1305, control inquires of the operating system to acquire the last date of file 1, and sets this time in time 2 and time 3, in step S1306.

Step S1307 and subsequent steps constitute a monitoring or surveillance loop of file modification.

It is checked in step S1307 if time 2=time 3. If time 2=time 3, file 1 is not modified, i.e., "YES" is determined in step S1307, and the flow advances to step S1310. If time 2≠time 3, "NO" is determined in step S1307, and the flow advances to step S1308.

In step S1308, since the file is modified, a file modification timing link is formed. More specifically, a link information record "processing time information field 11001=time 3, file ID information field 11002=file 1, and link type information field 11003=file modification timing link" is added to the link information file 1134.

In step S1309, time 2 is updated by the new latest modified date by substituting time 3 in time 2.

In step S1310, it is checked by performing an inter-application communication if file 1 is opened on application program 1. If application program 1 has ended or if file 1 is closed on application program 1, since file 1 is not opened, "NO" is determined in step S1310, and the processing upon formation of a link look-up timing link and a file modification timing link shown in the flow chart in FIG. 32 ends.

On the other hand, if file 1 is opened, "YES" is determined in step S1310, and the flow advances to step S1311. In step S1311, the control inquires of the operating system as to the latest modified date of file 1, and sets the acquired time in time 3. Thereafter, the flow returns to step S1307.

Figure 32:
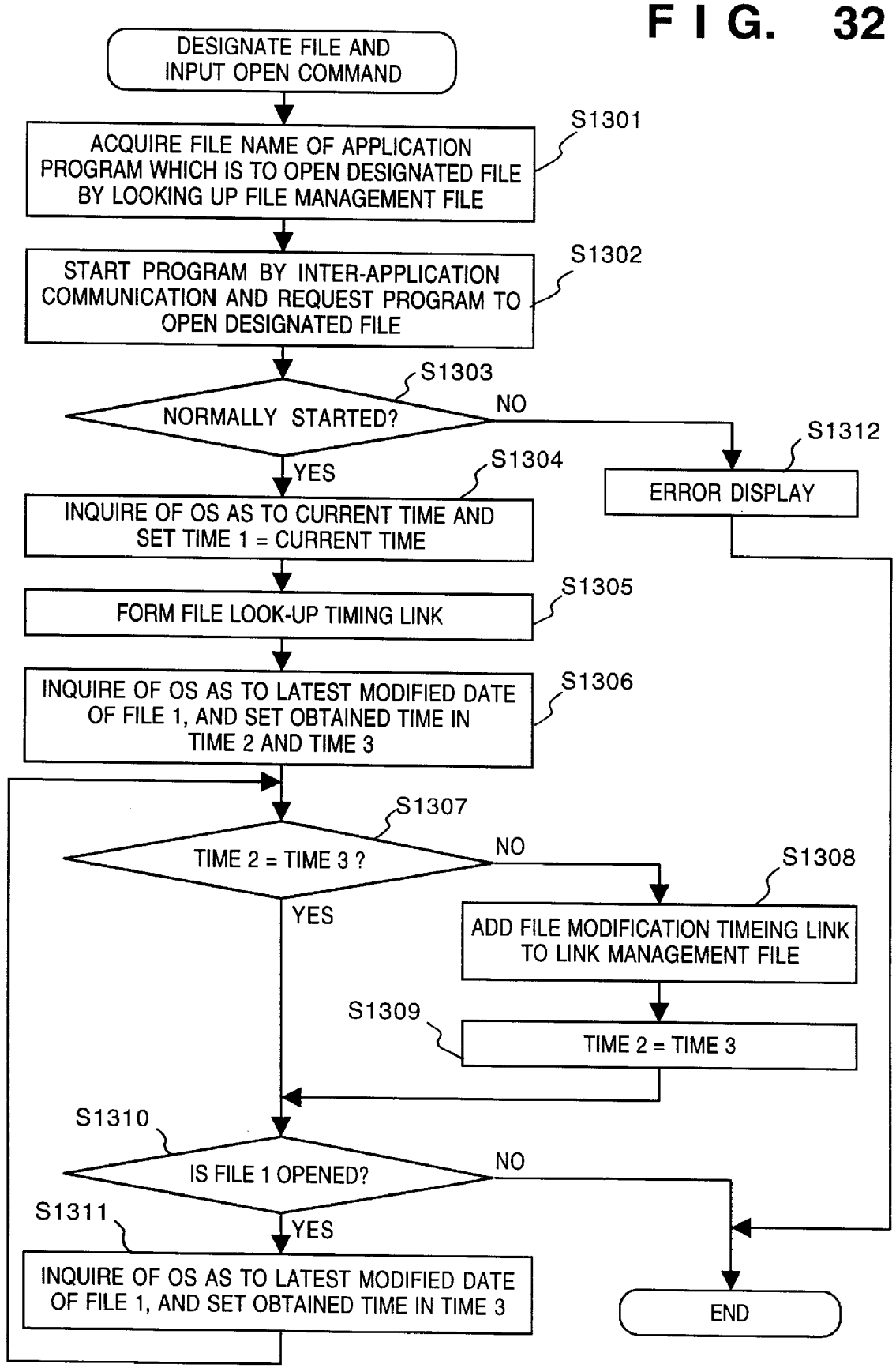
FIG. 32 is a flow chart showing the processing sequence upon formation of a file look-up timing link and a file modification timing link.

With the above-mentioned processing sequence shown in the flow chart in FIG. 32, the information equipment can form a file look-up timing link using the link data search/display application program when a document file is opened, and can form a file modification timing link every time the opened file is modified.

A sequence when the information equipment of this embodiment forms a file content print timing link will be explained below. Upon reception of a print command input by the user, an application program running on the information equipment of this embodiment designates data to be printed and issues a print request to the print management program stored in the print management program storage area 1123. Upon reception of the print request, the print management program executes a task of outputting the designated data from a printer, and forms a file content print timing link. For the sake of simplicity, assume that file 1 is opened on an application program at present, and the user inputs a print request command of file 1 to a document edit application program (to be referred to as Ap1 hereinafter). The operation of the information equipment of this embodiment in this case will be described in detail below with reference to the flow chart in FIG. 33. This embodiment assumes a print request from a multimedia data edit application program. However, the application program is not particularly limited as long as it has a print command and can transmit a print request to the print management program on the basis of the agreements with the print management program upon printing.

Figure 33:
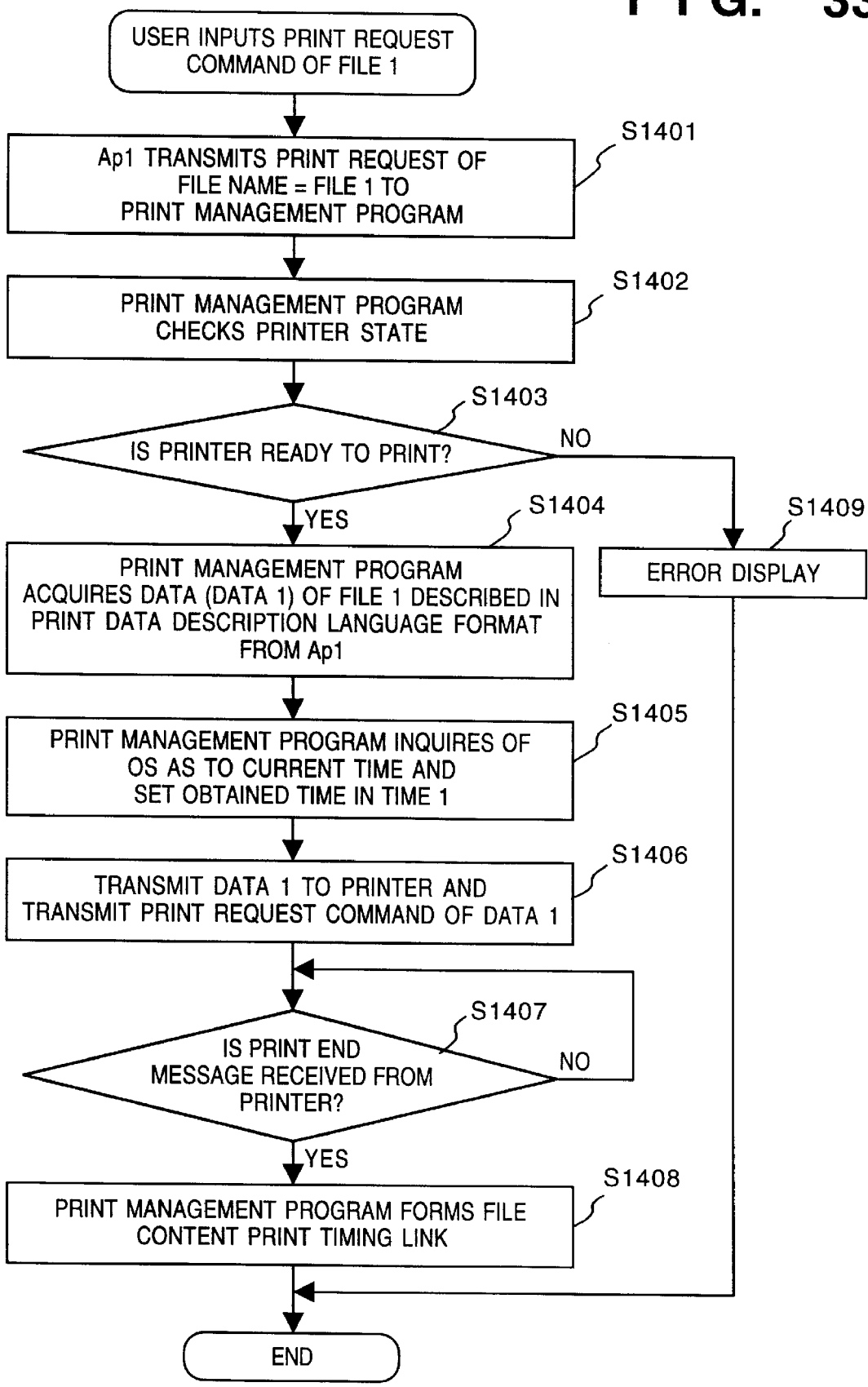
FIG. 33 is a flow chart showing the processing sequence upon formation of a file print timing link.

When the user inputs a print request command of file 1 from the user interface of Ap1 while file 1 is opened on Ap1, the information equipment of this embodiment starts processing from step S1401 in FIG. 33.

In step S1401, Ap1 transmits a file content print request of a file whose file path and file name correspond to file 1 to the print management program. Upon reception of this request, the print management program checks the printer state (whether or not the power switch of the printer is ON, whether or not paper sheets are present, and the like) in step S1402. Thereafter, the flow advances to step S1403. If the printer is ready to print, "YES" is determined in step S1403, and the flow advances to step S1404. On the other hand, if the printer is not ready to print, "NO" is determined in step S1403, and an error display is made in step S1409, thus ending the processing.

When the flow advances to step S1404, the print management program acquires data of file 1 (to be referred to as data 1 hereinafter) which data is described in the format of a print data description language, from Ap1. In step S1405, the print management program inquires of the operating system as to the current time, and sets the acquired time in the work area 1125 as time 1. In step S1406, the program outputs a request command of printing the contents of data 1 to the printer, and transmits data 1.

In step S1407, it is checked if the printer has transmitted a print end message. Before the printer transmits a print end message, "NO" is determined in step S1407, and the decision step S1407 is repeated.

When the printer has ended the print operation and transmits a print end message to the print management program, "YES" is determined in step S1407, and the flow advances to step S1408.

In step S1408, the print management program forms a file content print timing link. More specifically, the program adds, to the link information file 1134, a link information record "processing time information field 11001=time 1, file ID information field 11002=file 1, and link type information field 11003=file content print timing link". After the addition processing of the file content print timing link is performed in step S1408, a series of processing operations for forming the file content print timing link shown in the flow chart in FIG. 33 ends.

In the above-mentioned example, the file content print timing link is formed when a print end message is received from the printer but may be formed when all the print data are output. In this case, although the output end time and the actual output time of the print result from the printer have a difference of several seconds or several tens of seconds, no problem is posed.

A sequence executed when the information equipment of this embodiment forms an electronic mail reception timing link will be described below. The communication management program stored in the communication management program storage area 1124 is started simultaneously when the power switch of the information equipment is turned on, and executes electronic mail information updating processing shown in the flow chart in FIG. 34, thereby updating electronic mail information. During the operation of the information equipment, the electronic mail information updating processing is executed at predetermined time periods to update electronic mail information.

Figure 34:
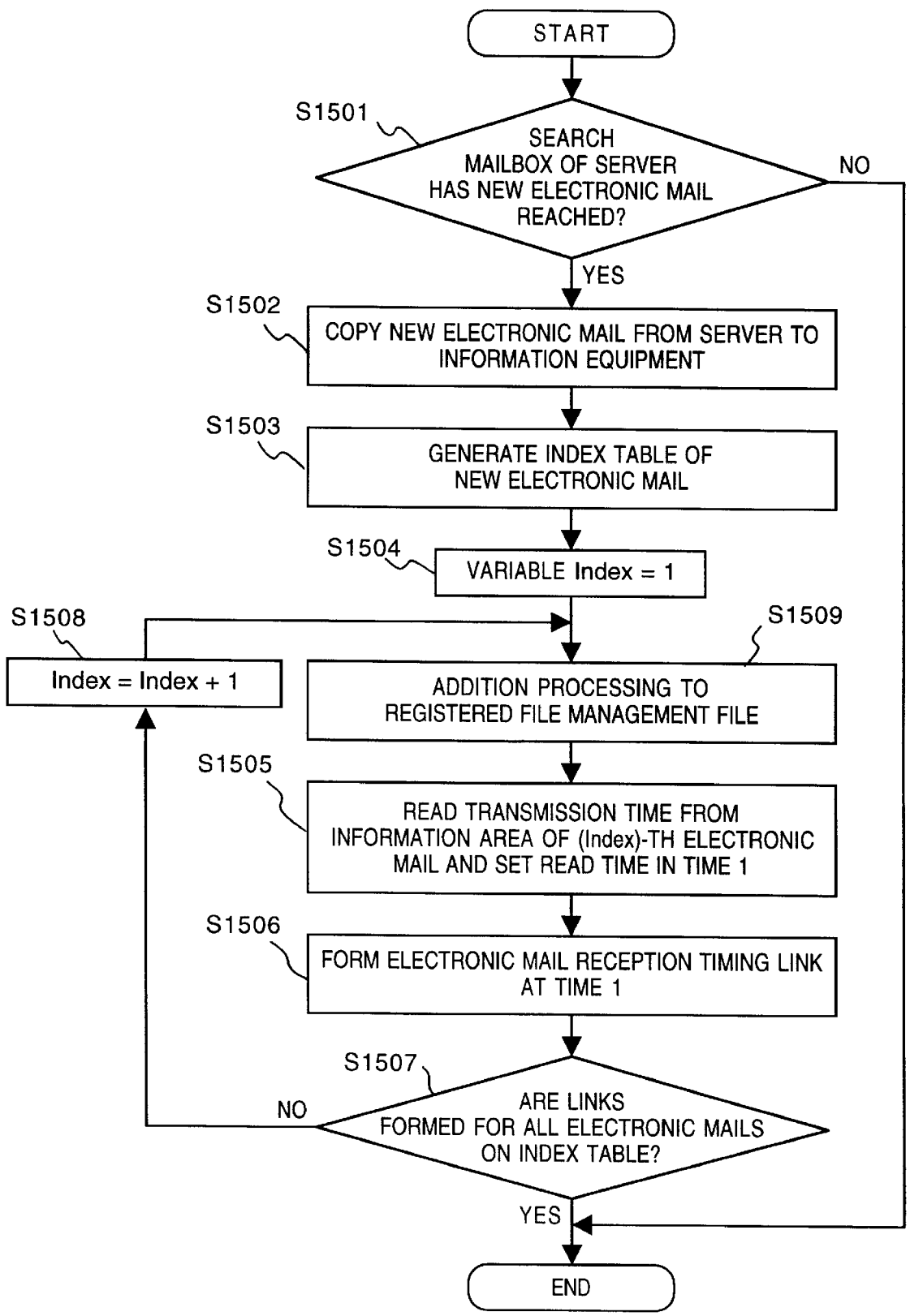
FIG. 34 is a flow chart showing the electronic mail information updating processing sequence.

As shown in FIG. 34, when a new electronic mail has reached upon execution of the electronic mail information updating processing, the communication management program forms an electronic mail reception timing link.

When the power switch of the information equipment is turned on, the communication management program is automatically started. The communication management program executes the electronic mail information updating processing shown in FIG. 34 upon starting of the equipment and at predetermined time intervals. The processing sequence of the electronic mail information updating processing shown in the flow chart in FIG. 34 will be described in detail below.

In the electronic mail information updating processing, in step S1501, the communication management program looks up a mailbox of the server connected via the network. In this embodiment, a plurality of private and public information equipments are connected to the server, to which the information equipment of this embodiment is connected via the network, in addition to the information equipment of this embodiment. An electronic mail which is transmitted from another information equipment and is addressed to the user of the information equipment of this embodiment is stored as a file in a directory called a mailbox on a nonvolatile storage medium of the server connected via the network, and the information equipment of this embodiment looks up this mailbox. In this case, when the information equipment finds a new electronic mail which has not been looked up yet, the electronic mail is transferred to the information equipment via the network, so that the user of the information equipment can obtain the electronic mail addressed to himself or herself via the network.

If it is determined that new electronic mail or mails has or have reached the mailbox of the server, "YES" is determined in step S1501, and the flow advances to step S1502. On the other hand, if no new electronic mail has reached the mailbox of the server, "NO" is determined in step S1501, and the electronic mail information updating processing ends.

In step S1502, data of the new electronic mail or mails is or are received via the network, and is or are copied to a predetermined directory, in which electronic mails are to be stored, on the nonvolatile storage medium of the information equipment of this embodiment. Then, file names are assigned to the respective electronic mails. In step S1503, if there are K electronic mails copied in step S1502, a table (to be referred to as table 1 hereinafter) in which numbers 1 to K are assigned to the file paths and file names of the K electronic mails is generated. For the sake of simplicity, the file path and file name of an n-th file on table 1 will be expressed as file(n) hereinafter.

In step S1504, an area for a variable "Index" is assured on the work area 1125, and "1" is substituted as an initial value in Index. Subsequently, in step S1509, an (Index)-th file on table 1 is registered in the registered file management file.

More specifically, as shown in FIG. 25, the communication management program generates a registered file management record "registered file ID information field 1601=file(Index), program file ID information field 1602=the file path and file name of the communication management program file 1138, and thumbnail image data field 1603=thumbnail image data obtained by converting a subject character string of the mail obtained from the information area of the electronic mail into bitmap data", and adds this record to the record list of the registered file management file 1135.

In step S1505, the communication management program looks up a transmission time information area of the file designated by file(Index) to acquire the transmission time of the electronic mail from the transmission source, and sets the acquired time in time 1. In this embodiment, the actual state of an electronic mail is one file, the file has an information area, and the time at which the electronic mail transmission source has transmitted the electronic mail is stored as the "transmission time" in the information area. This time is the transmission time of the electronic mail from the transmission source, and does not match the reception time of the electronic mail by the server in the strict sense. However, this embodiment ignores this time lag, and assumes electronic mail transmission time=electronic mail reception time.

In step S1506, the communication management program forms an electronic mail reception timing link. More specifically, the program adds, to the link information file 1134, a link information record "processing time information field 11001=time 1, file ID information field 11002=file (Index), and link type information field 11003=electronic mail reception timing link". After the electronic mail reception timing link is formed in step S1506, it is checked in step S1507 if electronic mail reception timing links have been formed for all electronic mails (files) registered on the index table generated in step S1503.

If electronic mail reception timing links have not been formed for all the electronic mails yet, "NO" is determined in step S1507, and the value of the variable Index is incremented by 1 in step S1508. Thereafter, the flow returns to step S1509. On the other hand, if electronic mail reception timing links have been formed for all the electronic mails (files), "YES" is determined in step S1507, and the electronic mail information updating processing shown in the flow chart in FIG. 34 ends.

A sequence executed when the information equipment of this embodiment forms an electronic mail transmission timing link will be described below. In this embodiment, the user of the information equipment can create an electronic mail using the user interface of the communication management program. Upon transmission of the created electronic mail, the user clicks the transmission button on the user interface to input a transmission command of the created electronic mail to the information equipment. Upon reception of the transmission command of the created electronic mail, the information equipment stores, in the nonvolatile storage medium 1114, the electronic mail as a file having a unique file path and file name in the medium 1114. For example, in this embodiment, a directory "SendMail"0 is prepared under the root directory, and an electronic mail is stored in this directory as a file assigned with a file name uniquely derived from the destination address, transmission time, and the like of the electronic mail. After the communication management program transmits the electronic mail, and stores it as a file in the nonvolatile storage medium 1114, it forms an electronic mail transmission timing link on the basis of its file path and file name, and the transmission time.

The processing sequence executed by the communication management program when the user creates an electronic mail on the information equipment and inputs a transmission command to the information equipment will be described in detail below with reference to the flow chart in FIG. 35.

When the user creates an electronic mail (to be referred to as electronic mail 1 hereinafter) on the user interface of the communication program and inputs a transmission command of electronic mail 1, the communication management program starts processing from step S1601.

In step S1601, the communication management program inquires of the operating system as to the current time, and sets the acquired time in time 1. In step S1602, the program transmits electronic mail 1 to the server connected via the network together with address information and time 1 (corresponding to the transmission time). Upon reception of these data, the server performs the transmission processing of the electronic mail. In this case, this processing sequence may follow that of conventional electronic mail transmission processing. Subsequently, in step S1603, the communication management program of the information equipment generates an information file including document information of electronic mail 1 created by the user, its address information, and time 1, assigns a file name uniquely derived from the address information and time 1 to the file (in this case, a file name "file1" is assumed to be assigned to the file for the sake of simplicity), and stores the file in the directory "Send-Mail".

In step S1604, the communication management program forms an electronic mail transmission timing link. More specifically, the program adds, to the file 1134, a link information record "processing time information field 11001=time 1, file ID information field 11002= C:\SendMail\file1, and link type information field 11003= electronic mail transmission timing link".

Figure 35:
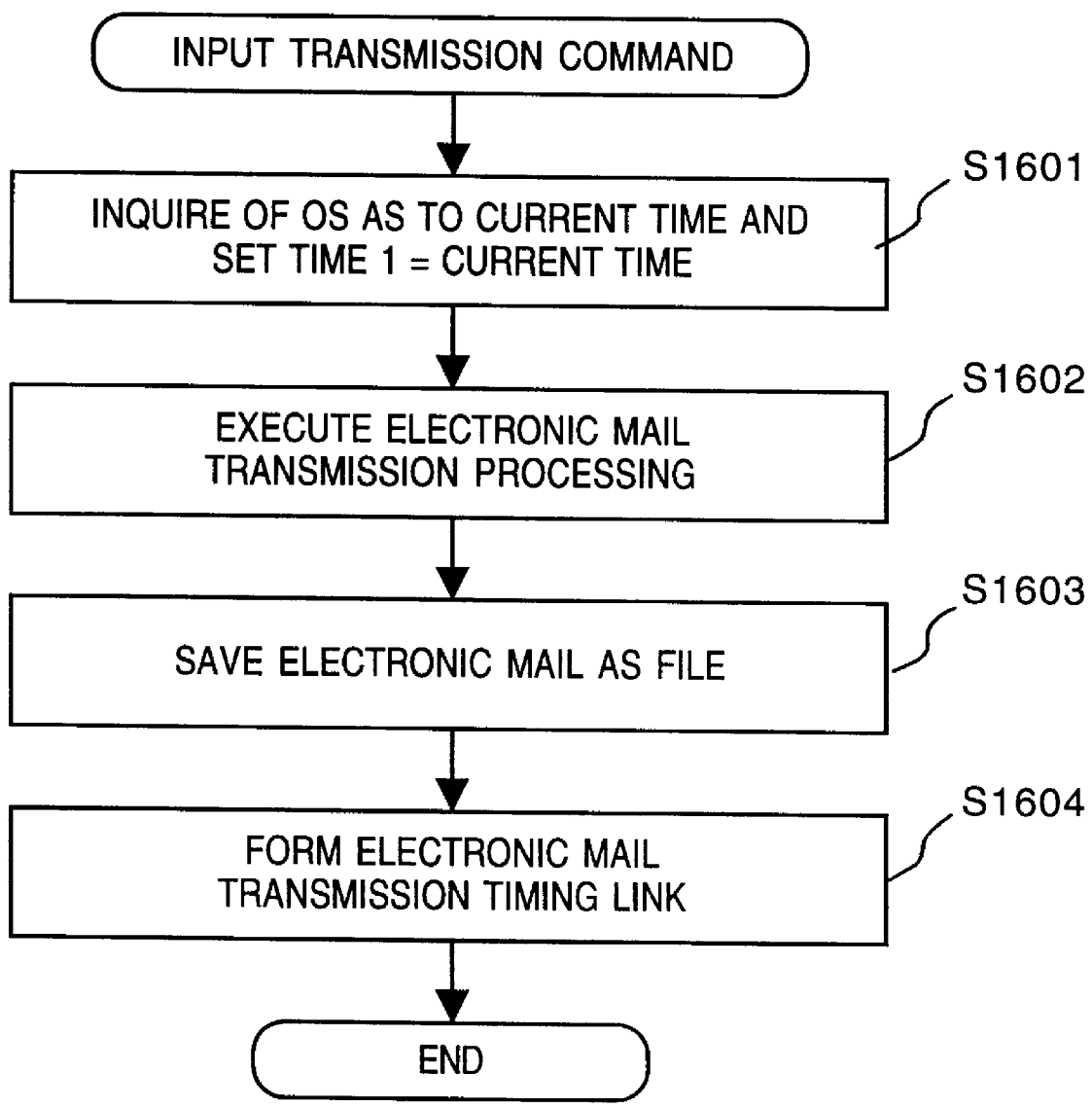
FIG. 35 is a flow chart showing the processing sequence upon transmission of an electronic mail by a communication management program.

After the electronic mail transmission timing link is formed in step S1604, the communication management program ends the processing shown in the flow chart in FIG. 35.

A processing sequence executed when the link data search/display application program of the information equipment forms a user designated time link will be described below. The user designated time link is a link characterized in that an arbitrary time required by the user is linked to a target file, but is not linked to the actual processing time of a document file unlike in other links. For example, if a file has the contents to be used in some event in future, the file is to be linked to a time at which the event is to take place. In this case, the user can associate (form a user designated time link of) the file with the time at which the event is to take place via the user interface of the information equipment. The type of the link formed at this time will be called a "user designated time link" in the present invention.

Figure 36:
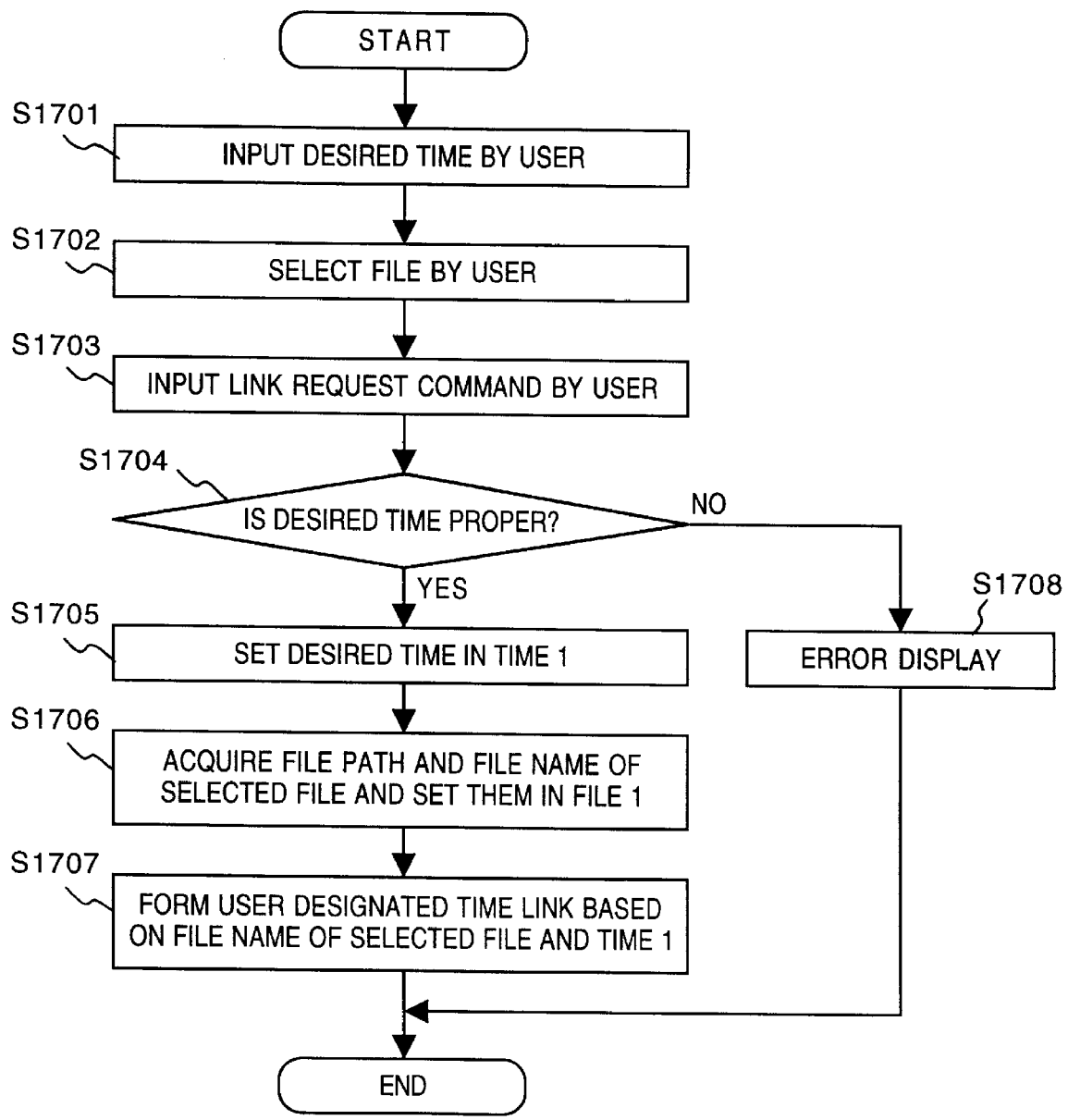
FIG. 36 is a flow chart showing the processing sequence upon formation of a user designated time link.

In this embodiment, the user inputs a desired time in the text field 1301 on the user interface of the link data search/display application program shown in FIG. 22, selects a file on the search result display area 1309, and clicks the Connect button 1311, thus forming a user designated time link at his or her desired time to the selected file. The processing sequence executed when the link data search/display application program forms a user designated time link will be described below with reference to the flow chart in FIG. 36.

In step S1701, the user inputs a desired time to the information equipment. In this embodiment, the user can input the desired time by inputting the desired time in the text field 1310 on the user interface of the link data search/display application program shown in FIG. 22.

In step S1702, the user selects a target file. In this embodiment, the user can select a target file by clicking, with the mouse, an area where the file name of the target file is displayed or an area where the thumbnail image of the target file is displayed, on the search result display area 1309 in FIG. 22. In this case, since the input time is linked to the file displayed on the search result display area 1309, the search operation must be performed therebefore, as a matter of course.

In step S1703, the user inputs a command (link request command) requesting to associate the selected file with the desired time if he or she has no intention to change the input desired time and the selected file. In this embodiment, the user can input the request command by clicking the Connect button 1311 in FIG. 22 with the mouse.

When the user inputs the link request command in step S1703, the link data search/display application program of the information equipment advances its processing to step S1704 to check if the desired time of the user has a proper value. For example, since the time must be designated in the format of "A.D./month/day/hour/minute/second", it is checked if the time is input in the text field 1310 in this format. In this case, not only the format but also whether or not the numerical values are proper are checked. For example, since "35th day" of a certain month does not exist, such checking operation is performed.

If the time is properly input, "YES" is determined in step S1704, and the flow advances to step S1705. On the other hand, if an irrelevant time is input, "NO" is determined in step S1704, and an error display is made in step S1708, thus ending the processing shown in the flow chart in FIG. 36.

When the flow advances to step S1705, the desired time input by the user is substituted in a variable "time 1", an area of which is assured in advance on the work area 1125. In step S1706, the file path and file name of the selected file are substituted in a variable "file 1", an area of which is assured in advance on the work area 1125. Subsequently, in step S1707, the link data search/display application program forms a user designated time link between file 1 and time 1. More specifically, the program adds, to the link information file 1134, a link information record "processing time information field 11001=time 1, file ID information field 11002=file 1, and link type information field 11003=user designated time link". After the user designated time link is formed in step S1707, a series of processing operations upon formation of the user designated time link shown in the flow chart in FIG. 36 ends.

In the description of this embodiment, the user interface as shown in FIG. 22 is used. However, the user interface is not particularly limited as long as it has a desired time input means, a file selection means, and a command input means for inputting a command requesting formation of a user designated time link between the input time and selected file.

In this embodiment, one file is selected, and a link is formed. Also, a plurality of files may be selected at one time, and a desired time may be associated (a user designated time link may be formed) with the plurality of files. In another preferred embodiment of the present invention, a user may drag a thumbnail image of a file and drop it on a user interface that displays an area and time in correspondence with each other, and the file and time may be associated with each other (a user designated time link may be formed therebetween) by attaining designation of the desired time and file selection by a single drag & drop operation.

As described above, in the information equipment of this embodiment, the processing contents and processing time of processing (for example, document file look-up processing, document file modification processing, document file content print processing, electronic mail transmission processing, image pickup processing using a digital camera, electronic mail reception processing, file registration processing to an application program, and the like) performed for a document file can be stored in association with the document file, and later, a user can search for a target file in accordance with (the processing contents and) the processing time (approximate processing time) in his or her memory. When a file has some association with a given time for a user, the user can associate the file with his or her desired time, and can search for a file later along the time axis by utilizing the associated information.

In the description of the above embodiment, events to occur include a file edit operation, print operation, electronic mail operation, and image input operation. However, the present invention is not limited to these events. For example, the same management applies when a created or edited document (including an image or the like) is transmitted or received as facsimile data via a modem (not shown).

[Fourth Embodiment]

Figure 37:
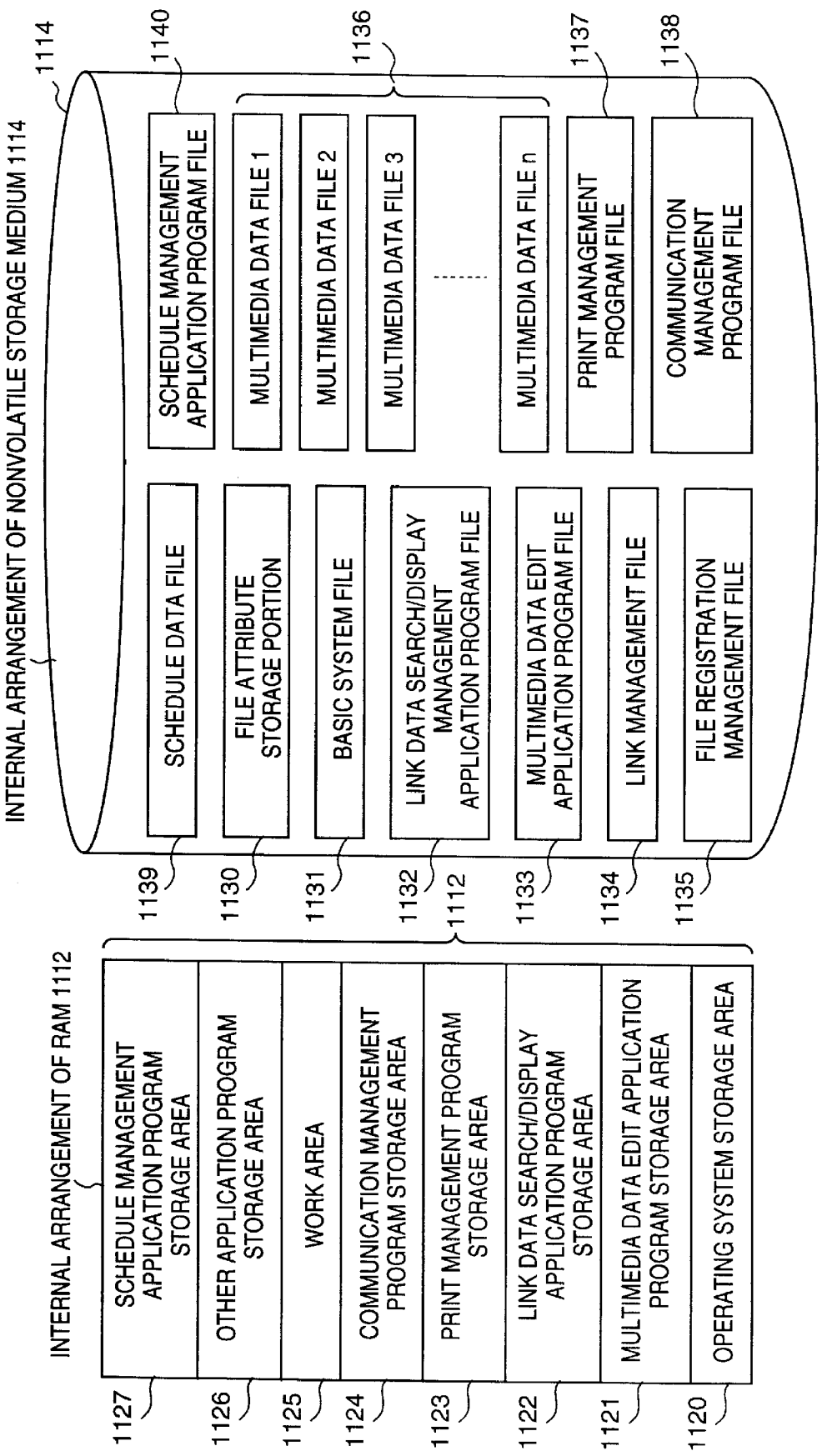
FIG. 37 is a view showing the internal arrangements of a RAM and a nonvolatile storage medium of the information equipment in the fourth embodiment.

An information of the fourth embodiment comprises a schedule management program storage area 1126, a schedule data file 1139, and a schedule management application program file 1140 (which are stored in the nonvolatile storage medium 1114 and are read out and processed as needed), as shown in FIG. 37, and other arrangements thereof are the same as those in the third embodiment.

In the fourth embodiment, by loading the schedule management application program file 1140 onto the schedule management application program storage area 1126, a schedule management application program as an application program for managing a personal schedule is ready to run on the information equipment of this embodiment. The schedule management application program has a means for inputting a personal schedule, and displays the input schedule on the display device 1180 at a later time. Since the input schedule can be reviewed even after the execution time of a given schedule event, it can also be used as a diary.

Figure 43A:
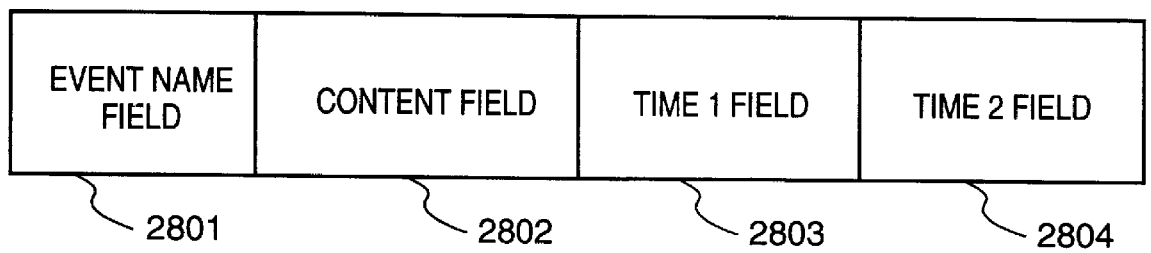
FIGS. 43A and 43B are views showing the data architecture of a schedule data file.
Figure 43B:
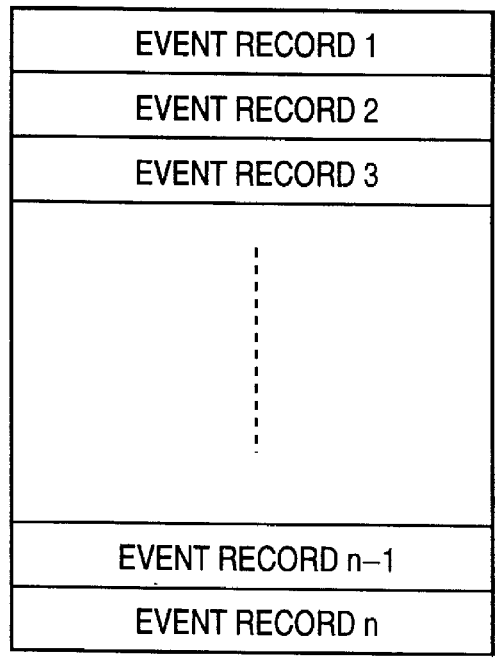

In this embodiment, schedule data is processed as a set of event records each of which is a minimum unit of the schedule data. FIGS. 43A and 43B show the data architecture of the schedule data file 1139. FIG. 43A shows the architecture of an event record as a minimum unit of the schedule data. Reference numeral 2801 denotes an event name field, which has a format of a character string (which will be referred to as an event name hereinafter for the sake of simplicity) having information of a name representing an event that will be executed (or was executed). Reference numeral 2802 denotes a content field which has a format of a character string (which will be referred to as event contents hereinafter for the sake of simplicity) that describes the detailed description of the event designated by the event name 2801. Reference numeral 2803 denotes a time 1 field having time information indicating a time at which the event designated by the event name 2801 will start or started (the time designated by this field will be referred to as a start time hereinafter for the sake of simplicity). Reference numeral 2804 denotes a time 2 field having time information indicating a time at which the event designated by the event name 2801 will end or ended (the time designated by this field will be referred to as an end time hereinafter for the sake of simplicity). For the sake of simplicity, a schedule unit indicated by an event record with the architecture shown in FIG. 43A will be simply referred to as an event record hereinafter.

FIG. 43B shows the architecture of the schedule data file 1139 in this embodiment. As shown in FIG. 43B, the schedule data file 1139 has a list of event records. FIG. 43B shows a state wherein a user inputs n event records, and a file including a list of the n event records is stored as the schedule data file 1139 on the nonvolatile storage medium 1114. With the above arrangement, since the fourth embodiment displays a thumbnail image or file name of a document file which is found upon the search by the same link data search method as in the third embodiment together with schedule data, the user can search for a target document file on the basis of his or her own schedule contents.

In the arrangement shown in FIG. 37, when the user turns on the power switch of the information equipment, an initialization program stored in the ROM 1110 shown in FIG. 20 is executed as in the third embodiment. Upon completion of initialization processing required for the equipment, the basic system file 1131 is loaded onto the operating system storage area 1120, and the operating system is ready to run.

When the operating system is ready to run, it waits for an event input by the user while a command is focused on the operating system. When the user inputs a command requesting the operating system to use the schedule management application program to the operating system using the input device 1106, the information equipment of this embodiment loads the schedule management application program file 1140 from the nonvolatile storage medium 1114, and stores it on the schedule management application program storage area 1127, so that the schedule management application program is ready to run on the information equipment of this embodiment.

Figure 38:
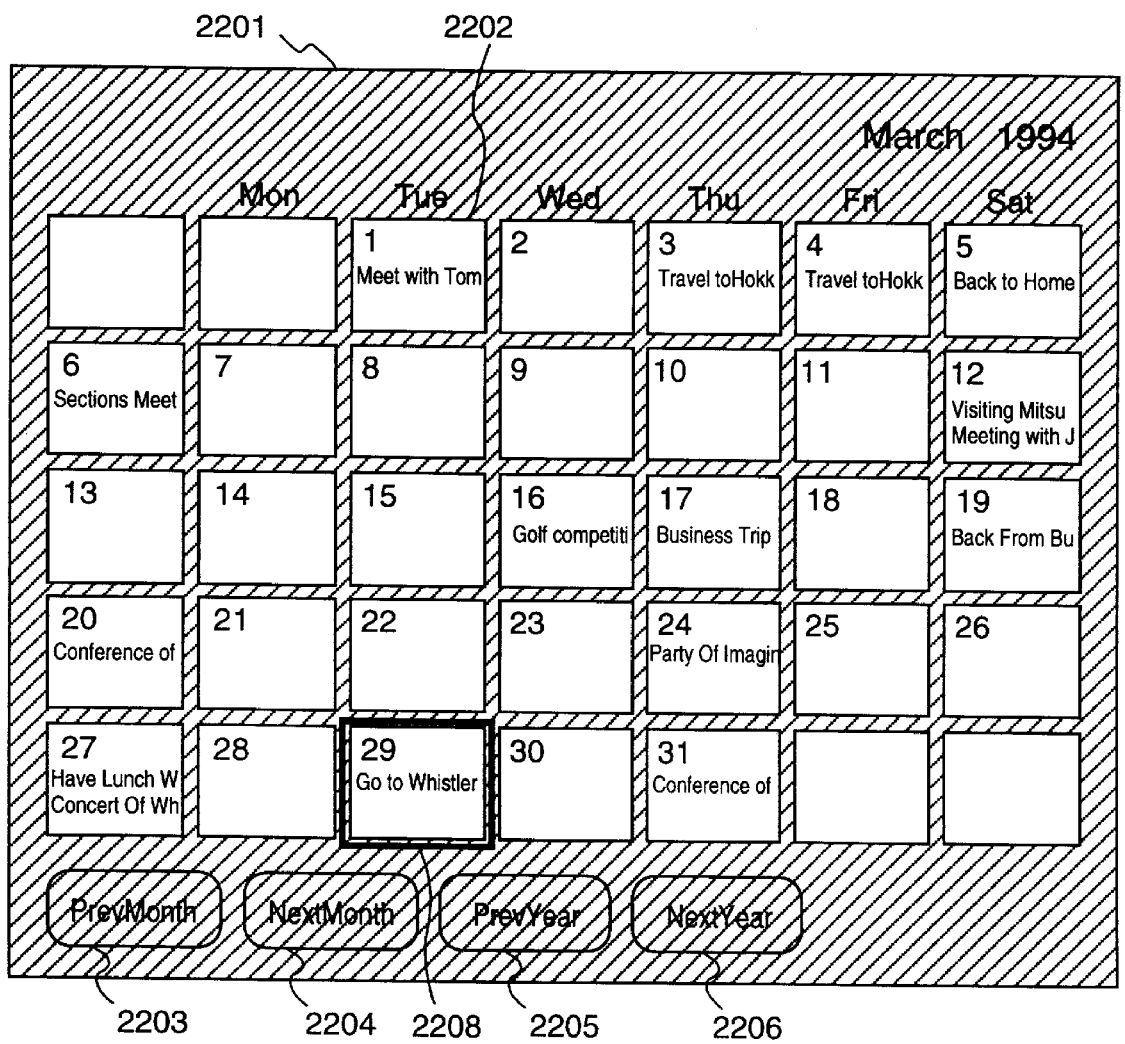
FIG. 38 is a view showing the user interface of a schedule management application.

When the schedule management application program is ready to run, it inquires of the operating system as to the current date, loads the schedule data file 1139, which describes schedule data input by the user so far, from the nonvolatile storage medium 1114 onto the work area 1125, and displays a graphical user interface (GUI1) of the schedule management application program as shown in FIG. 38 on the display device 108. Thereafter, the program waits for an event input by the user. At this time, a command input by the user is focused on the schedule management application program, and is received by the schedule management application program until the user changes the focusing state of a command to another application program or the operating system using the input means.

The GUI1 will be described below with reference to FIG. 38. As shown in FIG. 38, the GUI1 is displayed in the form of a calendar. When the schedule management application program is started, a calendar including the current date is displayed, and today's date is surrounded by a bold frame. In this embodiment, assume that today is Mar. 29, 1994, and the calendar of March in 1994 is displayed in FIG. 38. Referring to FIG. 38, reference numeral 2201 denotes an outer frame of the calendar. A frame 2202 indicates a day unit, and displays the date and event names if events are scheduled on the day, as long as they fall within the frame. Note that the information equipment of this embodiment comprises a keyboard and a mouse as the input device 106, and a mouse cursor is displayed on the display device 1108. These input devices can be used in the same manner as those of a currently popular personal computer.

A frame 2208 indicates that today is Mar. 29, 1994. When the user clicks a button 2203, the calendar displayed on the GUI1 is changed to that of the previous month. When the user clicks a button 2204, the calendar displayed on the GUI1 is changed to that of the next month in the same year with respect to the year and month displayed at the time of clicking. When the user clicks a button 2205, the calendar displayed on the GUI1 is changed to that of the same month in the previous year with respect to the year and month displayed at the time of clicking. Also, when the user clicks a button 2206, the calendar displayed on the GUI1 is changed to that of the same month in the next year with respect to the year and month displayed at the time of clicking.

Figure 41:
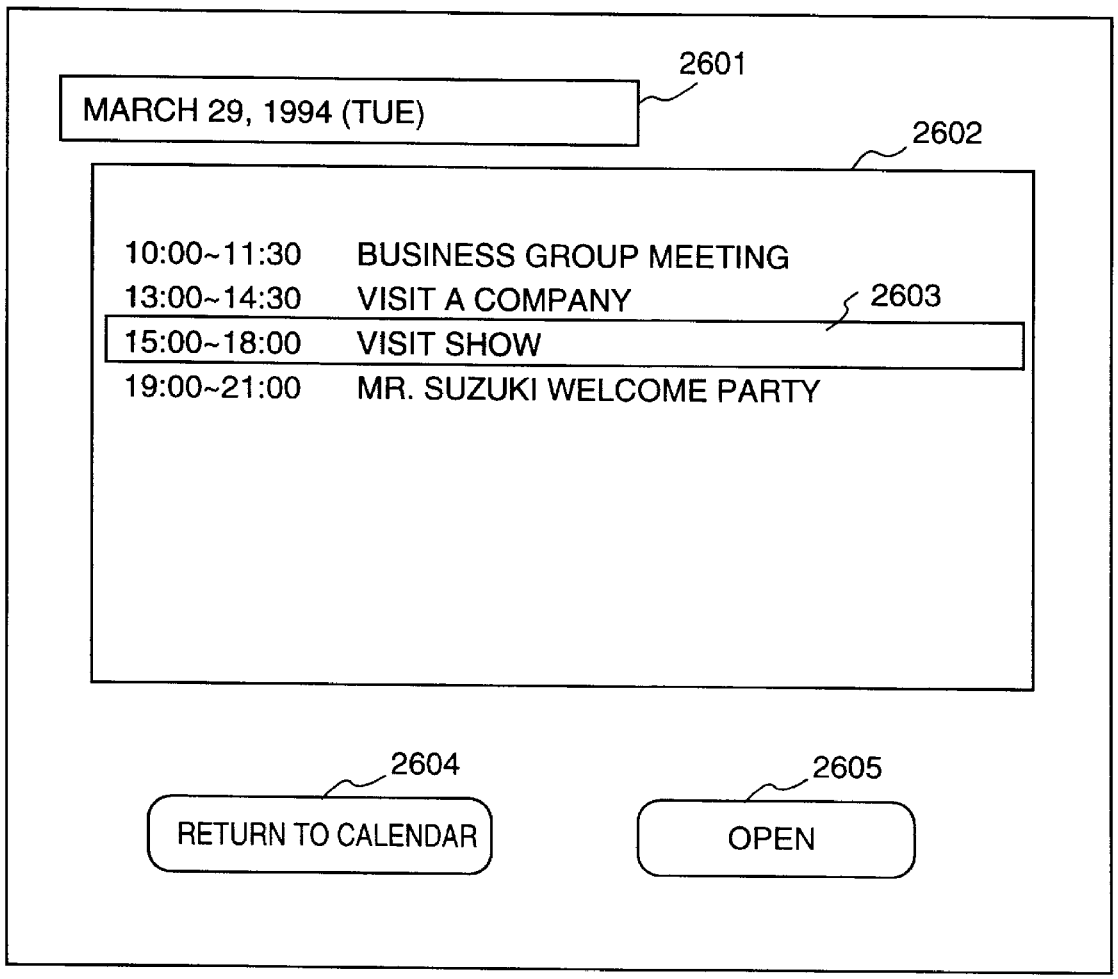
FIG. 41 is a view showing the user interface of the schedule management application.

When the user double-clicks a portion within the frame 2202 of his or her desired day with the mouse, he or she can observe a list of events on the desired date on a graphical user interface (GUI2) of the schedule management application program, as shown in FIG. 41.

The GUI2 will be explained below with reference to FIG. 41. As shown in FIG. 41, the schedule management application program of this embodiment displays on the GUI2 a list of event start times, event end times, and event names of events, which have event start times included in the date designated by the user, in the order of earlier event start times.

Referring to FIG. 41, reference numeral 2601 denotes an area for displaying a date. On this area, the date (designated date) designated by the user by double-clicking the date on the calendar of the GUI1 is displayed. In this embodiment, assume that the GUI1 displays the calendar of March, 1994, and the user designates the 29th day on this calendar. Reference numeral 2602 denotes an event list display area for displaying a list of event start times, event end times, and event names of events, whose event start times are included in the time band for a day of Mar. 29, 1994, in the schedule data file 1139 in the order of event start times. Reference numeral 2603 denotes an event selection frame which indicates that a specific one of events in the event list is selected. Reference numeral 2604 denotes a button for resuming the display state to that of the calendar. When the user clicks this button, the calendar by means of the GUI1 is displayed on the display device 1108 in place of the GUI2. Reference numeral 2605 denotes an "open button". When the user clicks this button, a GUI3 is displayed on the display device 1108 in place of the GUI2. At this time, an event selected by the event selection frame 2603 serves as a selected event, and the event name and other information of the selected event are displayed on the GUI3 as shown in FIG. 40, as will be described later.

Figure 40:
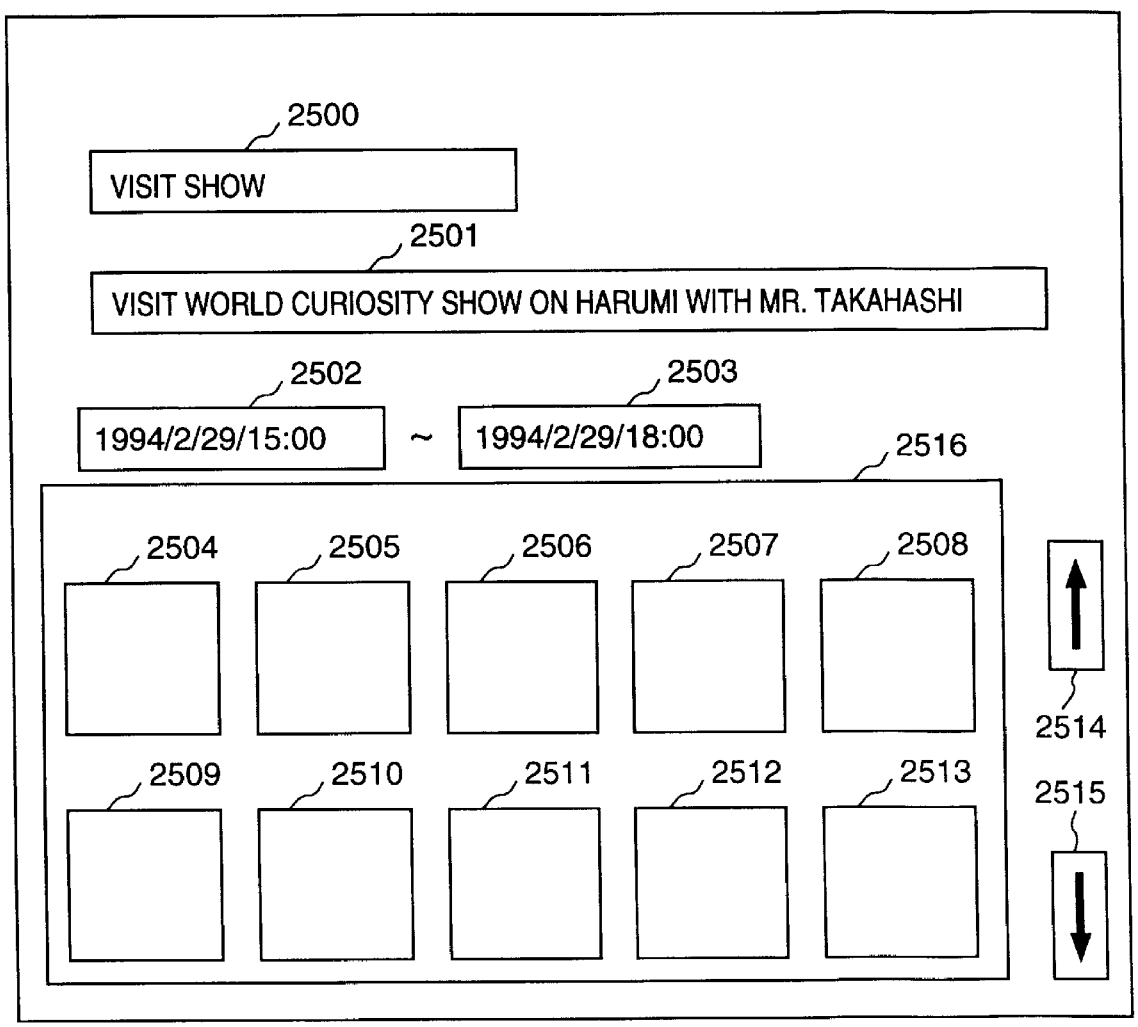
FIG. 40 is a view showing the user interface of the schedule management application.

FIG. 40 will be explained below. FIG. 40 shows the GUI3 as a graphical user interface of the schedule management application program of this embodiment. When the user selects an event on the GUI2 and clicks the open button 2605, the GUI3 on which the respective field values of the selected event are displayed on corresponding information areas is displayed on the display device 1108. Furthermore, the schedule management application program looks up the link information file 1134 to search for document files which are linked to times included in the time band between the event start time and event end time of the selected event, loads thumbnail images of the searched document files from the registered file management file 1135, and displays the thumbnail images on the GUI3. In FIG. 40, an event name display area 2500 displays the event name of the selected event. An event content display area 2501 displays the event contents of the selected event. An event start time display area 2502 displays the event start time of the selected event. An event end time display area 2503 displays the event end time of the selected event. Reference numeral 2516 denotes a thumbnail image display area. Reference numerals 2504 to 2513 denote thumbnail image display areas 1 to 10 for displaying thumbnail images of document files found by looking up the link information file 1134. Reference numeral 2514 denotes a page-up button. When the number of files found by the search by looking up the link information file 1134 is 11 or more, a list of thumbnail images is displayed across a plurality of pages. In such a case, when the user clicks the page-up button 2514, he or she can observe the list of thumbnail images on the previous page. Reference numeral 2515 denotes a page-down button. When a list of thumbnail images has the next page, a list of thumbnail images on the next page can be observed by clicking this button.

A processing sequence executed when the schedule management application program displays on the display device 1108 a list of the event contents of an event designated by the user and thumbnail images of document files linked to times included in the event time band of the event in association with each other will be described below with reference to the flow chart in FIG. 39.

Figure 39:
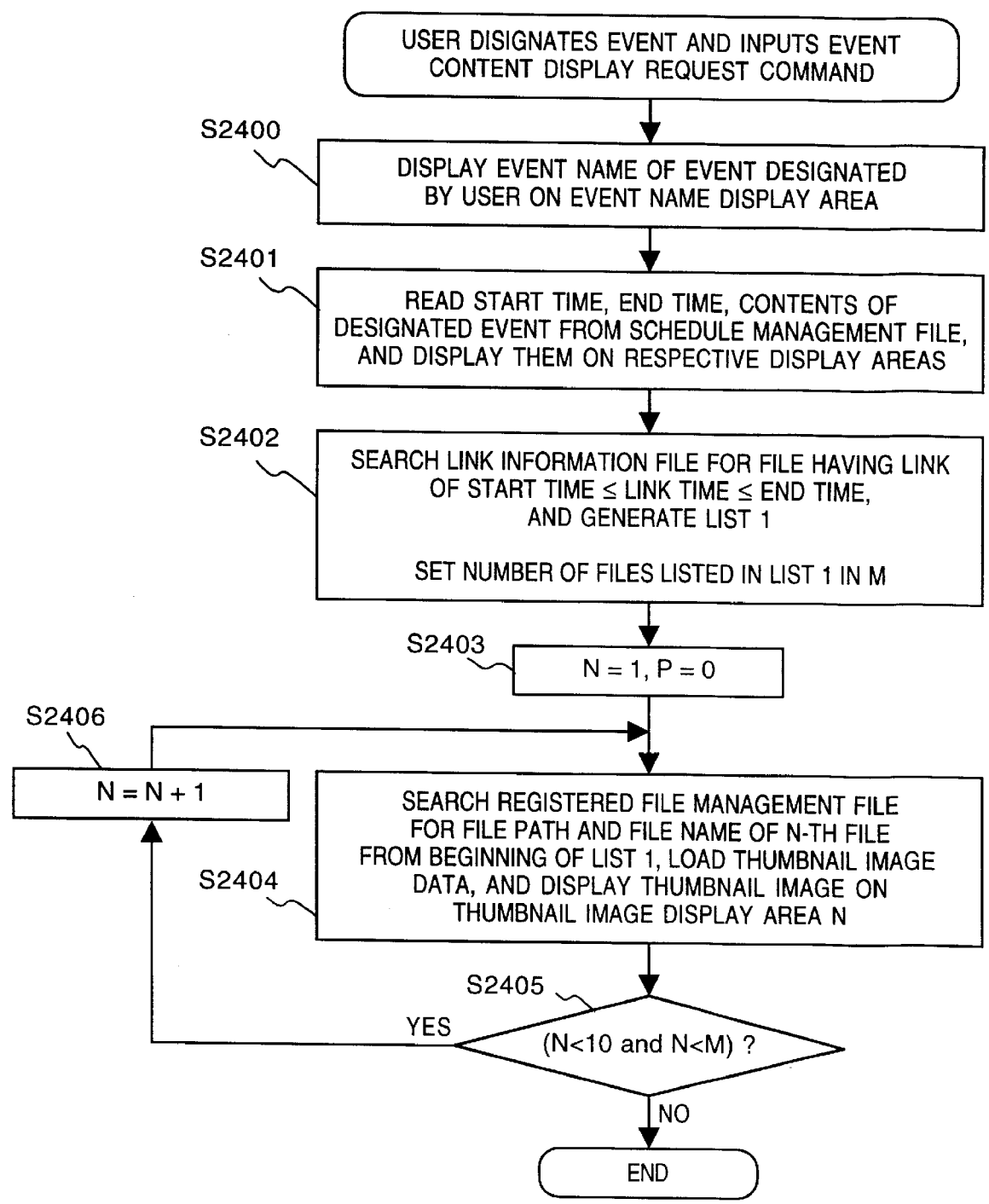
FIG. 39 is a flow chart showing the processing sequence executed when a content display command is input.

When the user selects a certain event on the GUI2 in FIG. 40, clicks the open button 2605 to designate the event, and inputs a command requesting to display its contents, the schedule management application program of the information equipment of this embodiment starts processing from step S2400 in FIG. 39.

In step S2400, the application program displays the event name of the event designated by the user on the event name display area 2500. In step S2401, the application program searches the schedule data file 1139 for the event designated by the user, and loads the value (start time) in the time 1 field, the value (end time) of the time 2 field, and the character string data (contents) in the content field of the event, and displays these values on the start time display area 2502, the end time display area 2503, and the content display area 2501, respectively.

In step S2402, the application program looks up the link information file 1134 to search the link record list on the link information file for files linked to times included in the time band defined by the start and end times of the event designated by the user, generates list 1 as shown in FIG. 42 as a list of the full paths and file names of the found files on the work area 1125, and substitutes the number of found files in a variable "M" whose area is assured on the work area 1125. Assume that link information records listed on the link information file 1134 are sorted in advance in the order of times designated by their processing time information fields 11001, and the contents of list 1 are also listed in the order of times in the processing time fields since the schedule management application program looks up the link information file 1134 in the order from the first file.

In this embodiment, as shown in FIG. 40, assume that an event with an event name "visit show" is designated, and when the link information file 1134 is searched for links included in the time band from the start time "15:00 on Feb. 29, 1994" to the end time "18:00 on Feb. 29, 1994" of the event, list 1 of files is obtained, as shown in FIG. 42.

In step S2403, "1" is substituted as an initial value in variables N and P. The variable P is one for managing the current page upon displaying a list of thumbnail images. Since the first page is displayed when the GUI3 is displayed, "1" is substituted in P.

In step S2404, the application program looks up list 1 to acquire the file path and file name of an N-th file from the beginning of the list. The application program searches the registered file management file 1135 for a registered file management record which has the acquired file path and file name as the contents of the registered file ID information field 1601, loads thumbnail image data based on the contents of the thumbnail image data field 1603 in the obtained record, and displays the loaded thumbnail image on the thumbnail image display area N.

In step S2405, it is checked if the current value of the variable N is smaller than 10 and is also smaller than M. If conditional formulas in step S2405 hold, since thumbnail images to be displayed on the thumbnail image display areas still remain, "YES" is determined in step S2405, and N is incremented by 1 in step S2406. Thereafter, the processing in step S2404 is performed again. On the other hand, if the conditional formulas in step S2405 do not hold, since all the thumbnail images to be displayed on the thumbnail image display areas are displayed, "NO" is determined in step S2405, and the processing sequence shown in FIG. 39 ends.

As described above, with the processing sequence shown in the flow chart in FIG. 39, the schedule management application program of this embodiment searches the link information file 1134 for document files having links to times included in the time band between the start and end times of the event designated by the user, and simultaneously displays a maximum of 10 thumbnail images of the searched document files together with the event name, event contents, event start time, and event start time of the event designated by the user. If the number of files included in list 1 is 11 or more, the thumbnail image display area 2516 on the GUI3 has a plurality of pages. In such a case, the user can look up thumbnail images on all the pages by inputting page-up and page-down commands.

In the fourth embodiment, the user can input a page-up command to the information equipment by clicking the page-up button 2515 in the GUI3 in FIG. 40 with the mouse.

Figure 44:
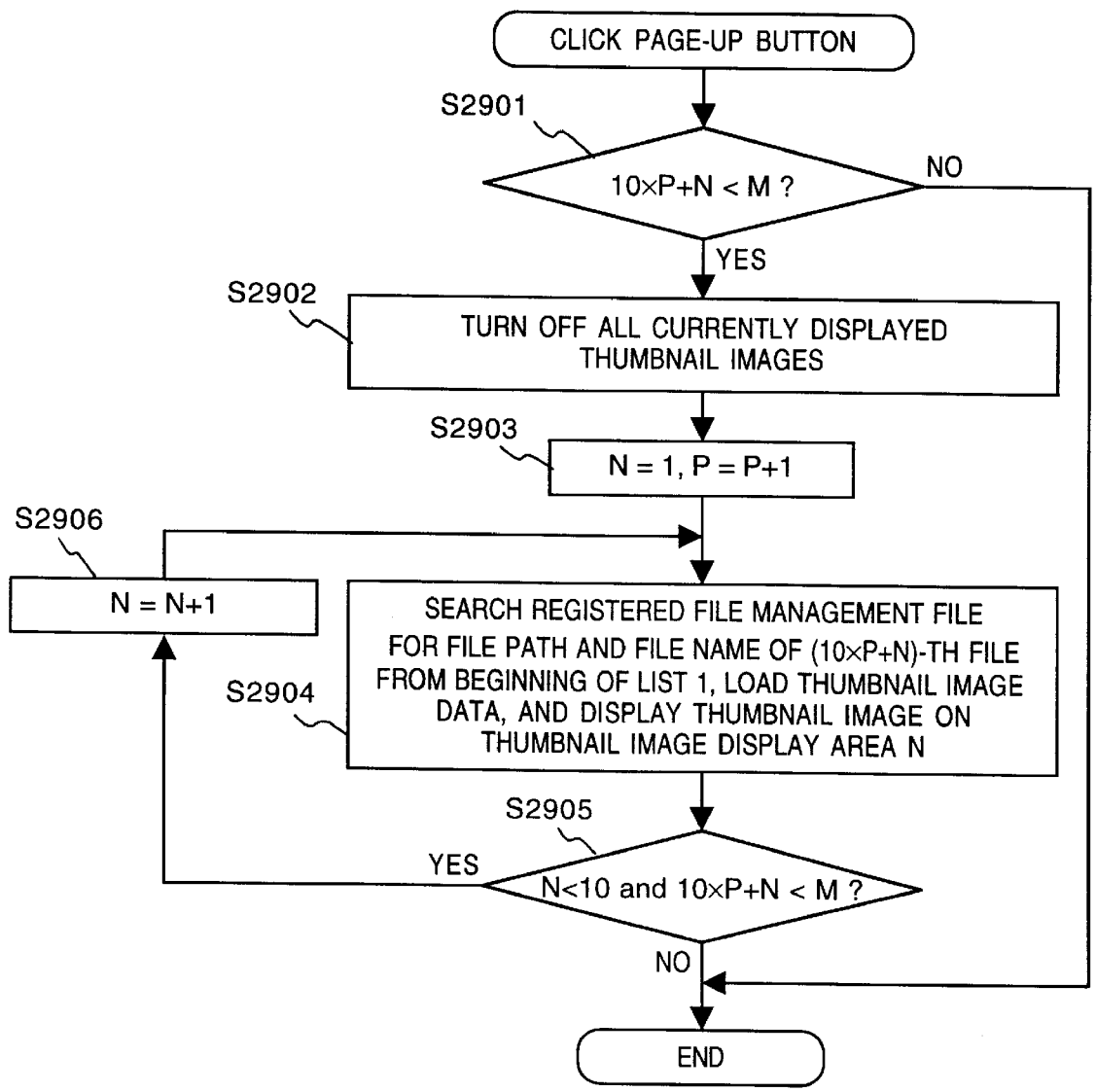
FIG. 44 is a flow chart showing the page-up processing sequence.

The processing sequence of the information equipment executed when the user inputs the page-up command by clicking the page-up button 2515 will be described below with reference to the flow chart in FIG. 44.

When the user clicks the page-up button 2515, the information equipment of this embodiment starts processing from step S2901.

In step S2901, the application program looks up the variables N, P, and M used in the processing shown in FIG. 39 to check if 10×P+N<M. If 10×P+N≧M, the thumbnail image of the last file in list 1 is displayed in the currently displayed page. More specifically, since the currently displayed thumbnail image corresponds to the last page, "NO" is determined in step S2901, and the page-up processing ends.

On the other hand, if "YES" is determined in step S2901, the flow advances to step S2902. In step S2902, all the thumbnail images currently displayed on the thumbnail image display areas 1 to 10 (2504 to 2513 in FIG. 44) are turned off. Subsequently, in step S2903, "1" is substituted in the variable N (to display images from the thumbnail image display area 1) and the variable P is incremented by 1 (to display the next page on the thumbnail image display area 2516). In step S2904, the programs looks up list 1 up to acquire the file path and file name of a (10×P+N)-th file from the beginning of list 1. Then, the program searches the registered file management file 1135 for a registered file management record which has the file path and file name as the contents of its registered file ID information field 1601, loads thumbnail image data based on the contents in the thumbnail image data field 1603 of the record, and displays the loaded image on the thumbnail image display area N.

In step S2905, it is checked if the variable N is smaller than N and 10×P+N is smaller than M. If "NO" is determined in step S2905, since the last file on list 1 is displayed, or 10 thumbnail images are displayed on the thumbnail image display area, and no more thumbnail images to be displayed remain, the processing ends. On the other hand, if "YES" is determined in step S2905, the variable N is incremented by 1 to display the thumbnail image of the next file on list 1 in step S2906, and thereafter, the processing in step S2904 is performed again.

As described above, when the user inputs the page-up command, and at least one file is listed below one currently displayed on thumbnail image display area 10 (2513 in FIG. 40) in list 1, the information equipment of this embodiment performs page-up processing of the thumbnail image display area 2516 to display a maximum of 10 thumbnail images of the remaining files.

When the user clicks the page-down button 2515, the information equipment performs page-down processing of the thumbnail image display area. However, a detailed description of this processing sequence will be omitted.

As described above, the information equipment of the fourth embodiment comprises a schedule management means (schedule management application program), and when the user selects a specific one of schedule events and inputs a content display request command requesting to display its contents, the schedule management means displays the field values of the event names, start time, end time, contents, and the like of the selected event, searches the link information file 1134 for document files having links to times included in the time band between the start and end times of the selected event, and displays the thumbnail images of the searched document files.

Therefore, as shown in, e.g., FIG. 40, assume that an event "visit show: 1944/2/29/15:00 to 1944/2/29/18:00" is registered in the schedule. When the user actually visits the show, and inputs picked-up images to the equipment, these images are registered in association with their image pickup times. At this time, as an application program for viewing these images, an application program for displaying and editing bitmap image data is automatically associated.

Therefore, when this schedule event is selected and its contents are displayed, images included in the time band are displayed, as shown in FIG. 40. In other words, a list of files of events (in this case, image pickup times) that occurred at least in the time band of the event "visit show" can be included although they may not be directly related to the event "visit show".

As a result, when the user requests to view images picked up during the event "visit show", such a request can be quickly met.

When a desired one of a list of files (in this case, thumbnail images) displayed on the area 2516 in FIG. 40 is selected, the corresponding application program is started, and the designated file is opened by the started application program, as in the third embodiment described above. As described above, since the list of files displayed on the window in FIG. 40 includes files whose event occurred during the designated time band, it may include files which are not directly related to the event "visit show". However, as long as the user personally uses this information equipment, a non-related file is never generated unless the corresponding time is designated in advance. Especially, when thumbnail images are displayed, a difference from other files can be recognized at a glance. For this reason, picked-up images can be displayed reliably.

In this embodiment, thumbnail images are displayed. However, in place of thumbnail images, the file paths and file names of document files (link files) found upon searching the link information file 1134 may be displayed, or only the file names may be displayed. The schedule management application program of this embodiment displays the field values of the event name, event start time, event end time, event contents, and the like of one file selected by the user, and also displays thumbnail images of its link files. However, the present invention is not limited to this. For example, a plurality of events may be simultaneously selected, and the field values and link files of the selected events may be simultaneously displayed. When all the field values and link files cannot be concurrently displayed on the display device 1108, they may be scrolled using, e.g., a scroll bar. As a method of simultaneously selecting a plurality of events, a method of simultaneously selecting all events having start times included in a day selected on the graphical user interface in the form of a calendar may be used.

As described above, according to the information equipment of this embodiment, for each of various kinds of processing performed day by day for document files, link information which associates the processing contents, processing time, and ID information of a document file subjected to the processing is stored in the nonvolatile storage medium, and the user can search for a target file in accordance with his or her memory associated with the processing contents and processing time performed by himself or herself by utilizing the stored information. The information equipment comprises a schedule management means, and when schedule data daily input by user is displayed, the document files which were processed during the time band matching of the of the currently displayed schedule data are displayed in association with the schedule data. Therefore, the user can easily search for a target document file by browsing his or her own schedule data, and can utilize previously input personal schedule information upon the search.

The present invention may be applied to either a system constituted by a plurality of devices or an apparatus consisting of a single device. Also, the present invention may be applied to a case wherein the invention is attained by supplying a program that practices the present invention to the system or apparatus.

Needless to say, the objects of the present invention are also achieved by supplying a storage medium, which records a program code of a software program that can realize the functions of the above-mentioned embodiments to the system or apparatus, and reading out and executing the program code stored in the storage medium by a computer (or a CPU, MPU, or the like) of the system or apparatus.

In this case, the program code itself read out from the storage medium realizes the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

Needless to say, the functions of the above-mentioned embodiment may be realized not only by executing the readout program code by the computer but also by some or all of actual processing operations executed by an OS (operating system) running on the computer on the basis of an instruction of the program code.

Furthermore, needless to say, the functions of the above-mentioned embodiments may be realized by some or all of actual processing operations executed by a CPU or the like arranged in a function extension board or a function extension unit, which is inserted in or connected to the computer and receives the program code read out from the storage medium.

When the present invention is applied to the storage medium, the storage medium stores program codes corresponding to the above-mentioned flow charts.

As described above, according to the present invention, words which have already been electronically stored can be automatically set as search keywords to perform a search operation.

According to the second invention, a database search operation can be performed without extracting a word to be used in the search from text data including a plurality of words.

According to the present invention, since a search operation of the database server using an improper keyword can be avoided, the database server can be efficiently utilized.

According to the present invention, a desired file can be located by a search on the basis of an event that occurred for the file without requiring any special attention of a user.

As many apparently widely different embodiments of the present invention can be made without departing from the spirit and scope thereof, it is to be understood that the invention is not limited to the specific embodiments thereof except as defined in the appended claims.

What is claimed is:

1. An information search method for searching a data file for desired data, and reading out the desired data, comprising:

a step of storing input schedule data;

a step of instructing extraction of a search keyword;

a step of extracting a keyword used for a search from the stored schedule data in response to the instruction; and a step of searching the data file on the basis of the extracted keyword.

2. The method according to claim 1, wherein the extraction step includes the step of extracting a keyword on the basis of contents of an event in an instructed time band when the extraction of a keyword based on the time band of the schedule data is instructed.

3. The method according to claim 1, wherein the extraction step includes the step of extracting a keyword in accordance with contents of an event at an instructed time when the time of the schedule data is instructed.

4. The method according to claim 1, further comprising the step of storing words which are improper for keywords, and wherein the extraction step includes the step of extracting, as a keyword, a word which is not stored as the improper keyword.

5. The method according to claim 1, wherein the data file stores multimedia data.

6. An information processing method for storing and managing information as a file, comprising:

an access detection step of detecting access to a file to be stored and managed or a file which has been stored and managed;

a time detection step for detecting a time; and a step of registering, upon detection of access, information for specifying the file, a type of access, and time information indicating the time at accessing of the file in association with each other in a predetermined storage medium in accordance with a predetermined format.

7. The method according to claim 6, further comprising:
the time designation step of designating a time;
the search step of searching for a file corresponding to the designated time on the basis of information stored in the management/storage; and
the display step of displaying a list of files obtained in the search step.

8. The method according to claim 7, wherein each file has reduced image information generated based on the file so as to specify the file, and said method further comprises the display pattern setting step of designating whether the list of the obtained files is displayed using file names or the reduced image information in the display step.

9. The method according to claim 7, further comprising:
the step of designating a desired file of the displayed list of files obtained in the search step; and
the step of starting an application program which processes the designated file, and instructing the application program to open the designated file.

10. The method according to claim 6, wherein the type of processing includes a file creation operation, an edit operation, a print output operation, electronic mail transmission and reception operations, and an image input operation.

11. The method according to claim 6, further comprising a storage/management step, which comprises the registration step of registering files to be managed, and wherein the registration step includes the step of registering the file to be managed and an application program for processing the file as data in association with each other.

12. The method according to claim 11, wherein the registration step includes the step of registering a full path and a file name of the file, and a full path and a program file name of the application program.

13. The method according to claim 6, further comprising:
the schedule registration step of registering a time band of an event and data of the event;
the display step of displaying a list of events;
the selection step of selecting at least one of the displayed events; and
the step of displaying a list of files, processing operations of which was generated during a time band of the selected event.

14. The method according to claim 13, wherein the display step includes the step of displaying the list of events in a calendar format.

15. A storage medium which allows to search a data file for desired data and to read out the desired data in such a manner that an information processing apparatus loads contents of said storage medium into a memory and executes the loaded contents, comprising:

a procedure code of the step of storing input schedule data;

a procedure code of the step of instructing extraction of a search keyword;

a procedure code of the extraction step of extracting a keyword used for a search from the stored schedule data in response to the instruction; and a procedure code of the step of searching the data file on the basis of the extracted keyword.

16. A storage medium which allows to search a data file for desired data and to read out the desired data in such manner that an information processing apparatus loads contents of said storage medium into a memory and executes the loaded contents, comprising:

a procedure code of a step of detecting access to a file to be stored and managed or a file which has already been stored and managed;

a procedure code of a step of detecting a time; and a procedure code of a step of registering, upon execution of access, information for specifying the file, a type of access, and time information at accessing the file in association with each other in a predetermined storage device in accordance with a predetermined format.

17. An information search apparatus for searching a data file for desired data, and reading out the desired data, comprising:

storage means for storing input schedule data;

instruction means for instructing extraction of a search keyword;

keyword extraction means for extracting a keyword used for a search from the schedule data stored in said storage means in response to the instruction from said instruction means; and searching means for searching the data file on the basis of the keyword extracted by said keyword extraction means.

18. The apparatus according to claim 17, wherein when said instruction means instructs extraction of a keyword based on a time band of the schedule data, said keyword extraction means extracts a keyword on the basis of contents of an event in the instructed time band.

19. The apparatus according to claim 17, wherein said instruction means can instruct a time of the schedule data, and said keyword extraction means extracts a keyword in accordance with contents of an event at the instructed time.

20. The apparatus according to claim 17, further comprising improper keyword storage means for storing words which are improper for keywords, and wherein said keyword extraction means extracts, as a keyword, a word which is not stored in said improper keyword storage means.

21. The apparatus according to claim 17, wherein said keyword extraction means comprises range designation means for designating a range of the schedule data, and word extraction means for extracting words within the range designated by said range designation means.

22. The apparatus according to claim 17, wherein the data file stores multimedia data.

23. An information processing apparatus for storing and managing information as a file, comprising:

an access detection means for detecting access to a file to be stored and managed or a file which has been stored and managed;

time detection means for detecting a time; and means for registering, upon detection of access, information for specifying the file, a type of access, and time information indicating the time at accessing of the file in association with each other in a predetermined format.

24. The apparatus according to claim 23, further comprising:

time designation means for designating a time;

search means for searching for a file corresponding to the designated time on the basis of information stored in the management/storage; and display means for displaying a list of files obtained by said search means.

25. The apparatus according to claim 24, wherein each file has reduced image information generated based on the file so as to specify the file, and said apparatus further comprises display pattern setting means for designating whether said display means displays the list of the obtained files using file names or the reduced image information.

26. The apparatus according to claim 24, further comprising:

file designation means for designating a desired file of the displayed list of files obtained by said search means; and means for starting an application program which processes the designated file, and instructing the application program to open the designated file.

27. The apparatus according to claim 23, wherein the type of processing includes a file creation operation, an edit operation, a print output operation, electronic mail transmission and reception operations, and an image input operation.

28. The apparatus according to claim 23, further comprising storage/management means, which comprises registration means for registering files to be managed, and wherein said registration means registers the file to be managed and an application program for processing the file as data in association with each other.

29. The apparatus according to claim 28, wherein said registration means registers a full path and a file name of the file, and a full path and a program file name of the application program.

30. The apparatus according to claim 23, further comprising:

schedule registration means for registering a time band of an event and data of the event;

display means for displaying a list of events;

selection means for selecting at least one of the displayed events; and means for displaying a list of files, processing operations of which was generated during a time band of the selected event.

31. The apparatus according to claim 30, wherein said display means displays the list of events in a calendar format.

* * * * *